United States Patent
Nishio et al.

[11] Patent Number: 6,115,188
[45] Date of Patent: *Sep. 5, 2000

[54] OPTICAL SYSTEM AND OPTICAL APPARATUS HAVING THE SAME

[75] Inventors: Akihiro Nishio; Hideki Ogawa, both of Yokohama; Makoto Misaka, Kawasaki, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/172,164

[22] Filed: Oct. 14, 1998

[30] Foreign Application Priority Data

Oct. 16, 1997 [JP] Japan .................. 9-299573
Dec. 1, 1997 [JP] Japan .................. 9-345859
Sep. 11, 1998 [JP] Japan .................. 10-276618

[51] Int. Cl.$^7$ .................. G02B 15/14; G02B 27/64

[52] U.S. Cl. .................. 359/690; 359/684; 359/686; 359/557

[58] Field of Search .................. 359/684, 686, 359/690, 557

[56] References Cited

U.S. PATENT DOCUMENTS

| | | | |
|---|---|---|---|
| 4,348,084 | 9/1982 | Kitagishi et al. | 350/454 |
| 4,848,883 | 7/1989 | Maruyama | 359/684 |
| 4,852,984 | 8/1989 | Takahashi et al. | 350/454 |
| 4,871,243 | 10/1989 | Ogawa et al. | 350/463 |
| 5,042,927 | 8/1991 | Ogawa et al. | 359/683 |
| 5,056,900 | 10/1991 | Mukaiya et al. | 359/676 |
| 5,132,848 | 7/1992 | Nishio et al. | 359/686 |
| 5,221,994 | 6/1993 | Nishio | 359/684 |
| 5,241,421 | 8/1993 | Endo et al. | 359/684 |
| 5,253,113 | 10/1993 | Sekita et al. | 359/680 |
| 5,442,486 | 8/1995 | Sato | 359/684 |
| 5,523,888 | 6/1996 | Nishio | 359/686 |
| 5,528,427 | 6/1996 | Tanaka et al. | 359/683 |
| 5,537,259 | 7/1996 | Ogawa | 359/684 |
| 5,568,321 | 10/1996 | Ogawa et al. | 359/676 |
| 5,574,599 | 11/1996 | Hoshi et al. | 359/689 |
| 5,576,890 | 11/1996 | Tanaka et al. | 359/686 |
| 5,579,171 | 11/1996 | Suzuki et al. | 359/557 |
| 5,581,404 | 12/1996 | Misaka et al. | 359/557 |
| 5,638,216 | 6/1997 | Horiuchi et al. | 359/683 |
| 5,646,779 | 7/1997 | Sato | 359/557 |
| 5,654,826 | 8/1997 | Suzuki | 359/557 |
| 5,691,851 | 11/1997 | Nishio et al. | 359/683 |
| 5,731,897 | 3/1998 | Suzuki | 359/557 |
| 5,739,953 | 4/1998 | Sato | 359/690 |

(List continued on next page.)

FOREIGN PATENT DOCUMENTS

| | | |
|---|---|---|
| 50-80147 | 6/1975 | Japan . |
| 55-147606 | 11/1980 | Japan . |
| 59-65820 | 4/1984 | Japan . |
| 59-65821 | 4/1984 | Japan . |
| 61-223819 | 10/1986 | Japan . |
| 5-27163 | 2/1993 | Japan . |
| 5-27164 | 2/1993 | Japan . |
| 6-242371 | 9/1994 | Japan . |
| 7-270724 | 10/1995 | Japan . |
| 8-201691 | 8/1996 | Japan . |
| 9-159911 | 6/1997 | Japan . |
| 9-203859 | 8/1997 | Japan . |

Primary Examiner—Georgia Epps
Assistant Examiner—Evelyn A. Lester
Attorney, Agent, or Firm—Fitzpatrick, Cella, Harper & Scinto

[57] ABSTRACT

An optical system includes, in order from an object side, a first lens unit of positive refractive power, a second lens unit of negative refractive power, the second lens unit being movable along an optical axis to effect focusing, and a third lens unit of positive refractive power, the third lens unit including, in order from the object side, a first lens subunit of positive refractive power, a second lens subunit of negative refractive power and a third lens subunit of positive refractive power, wherein the second lens subunit is movable in directions perpendicular to the optical axis to displace an image formed by the optical system.

24 Claims, 60 Drawing Sheets

U.S. PATENT DOCUMENTS

| | | | |
|---|---|---|---|
| 5,751,486 | 5/1998 | Misawa et al. | 359/557 |
| 5,757,555 | 5/1998 | Sato | 359/684 |
| 5,760,957 | 6/1998 | Suzuki | 359/557 |
| 5,790,902 | 8/1998 | Mizouchi et al. | 396/142 |
| 5,815,320 | 9/1998 | Hoshi et al. | 359/686 |
| 5,831,772 | 11/1998 | Nishio et al. | 359/689 |
| 5,835,272 | 11/1998 | Kodama | 359/686 |
| 5,847,875 | 12/1998 | Kodama et al. | 359/684 |
| 5,859,729 | 1/1999 | Misaka | 359/686 |
| 5,899,585 | 5/1999 | Ogawa | 396/72 |
| 5,930,043 | 7/1999 | Ogawa | 359/566 |

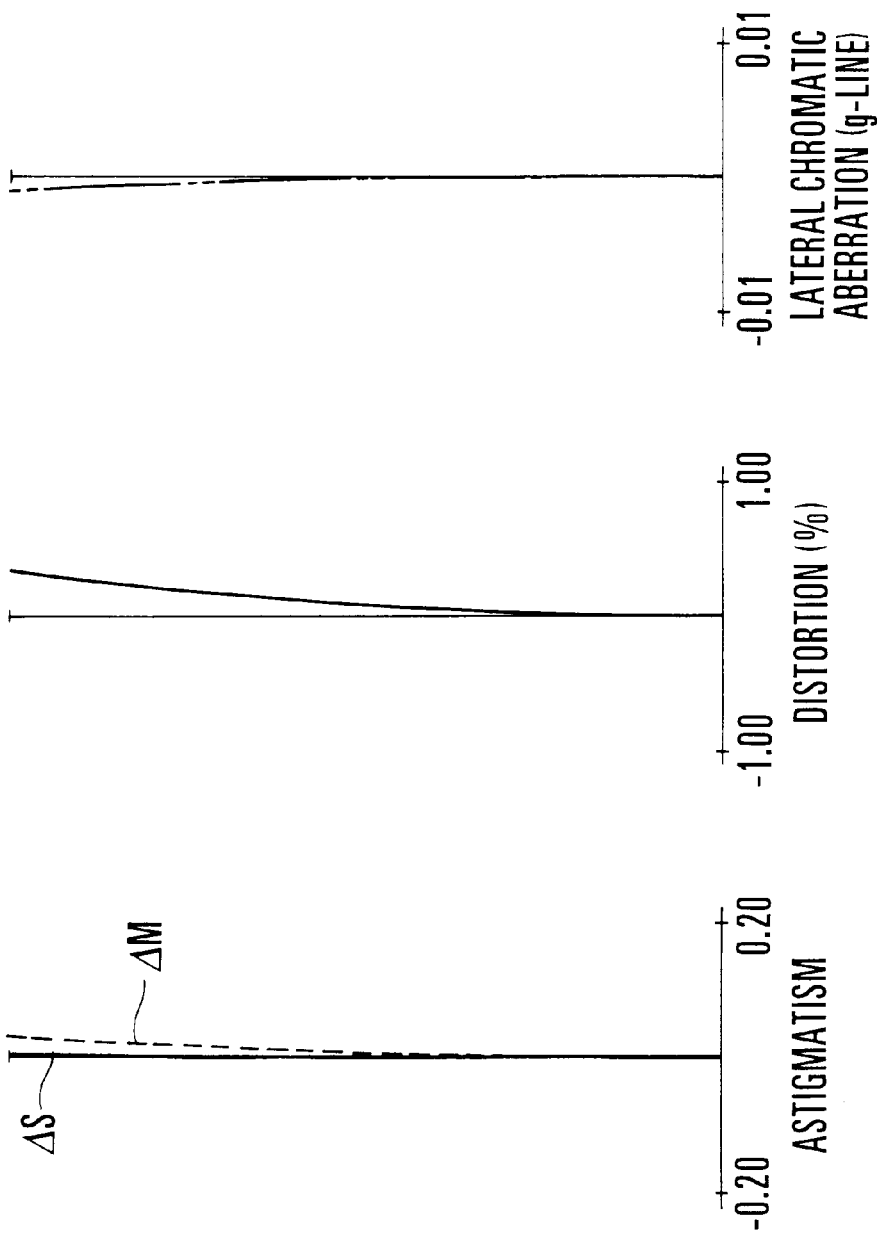

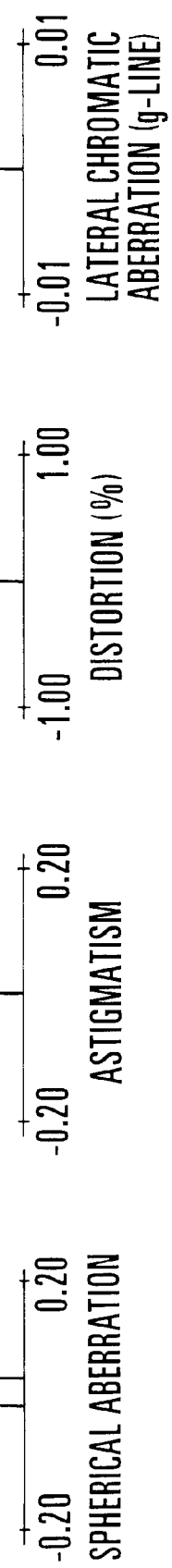
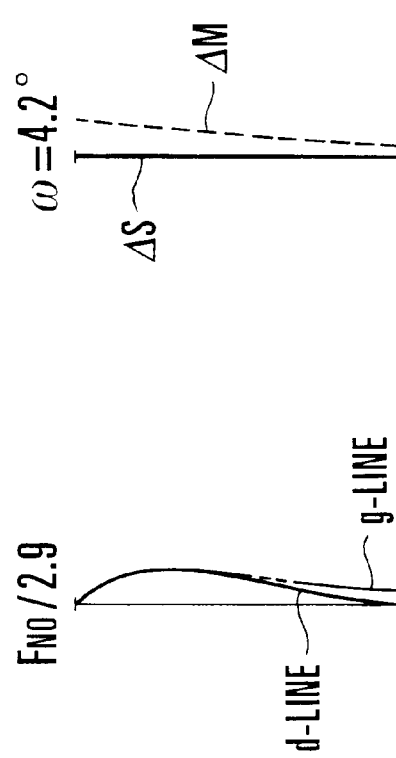
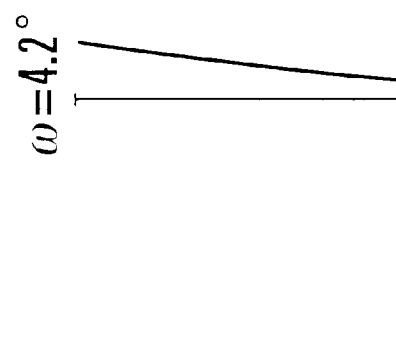
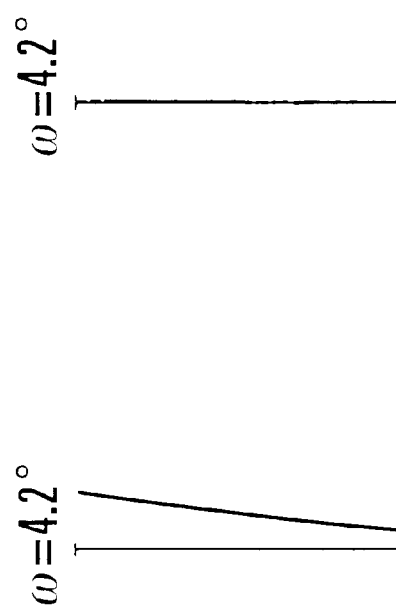

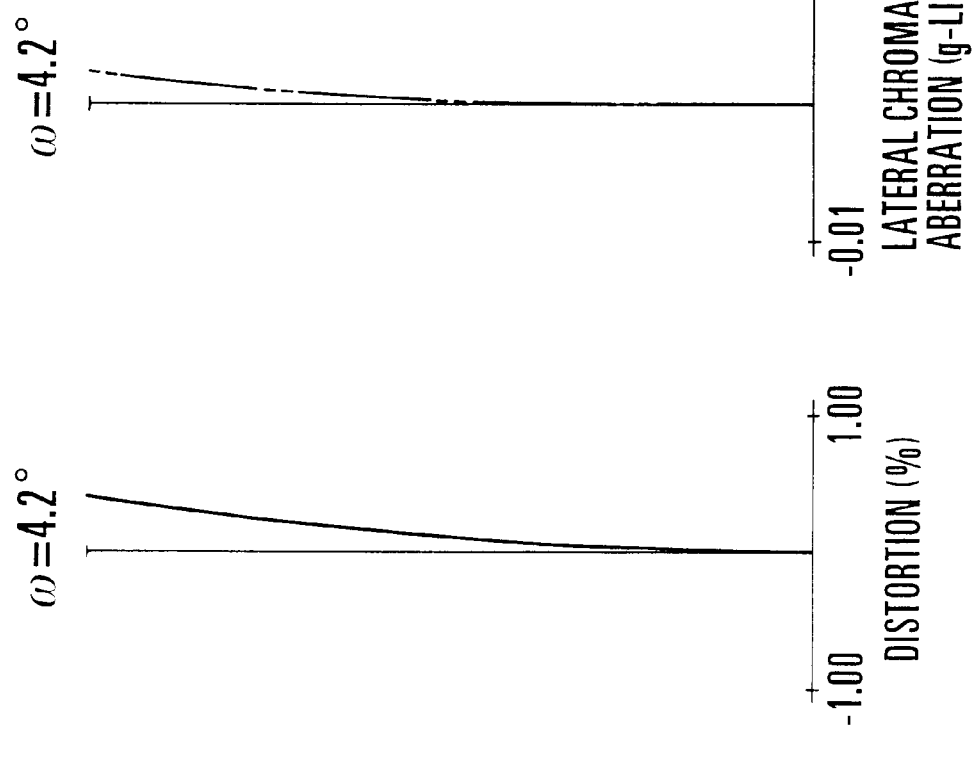

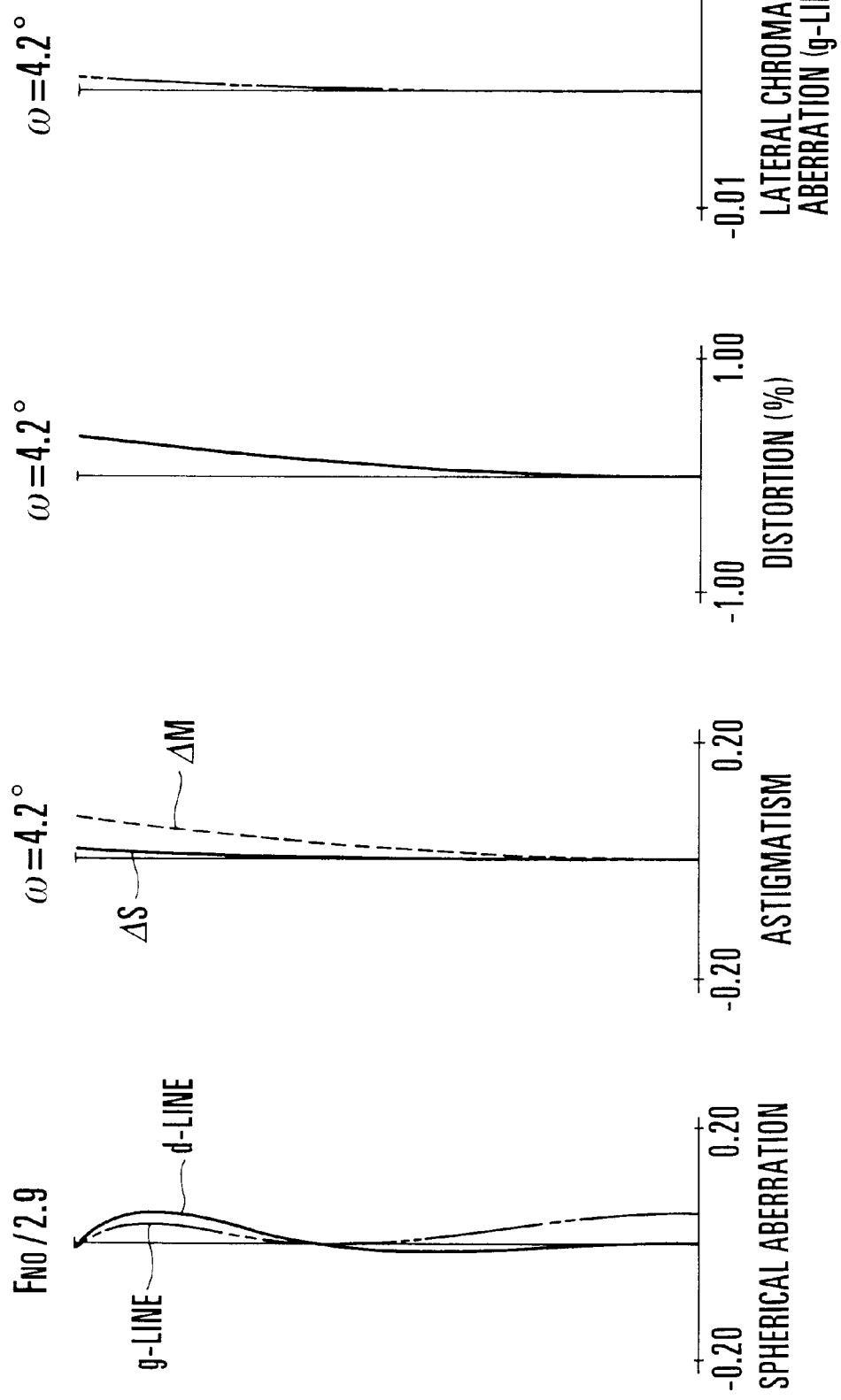

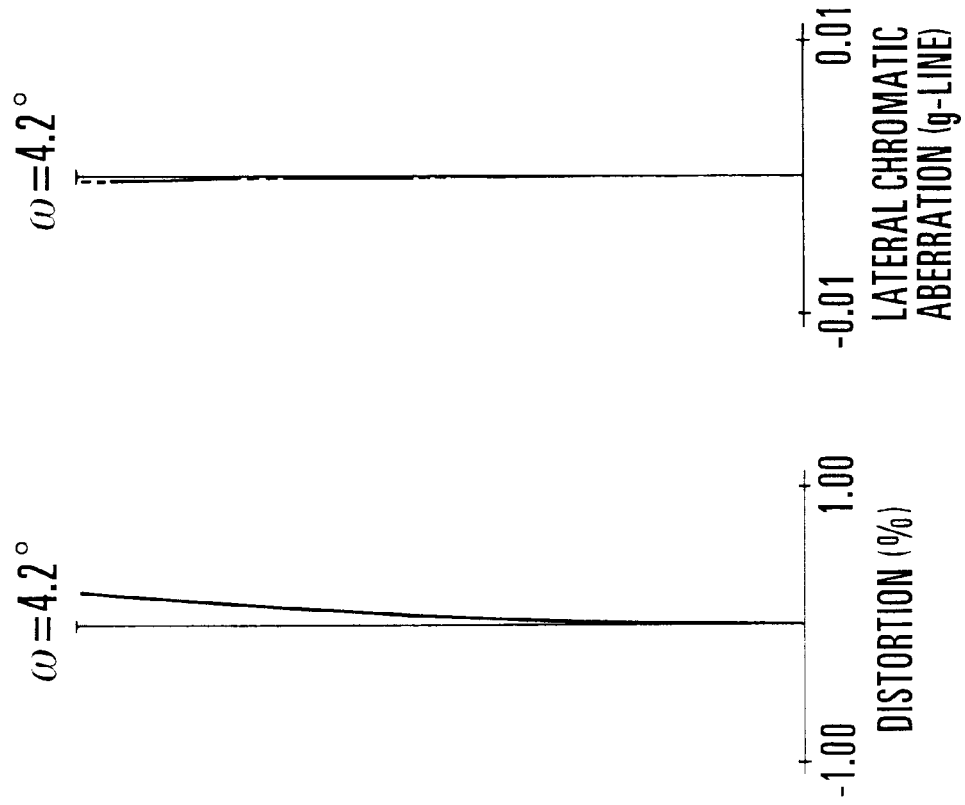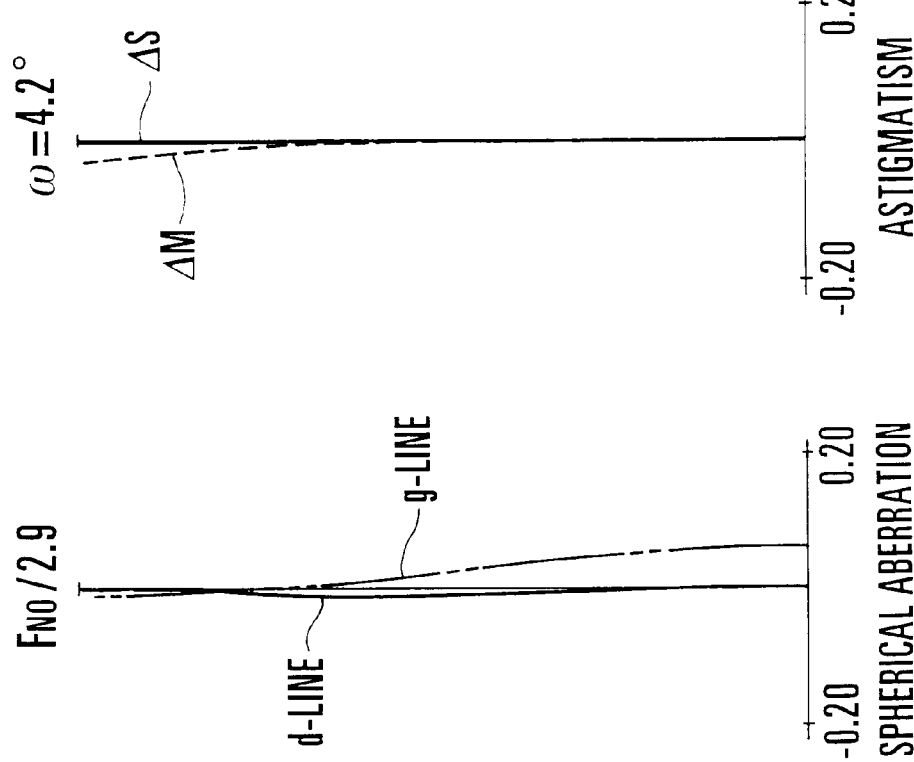

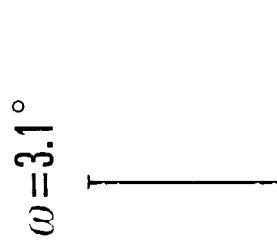
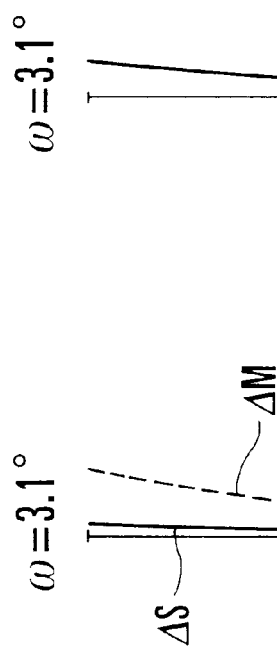
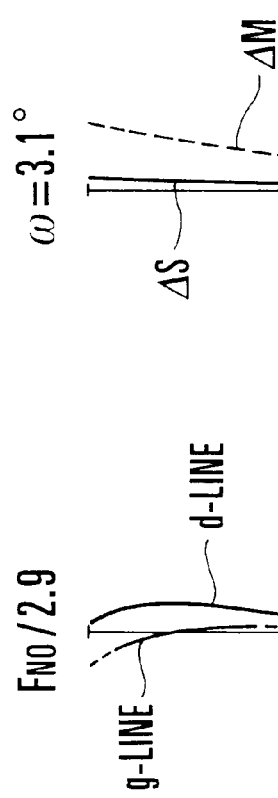

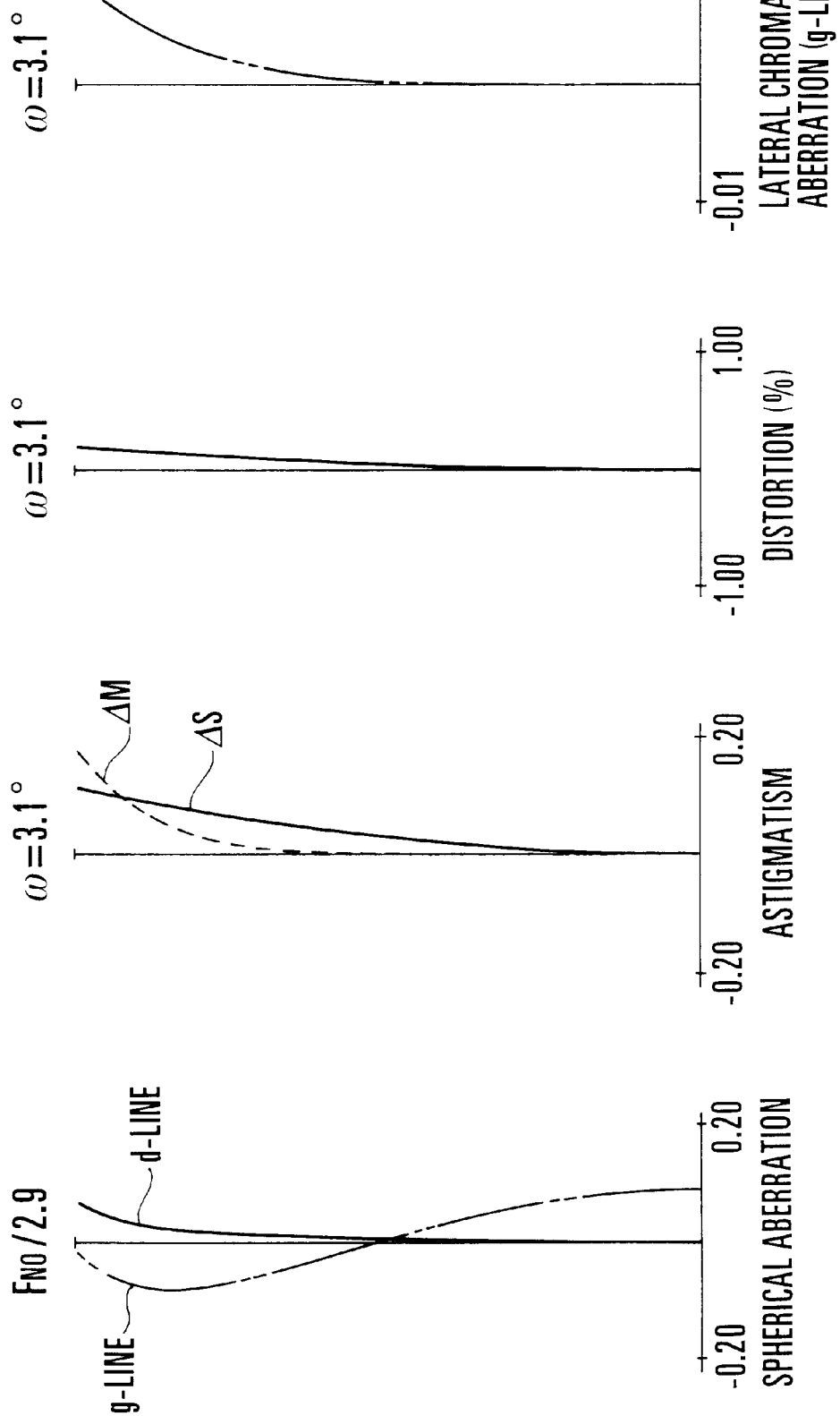

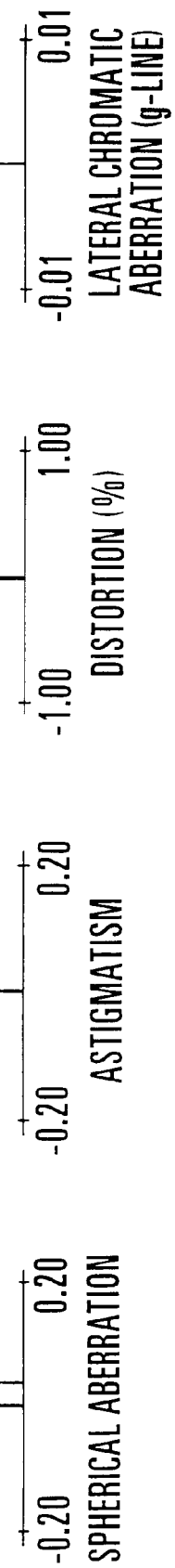

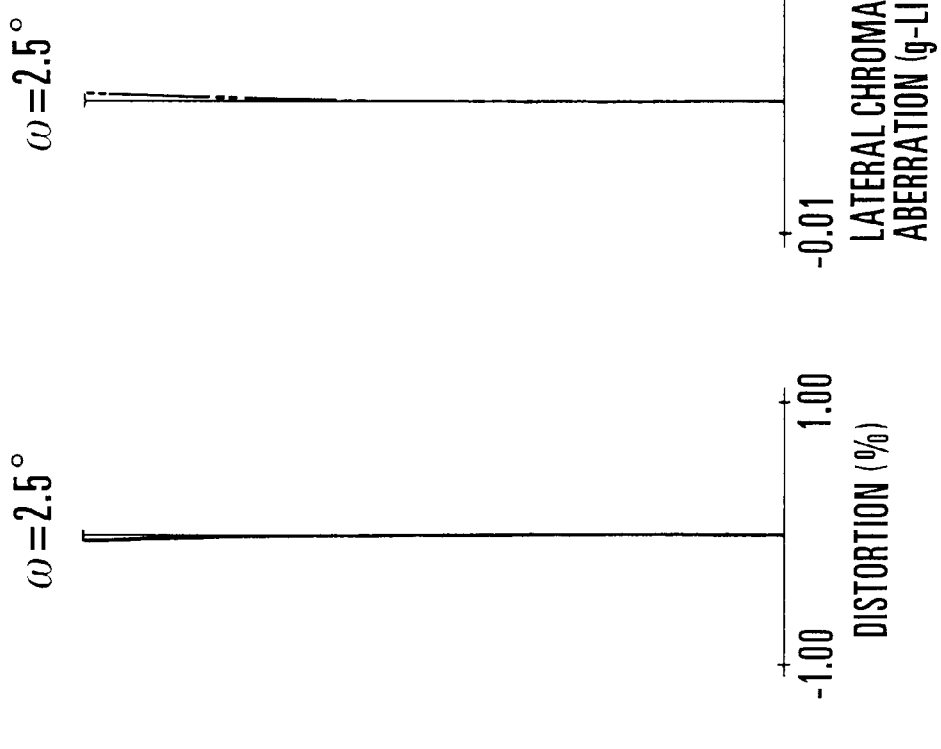
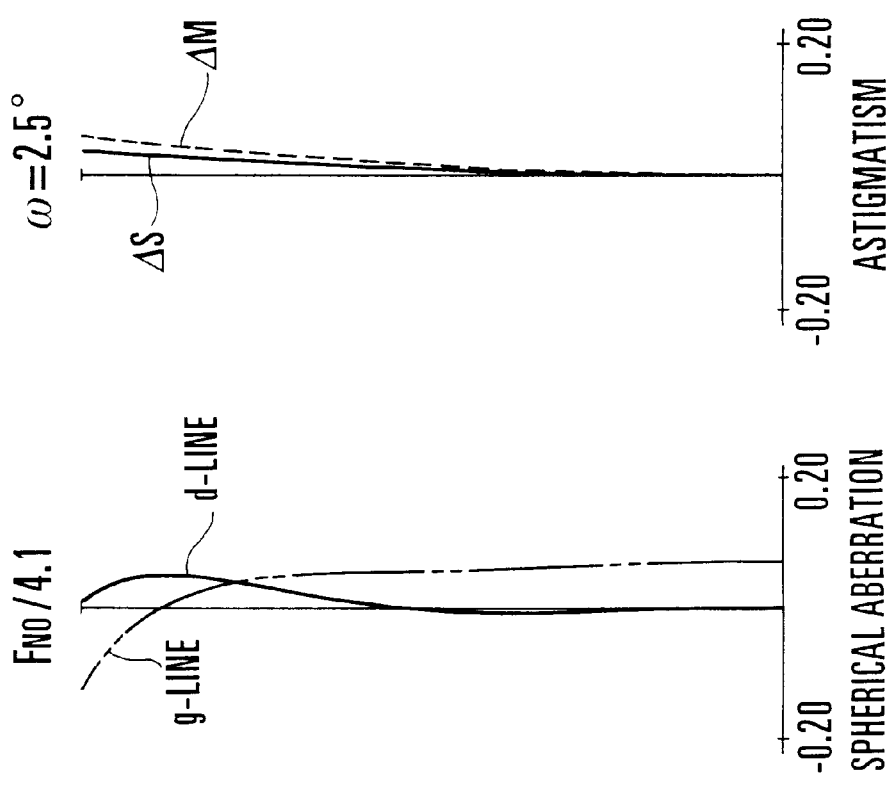

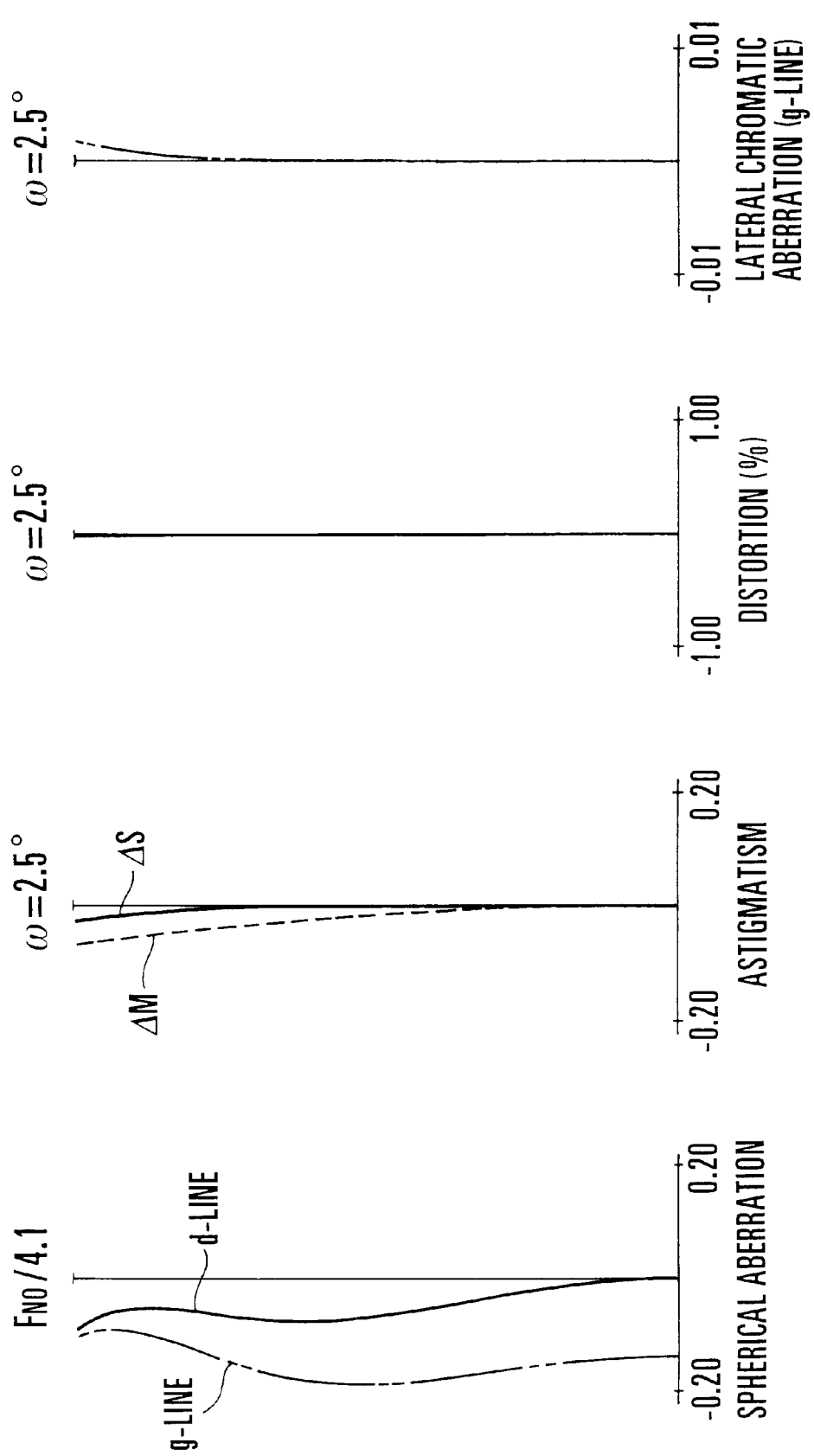

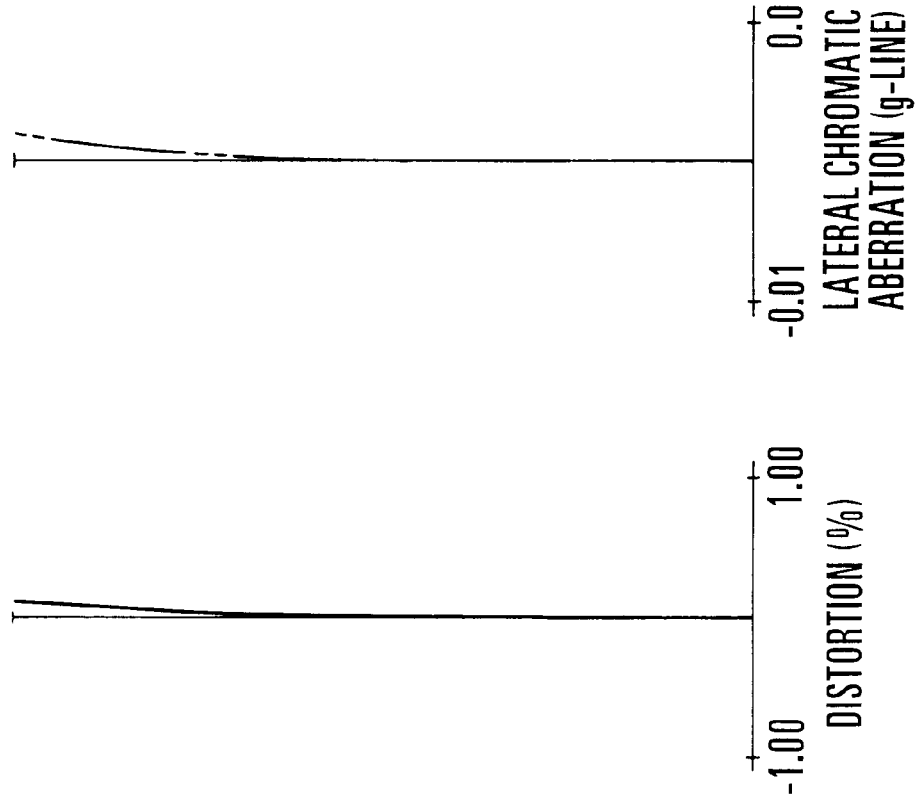

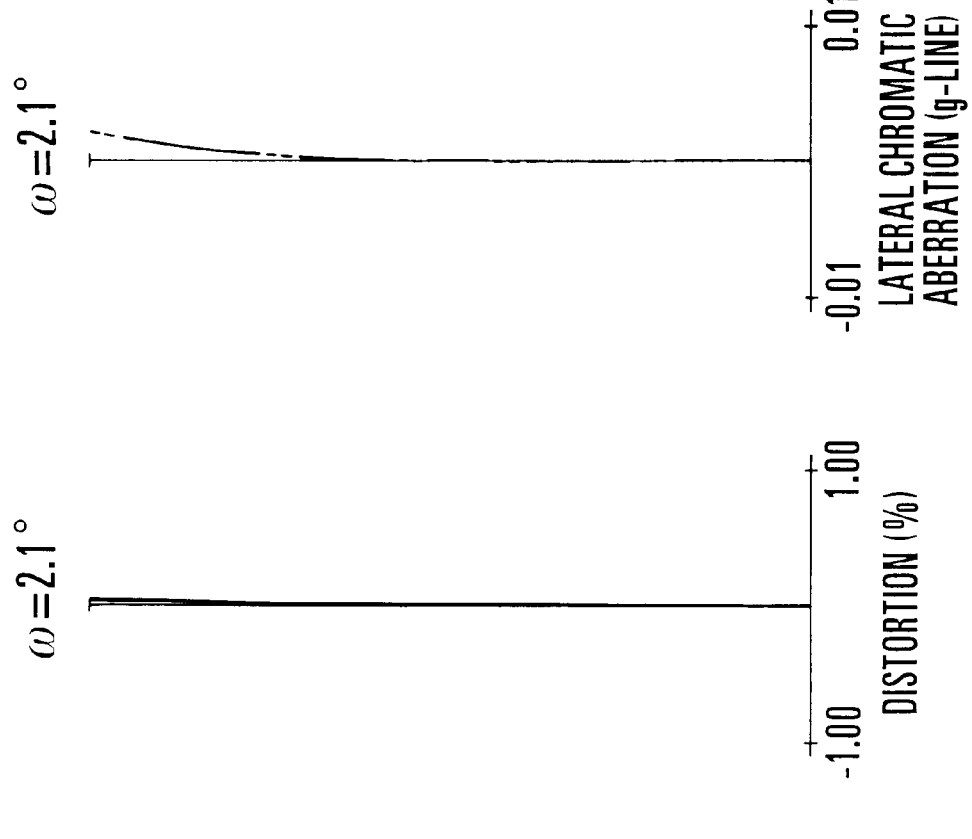

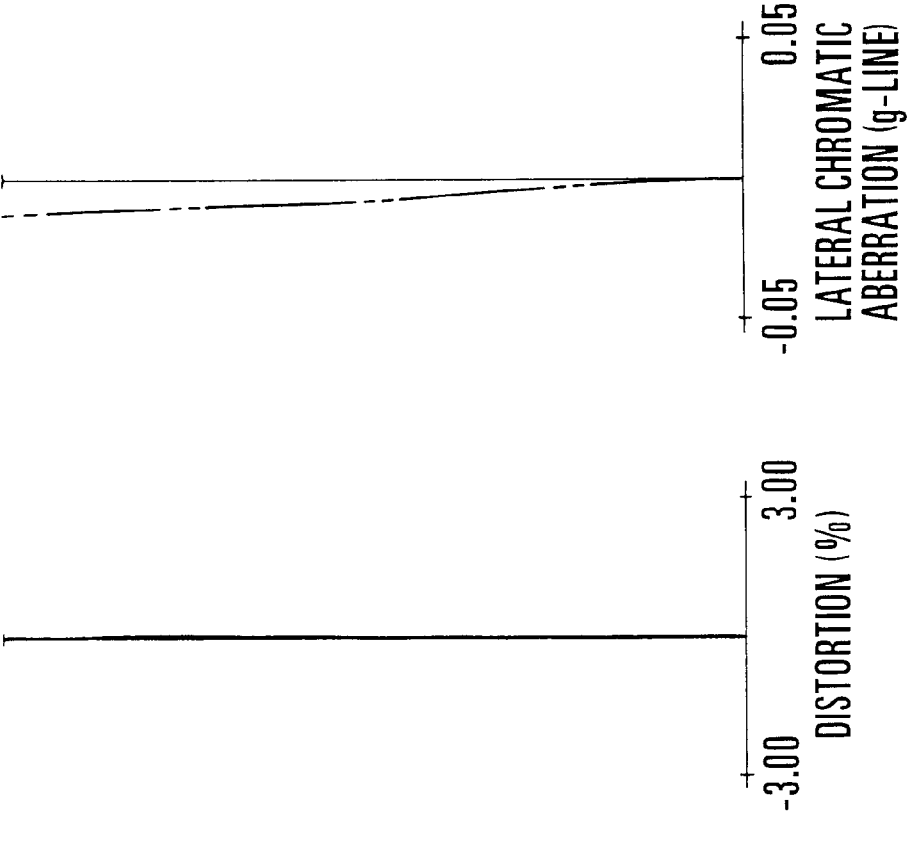

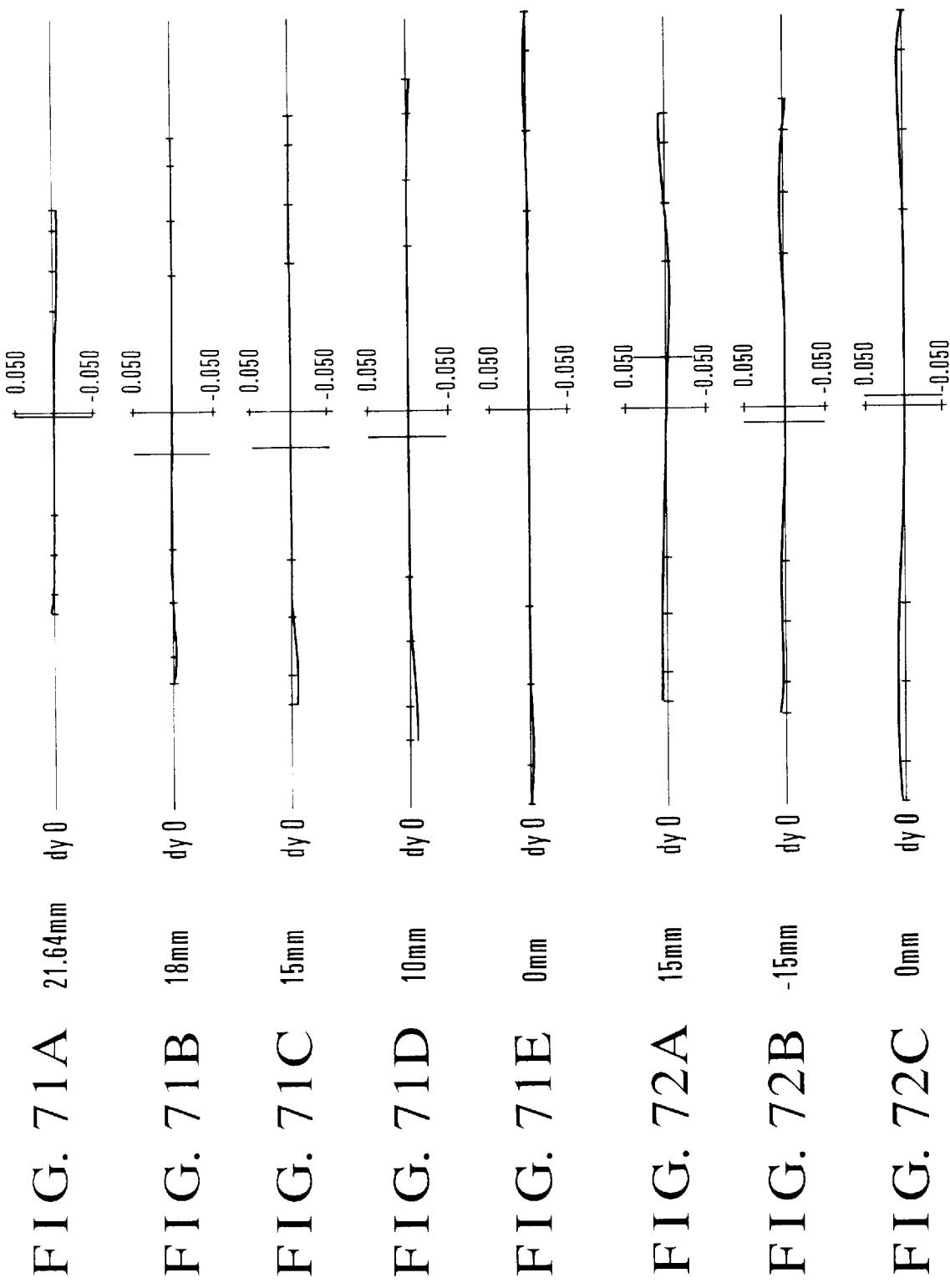

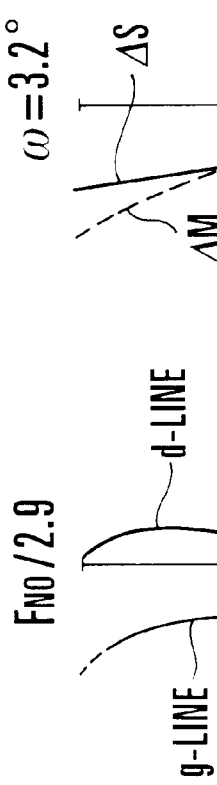

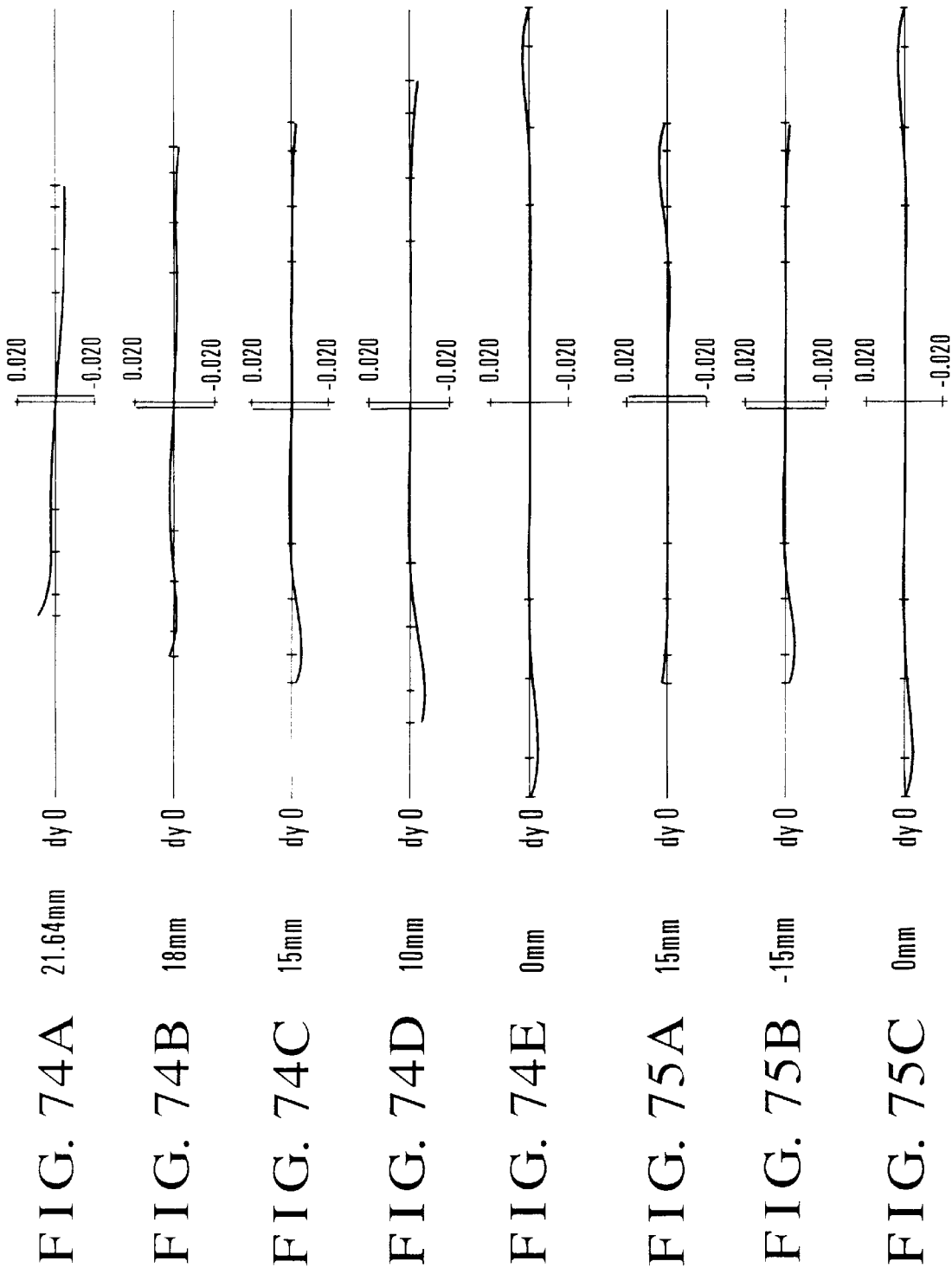

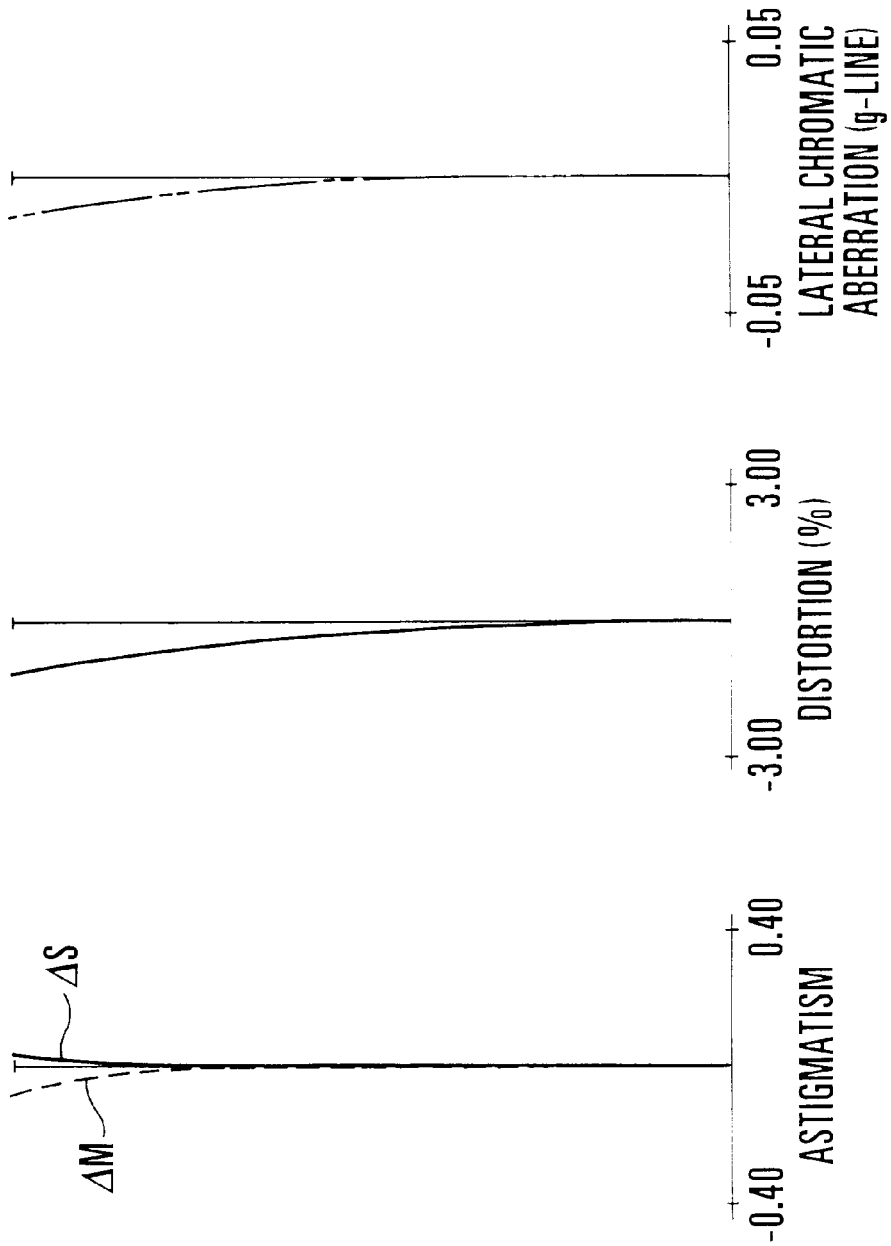

FIG. 77A  21.64mm
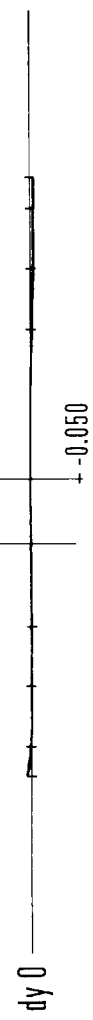
FIG. 77B  18mm
FIG. 77C  15mm
FIG. 77D  10mm
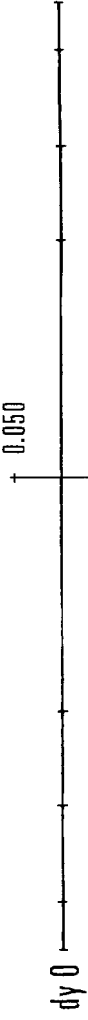
FIG. 77E  0mm
FIG. 78A  15mm
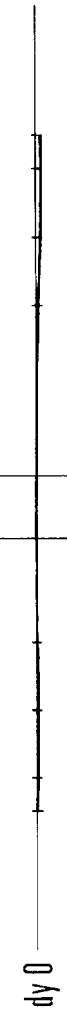
FIG. 78B  -15mm
FIG. 78C  0mm

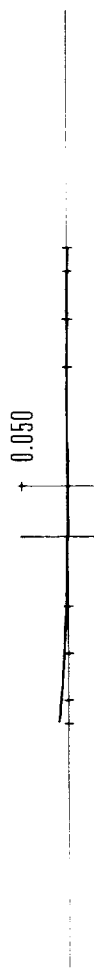
FIG. 80A 21.64mm
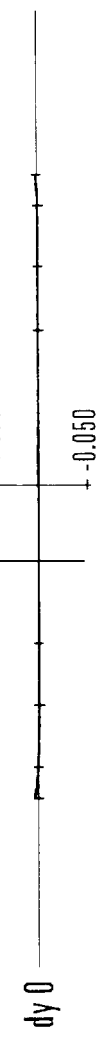
FIG. 80B 18mm
FIG. 80C 15mm
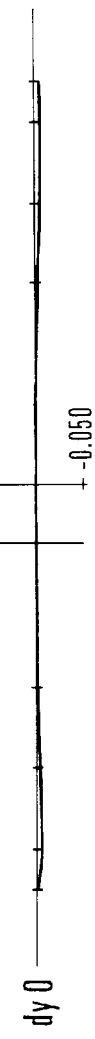
FIG. 80D 10mm
FIG. 80E 0mm
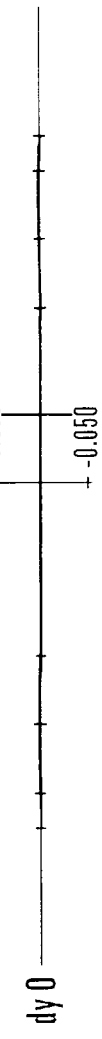
FIG. 81A 15mm
FIG. 81B -15mm
FIG. 81C 0mm

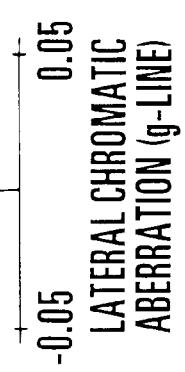

FIG. 82A  FIG. 82B  FIG. 82C  FIG. 82D

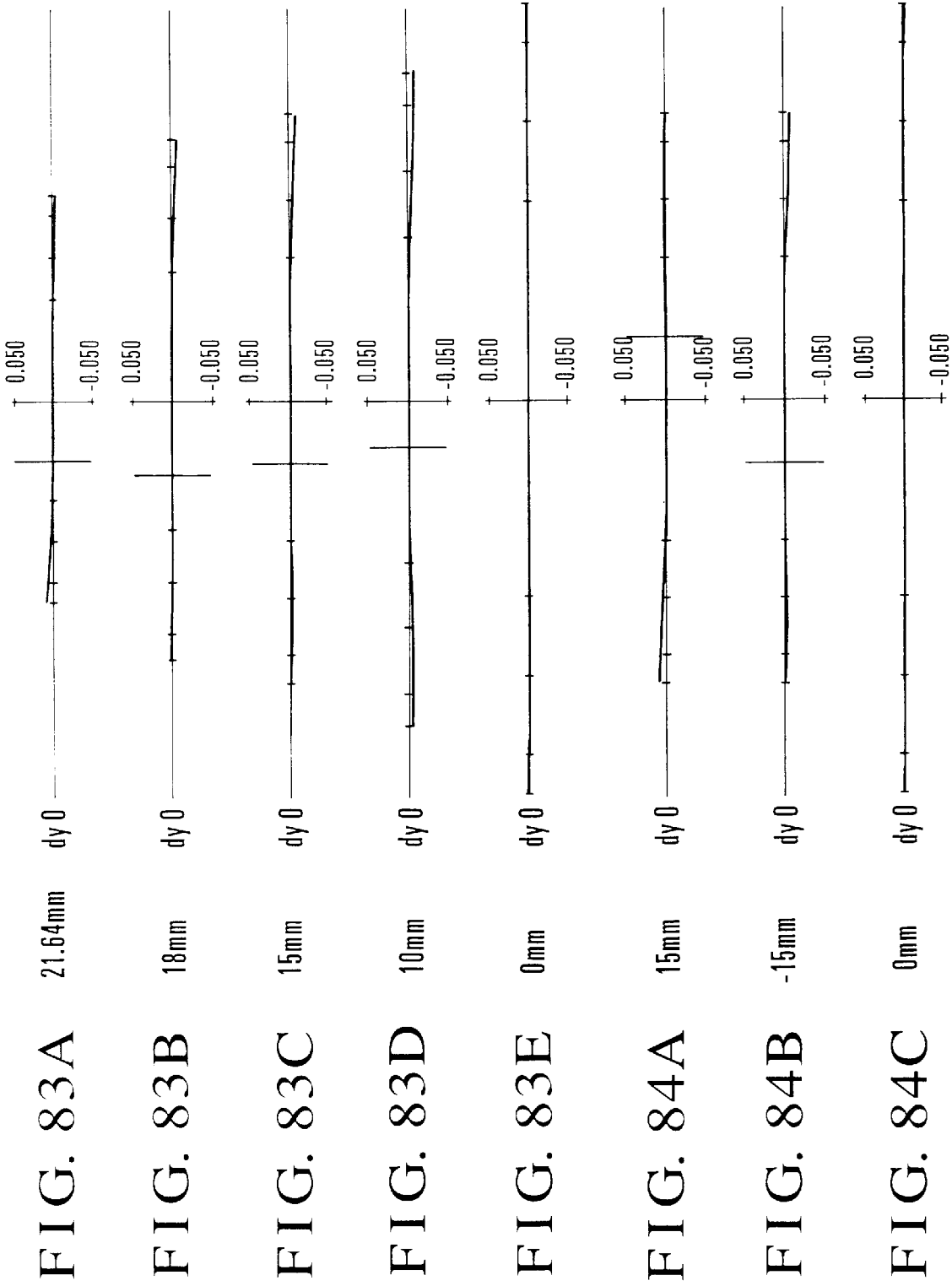

OPTICAL SYSTEM AND OPTICAL APPARATUS HAVING THE SAME

BACKGROUND OF THE INVENTION

1. Field of the Invention

The present invention relates to optical systems of the inner focus type suited to cameras for film, video cameras, video still cameras or the like.

2. Description of Related Art

It has been known to provide a lens type suited to the optical systems of long focal lengths, comprising, in order from an object side, a first lens unit of positive refractive power and a second lens unit of negative refractive power, or the so-called "telephoto" type. This lens type is advantageous at removing, in particular, spherical aberration and securing a fast F-number.

In, for example, Japanese Laid-Open Patent Applications No. Hei 5-27163, No. Hei 5-27164, No. Hei 6-242371, No. Hei 9-159911 and No. Hei 9-203859, the use of the telephoto type in optical systems has been proposed.

For many photographic lenses (optical systems,) focusing is performed by moving either the entirety of the complete lens, or one of the constituent lenses. In the case of long-focal-length lenses or telephoto lenses, because of their having bodies of large size and heavy weight, the former focusing method is hardly employed owing to the difficult problem of making up the operating mechanism.

For this reason, most of the telephoto lenses have the focusing provision made in one of the lens units. Of the lens units other than the front lens unit, a one in the central section is favorable for focusing purposes, because its size is relatively small and, moreover, because it is far light in weight. The use of this inner focus type has been proposed for various lenses.

For example, Japanese Laid-Open Patent Application No. Sho 55-147606 (U.S. Pat. No. 4,348,084) discloses a telephoto lens of the inner focus type having a focal length of 300 mm with an F-number of 2.8, and each of Japanese Laid-Open Patent Applications No. Sho 59-65820 and No. Sho 59-65821 discloses another telephoto lens of the inner focus type having a focal length of 135 mm with an F-number of 2.8.

The telephoto lenses of the inner focus type proposed in the above applications each comprise, in order from an object side, a first lens unit of positive refractive power, a second lens unit of negative refractive power and a third lens unit of positive refractive power, totaling three lens units, wherein the second lens unit is made axially movable for focusing.

Meanwhile, in shooting with the long-focal-length photographic system (optical system), it is generally difficult to suppress the influence of the vibrations of the photographic system. When the photographic system tilts due to the vibrations, the image on the focal plane changes its position out of alignment with a sight line, depending on the tilt angle and the focal length of the photographic system. Therefore, the photographic apparatus for taking still pictures suffers a problem of preventing the image quality from deteriorating by decreasing the exposure time to much short values. The motion-picture taking apparatus, too, encounters a difficult problem of keeping the composition at a desired setting. In such photographic situations, therefore, it becomes necessary to compensate for the tilting of the photographic system due to the vibrations so that the image on the focal plane remains stationary in alignment with the line of sight, that is, the so-called "shake" of the image does not occur.

There have been many methods of compensating for the shake of the image on the focal plane. For example, in the video cameras, the image pickup element is given a larger effective area than the necessary image frame and the image shake is electrically compensated for. Such an electric compensation method is widely employed in the video cameras.

In Japanese Laid-Open Patent Application No. Sho 61-223819, there is disclosed a photographic system in which a refractive-type variable angle prism is disposed at the frontmost position thereof. When the photographic system vibrates, the vertical angle of the variable angle prism is changed correspondingly with the vibration of the photographic system, so that an image is deflected so as to stabilize the image.

Another method of compensating for the shake of the image by moving a certain lens unit (movable lens unit) of an optical system in directions perpendicular to the optical axis was proposed in, for example, Japanese Laid-Open Patent Applications No. Sho 50-80147, No. Sho 61-223819, No. Hei 7-270724 (U.S. Pat. No. 5,646,779) and No. Hei 8-201691.

With such an optical system, if the relative aperture is increased (or if the F-number is made faster), the front lens unit becomes larger accordingly. As is well known, the F-number of the optical system is defined by $$Fno = f/D$$

where Fno: the F-number, f: the focal length of the optical system, and

D: the diameter of an effective light beam coming from an object point at infinity on the optical axis.

Accordingly, the large-relative-aperture telephoto lens (whose focal length is long) gets a large diameter for the equivalent F-number in direct proportion to the focal length. As the diameter of the front lens unit increases, the weight of the optical system increases rapidly. So, this tendency has been seen as problematic. Particularly for the photographic camera using 35 mm film, in the case of exceeding f=400 mm (semi-angle of field ω=3.1°), or in the case of the so-called "super" telephoto lens, this problem is very serious. In the locations where the tripod cannot be used, the hand-held shooting gives the photographer a heavy burden, becoming a cause of the image shake and an obstacle to the long-time shooting.

The method of compensating for the shake of the image by decentering a certain movable lens unit of the optical system so as to displace the image position is amenable to the techniques of minimizing the size of the apparatus by selecting a suitable one of the lens units for the movable lens unit.

However, the use of this method leads to taking into account two prerequisites, one of which is to properly select or arrange a lens unit of small size and light weight so that a lesser decentering movement produces a greater effect of displacing the image position, and the other of which is to prevent the image quality from deteriorating as far as possible, as that lens unit, when being decentered, produces aberrations. In general, it is very difficult to balance these conditions.

Meanwhile, the inner focus type, because of its using a lens unit of small size and light weight as the focusing lens, has merits that the management is easy, that a fast speed operation becomes possible, and that the holding is easy to keep, because the center of gravity of the whole lens system little changes between when focused on an infinitely distant object and when focused on an object at the minimum distance.

On the other hand, the use of the inner focus type in the telephoto lens of fast F-number increases the range of variation of aberrations with focusing. This variation of aberrations, because of being difficult to correct well, comes to a cause of lowering the optical performance.

BRIEF SUMMARY OF THE INVENTION

The present invention is concerned with the image stabilizing function in the optical system which makes one lens unit movable to decenter in directions perpendicular to an optical axis. With this regard, an object of the invention is to provide an optical system which can manifest the image stabilizing function, while still permitting the decentering aberrations to be as far suppressed as possible.

The present invention is concerned also with the inner focus type. Another object of the invention is, therefore, to provide an optical system which suppresses the variation with focusing of aberrations as far as possible over a wide range of object distances.

To attain the former object, in accordance with an aspect of the invention, there is provided an optical system, which comprises, in order from an object side, a first lens unit of positive refractive power, a second lens unit of negative refractive power, the second lens unit being movable along an optical axis to effect focusing, and a third lens unit of positive refractive power, the third lens unit including, in order from the object side, a first lens subunit of positive refractive power, a second lens subunit of negative refractive power and a third lens subunit of positive refractive power, wherein the second lens subunit is movable in directions perpendicular to the optical axis to displace an image formed by the optical system.

To attain the latter object, in accordance with another aspect of the invention, there is provided an optical system, which comprises, in order from an object side, a first lens unit of positive refractive power, the first lens unit consisting of, with boundaries formed by the widest and the second-widest spaces thereof, in order from the object side, a front lens subunit of positive refractive power, a middle lens subunit of negative refractive power and a rear lens subunit of positive refractive power, and a second lens unit of negative refractive power, the second lens unit being movable along an optical axis to effect focusing, wherein, letting a focal length of the entire optical system be denoted by f, a focal length of the front lens subunit be denoted by f1a, and a space between the front lens subunit and the rear lens subunit be denoted by D1ab, the following conditions are satisfied:

$0.4 < f1a/f < 1.1$ $0.035 < D1ab/f < 0.15.$

These and further objects and aspects of the invention will become apparent from the following detailed description of preferred embodiments thereof taken in conjunction with the accompanying drawings.

BRIEF DESCRIPTION OF THE SEVERAL VIEWS OF THE DRAWING

FIGS. 17A to 17D are graphic representations of the longitudinal aberrations of the numerical example 1 in the normal state (with the image position unchanged).

FIGS. 20A to 20D are graphic representations of the longitudinal aberrations of the numerical example 2 in the normal state (with the image position unchanged).

FIGS. 23A to 23D are graphic representations of the longitudinal aberrations of the numerical example 3 in the normal state (with the image position unchanged).

FIGS. 26A to 26D are graphic representations of the longitudinal aberrations of the numerical example 4 in the normal state (with the image position unchanged).

FIGS. 32A to 32D are graphic representations of the longitudinal aberrations of the numerical example 6 in the normal state (with the image position unchanged).

FIGS. 35A to 35D are graphic representations of the longitudinal aberrations of the numerical example 7 in the normal state (with the image position unchanged).

FIGS. 38A to 38D are graphic representations of the longitudinal aberrations of the numerical example 8 in the normal state (with the image position unchanged).

FIGS. 41A to 41D are graphic representations of the longitudinal aberrations of the numerical example 9 in the normal state (with the image position unchanged).

FIGS. 50A to 50D are graphic representations of the longitudinal aberrations of the numerical example 12 in the normal state (with the image position unchanged).

FIGS. 53A to 53D are graphic representations of the longitudinal aberrations of the numerical example 13 in the normal state (with the image position unchanged).

FIGS. 56A to 56D are graphic representations of the longitudinal aberrations of the numerical example 14 in the normal state (with the image position unchanged).

FIGS. 59A to 59D are graphic representations of the longitudinal aberrations of the numerical example 15 in the normal state (with the image position unchanged).

FIGS. 70A to 70D are graphic representations of the longitudinal aberrations of the numerical example 17 in the normal state (with the image position unchanged).

FIGS. 71A to 71E are graphic representations of the lateral aberrations of the numerical example 17 in the normal state (with the image position unchanged).

FIGS. 72A to 72C are graphic representations of the lateral aberrations of the numerical example 17 when the image of an infinitely distant object has displaced to a corresponding position to 0.5° in image angle.

FIGS. 73A to 73D are graphic representations of the longitudinal aberrations of the numerical example 18 in the normal state (with the image position unchanged).

FIGS. 74A to 74E are graphic representations of the lateral aberrations of the numerical example 18 in the normal state (with the image position unchanged).

FIGS. 75A to 75C are graphic representations of the lateral aberrations of the numerical example 18 when the image of an infinitely distant object has displaced to a corresponding position to 0.5° in image angle.

FIGS. 76A to 76D are graphic representations of the longitudinal aberrations of the numerical example 19 in the normal state (with the image position unchanged).

FIGS. 77A to 77E are graphic representations of the lateral aberrations of the numerical example 19 in the normal state (with the image position unchanged).

FIGS. 78A to 78C are graphic representations of the lateral aberrations of the numerical example 19 when the image of an infinitely distant object has displaced to a corresponding position to 0.5° in image angle.

FIGS. 79A to 79D are graphic representations of the longitudinal aberrations of the numerical example 20 in the normal state (with the image position unchanged).

FIGS. 80A to 80E are graphic representations of the lateral aberrations of the numerical example 20 in the normal state (with the image position unchanged).

FIGS. 81A to 81C are graphic representations of the lateral aberrations of the numerical example 20 when the image of an infinitely distant object has displaced to a corresponding position to 0.5° in image angle.

FIGS. 82A to 82D are graphic representations of the longitudinal aberrations of the numerical example 21 in the normal state (with the image position unchanged).

FIGS. 83A to 83E are graphic representations of the lateral aberrations of the numerical example 21 in the normal state (with the image position unchanged).

FIGS. 84A to 84C are graphic representations of the lateral aberrations of the numerical example 21 when the image of an infinitely distant object has displaced to a corresponding position to 0.5° in image angle.

DETAILED DESCRIPTION OF THE INVENTION

Figure 1:
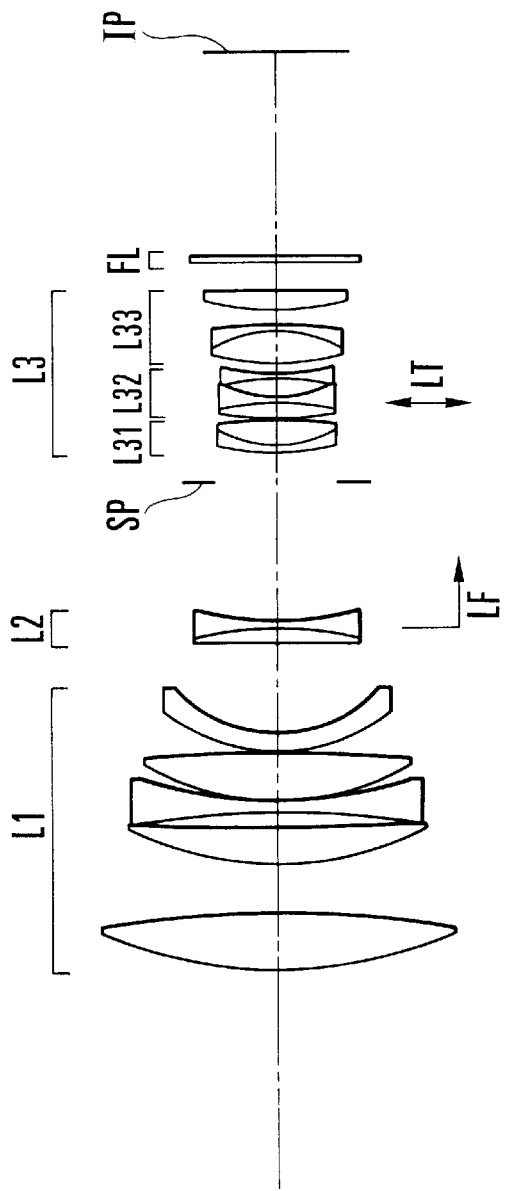
FIG. 1 is a longitudinal section view of a numerical example 1 of the lens.
Figure 2:
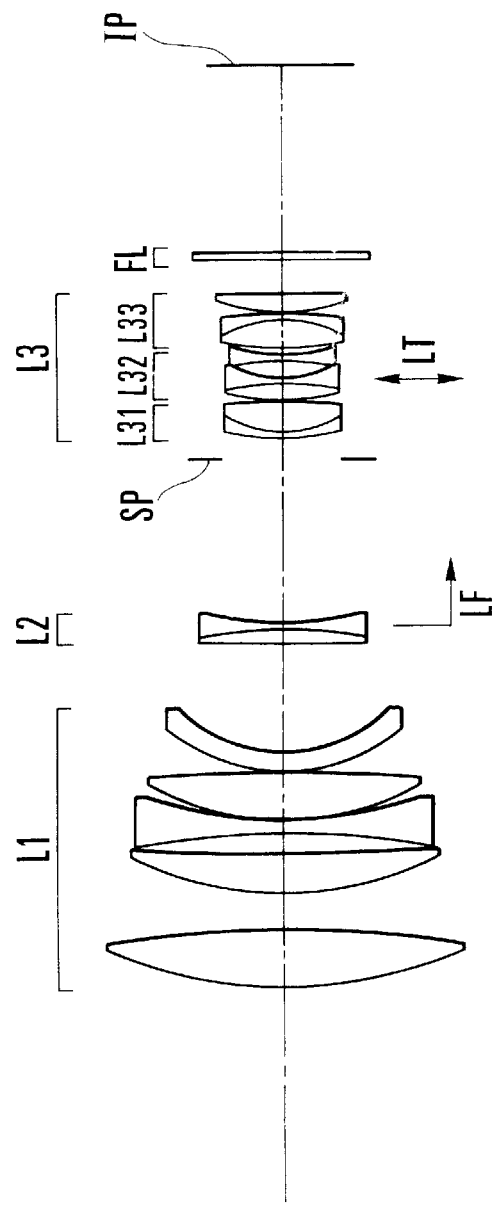
FIG. 2 is a longitudinal section view of a numerical example 2 of the lens.
Figure 3:
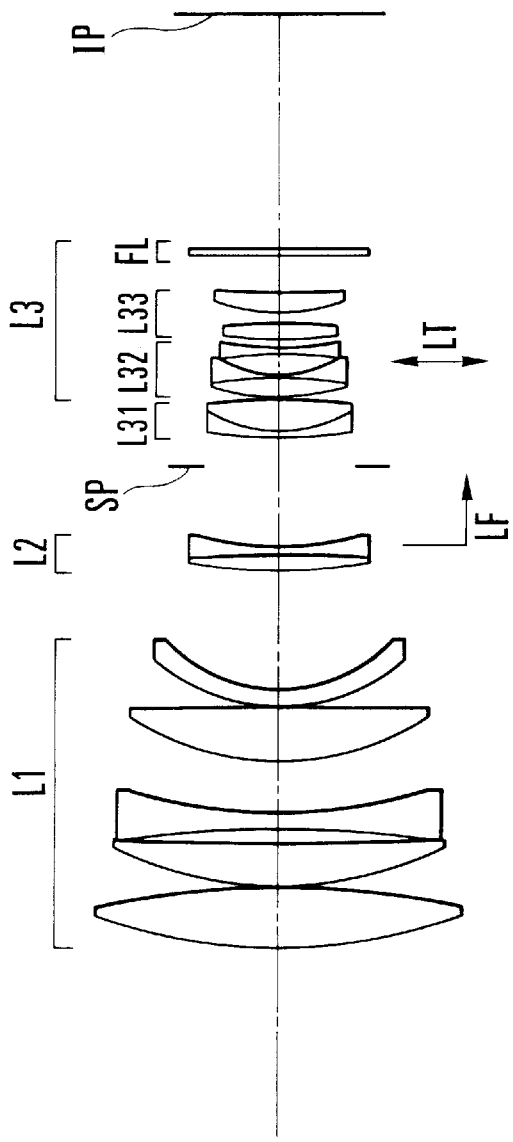
FIG. 3 is a longitudinal section view of a numerical example 3 of the lens.
Figure 4:
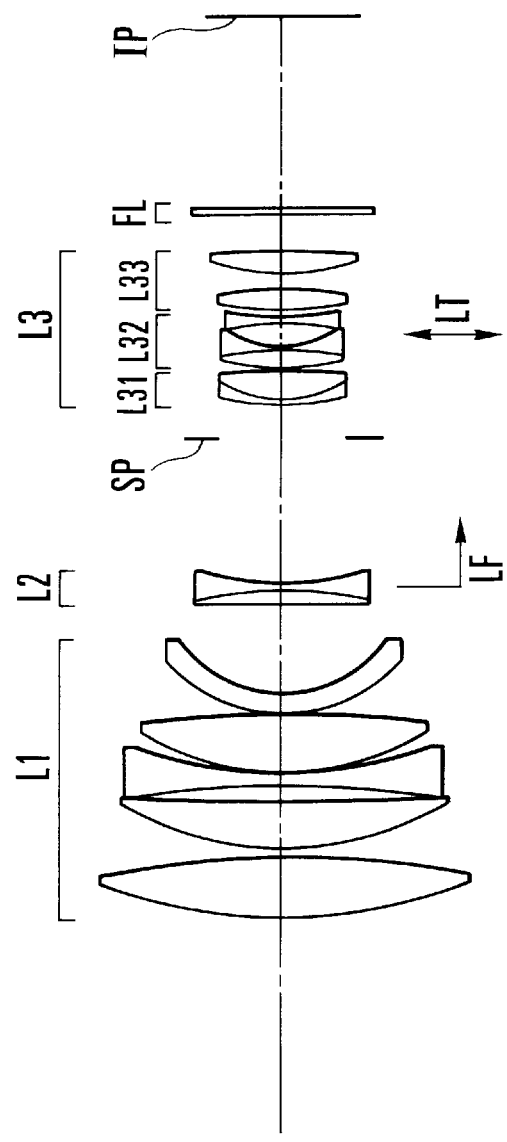
FIG. 4 is a longitudinal section view of a numerical example 4 of the lens.
Figure 5:
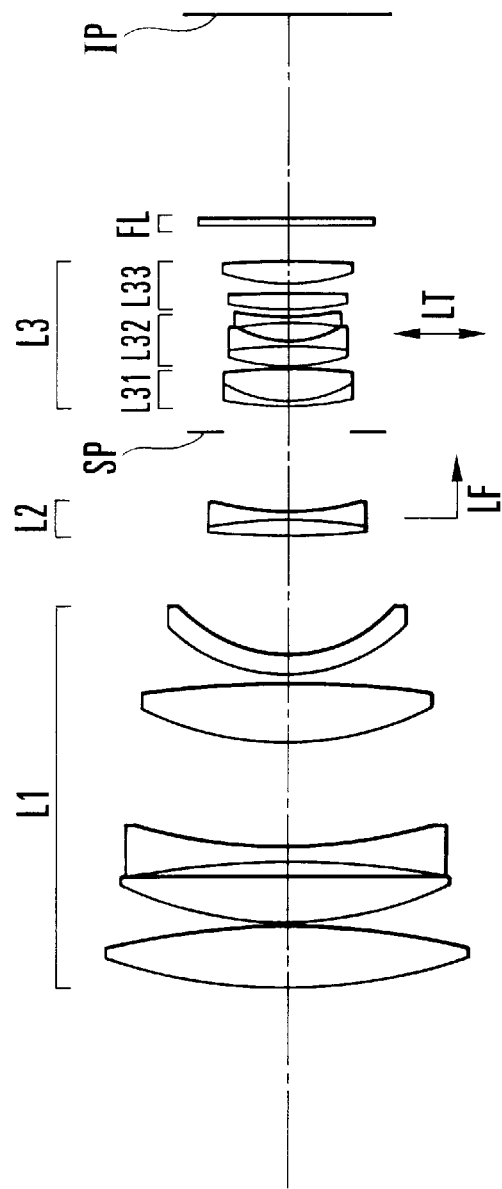
FIG. 5 is a longitudinal section view of a numerical example 5 of the lens.
Figure 6:
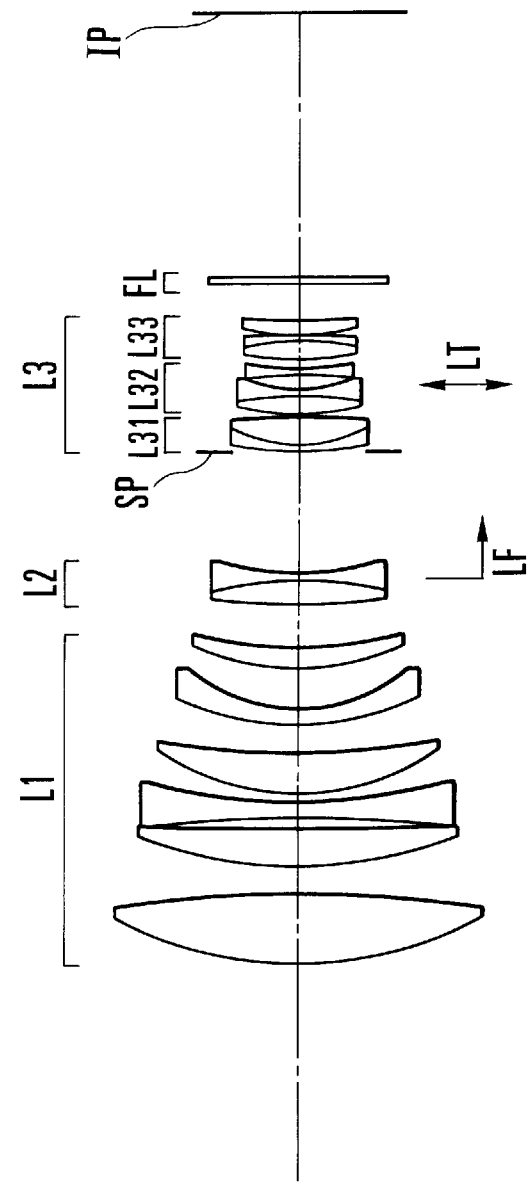
FIG. 6 is a longitudinal section view of a numerical example 6 of the lens.
Figure 7:
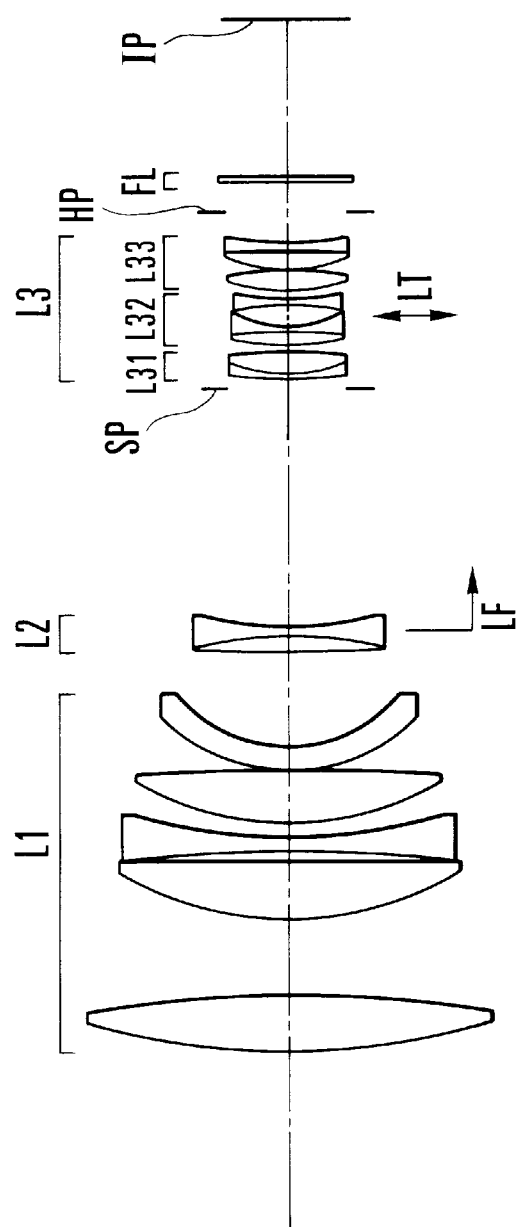
FIG. 7 is a longitudinal section view of a numerical example 7 of the lens.
Figure 8:
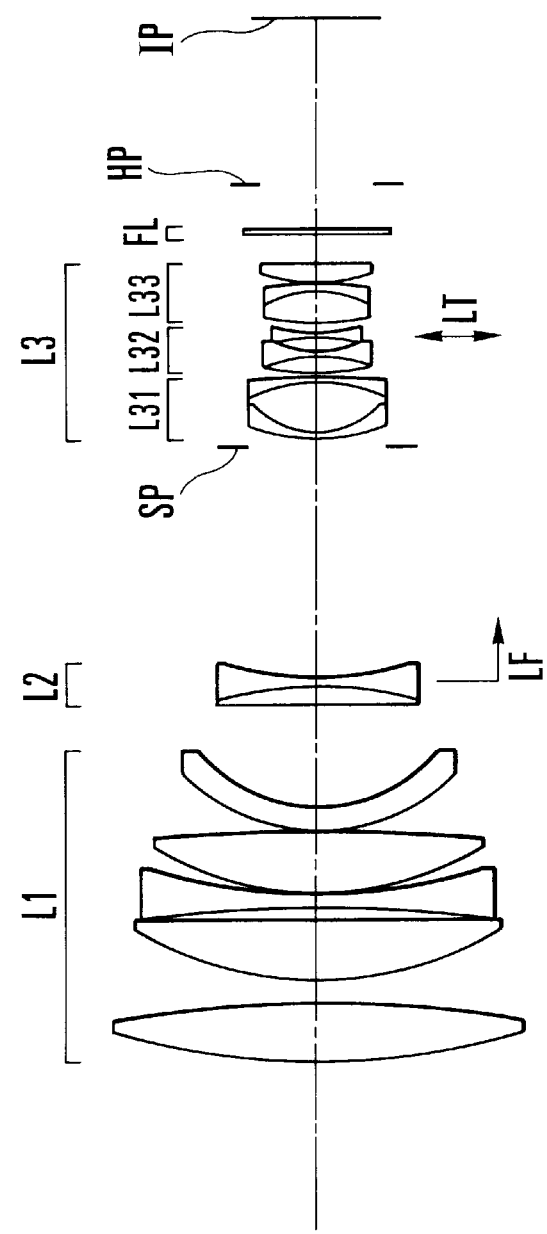
FIG. 8 is a longitudinal section view of a numerical example 8 of the lens.
Figure 9:
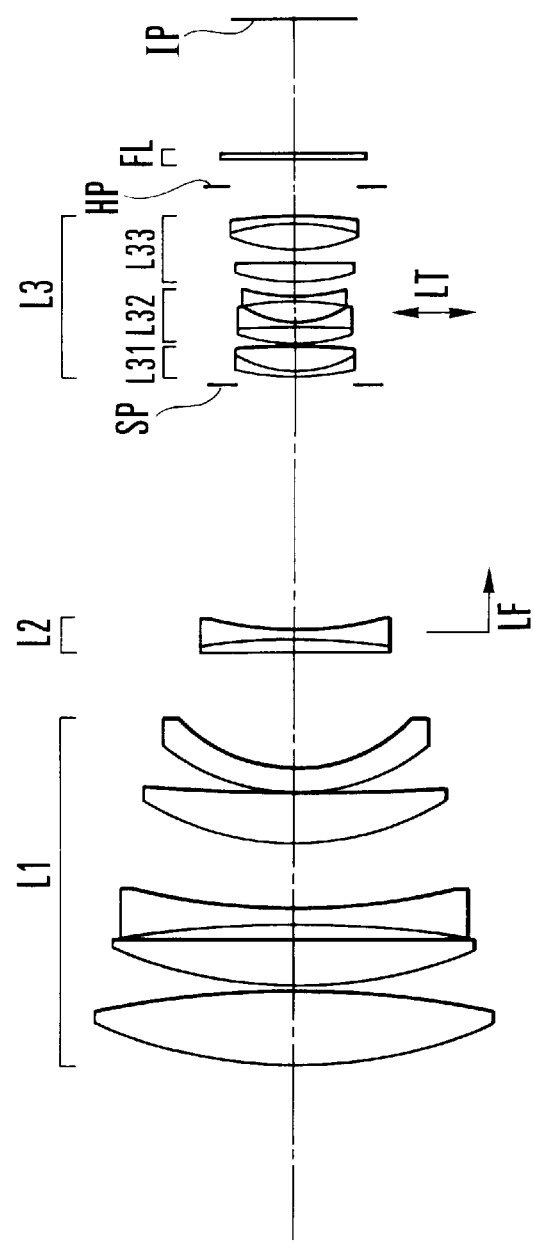
FIG. 9 is a longitudinal section view of a numerical example 9 of the lens.
Figure 10:
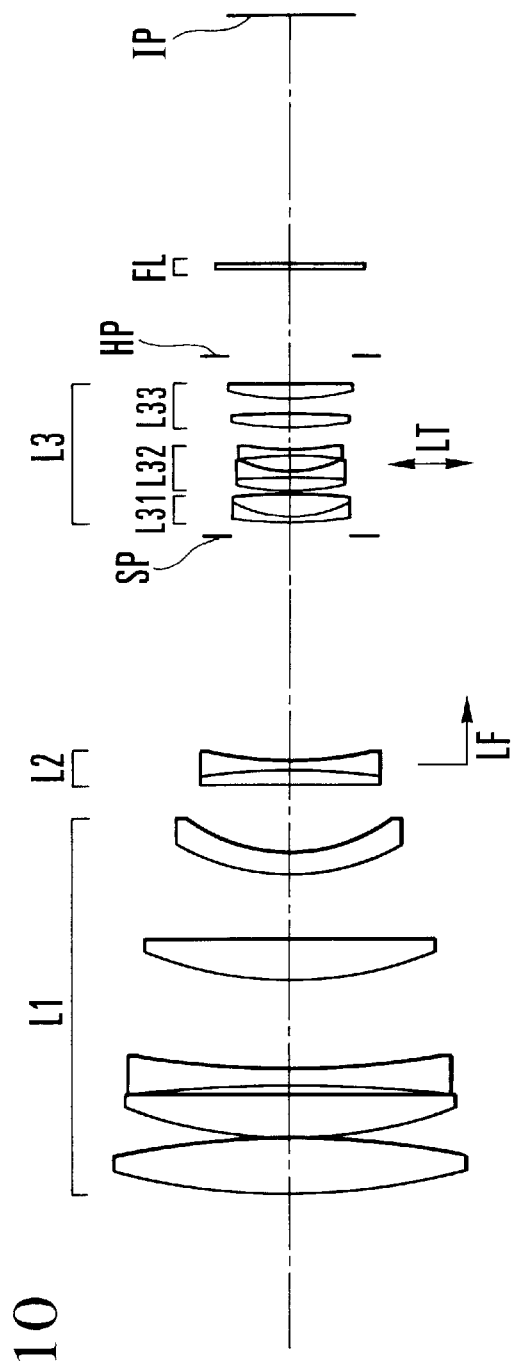
FIG. 10 is a longitudinal section view of a numerical example 10 of the lens.
Figure 11:
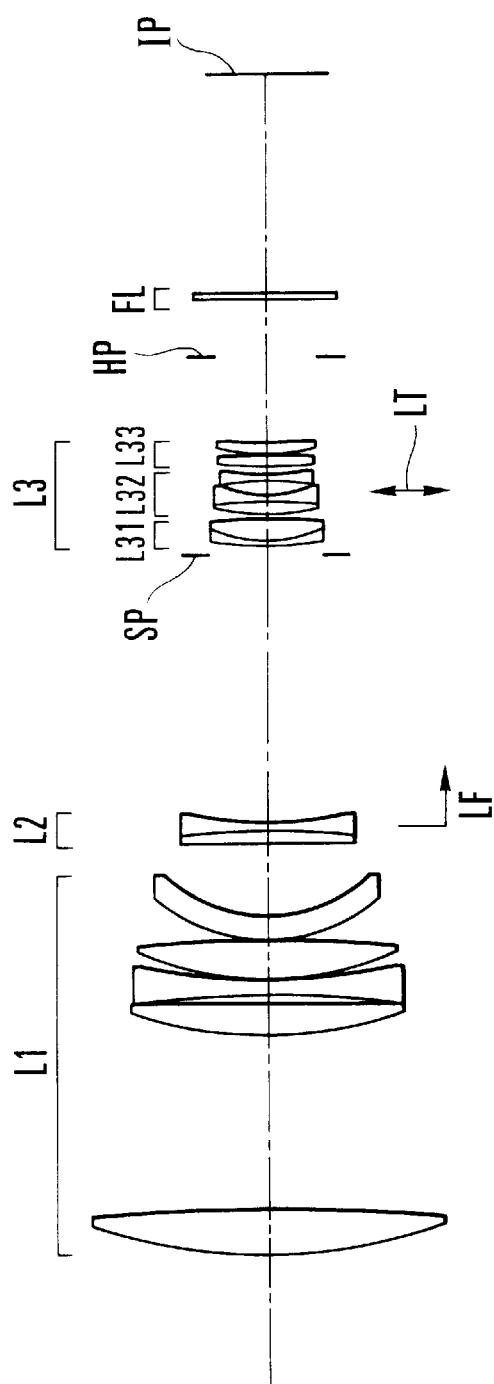
FIG. 11 is a longitudinal section view of a numerical example 11 of the lens.
Figure 12:
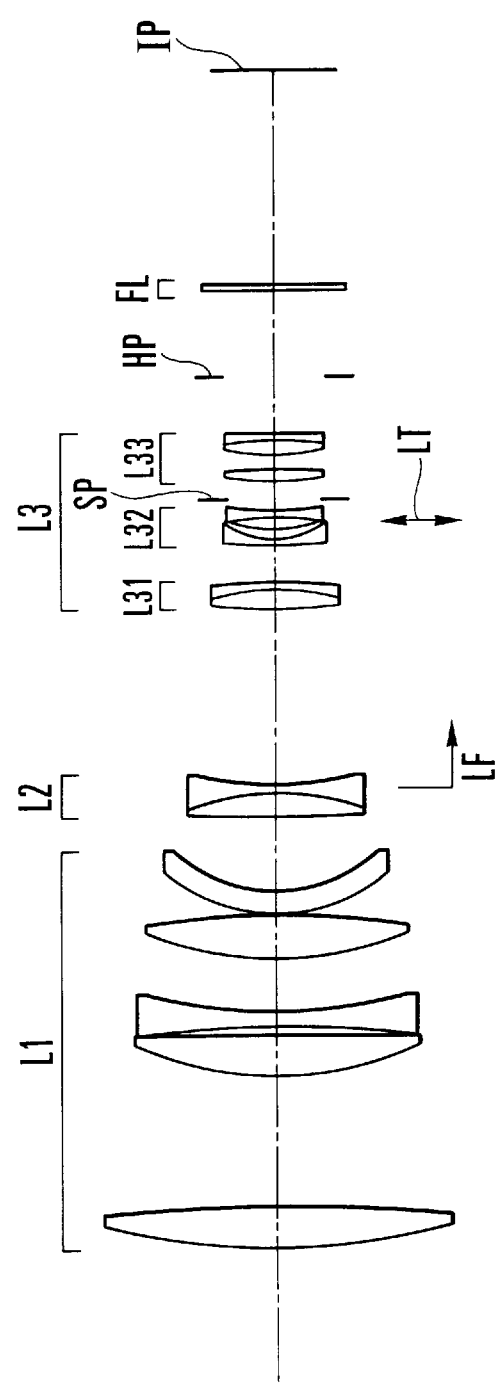
FIG. 12 is a longitudinal section view of a numerical example 12 of the lens.
Figure 13:
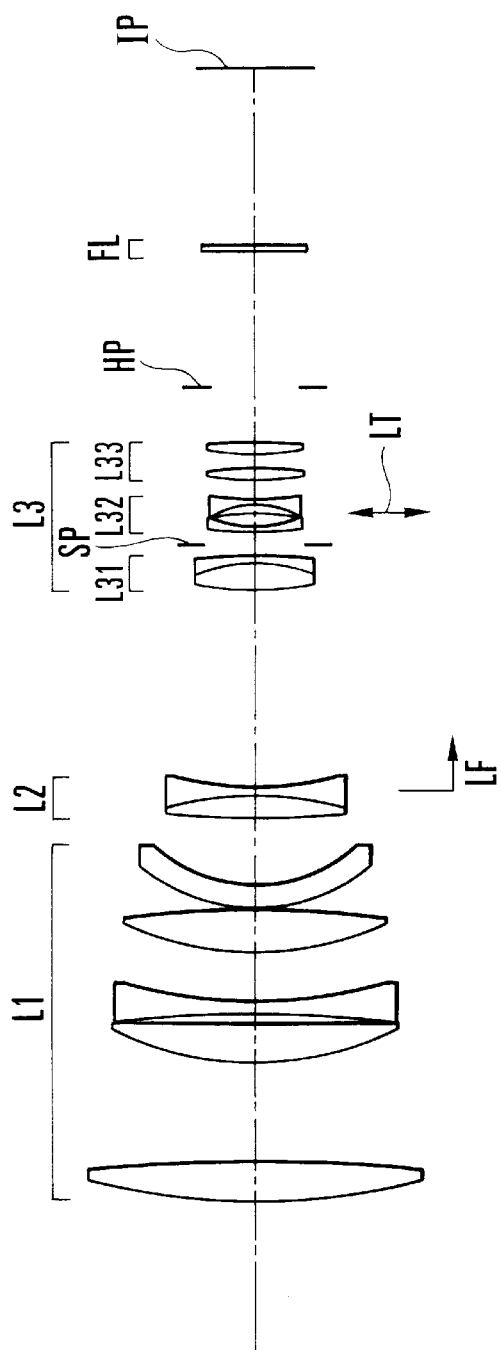
FIG. 13 is a longitudinal section view of a numerical example 13 of the lens.
Figure 14:
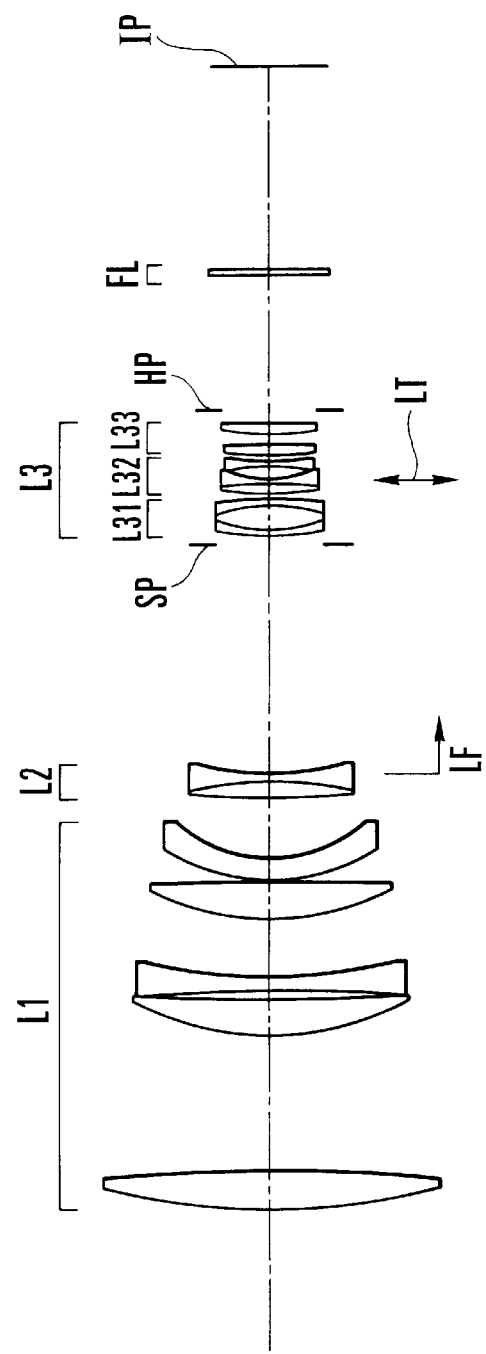
FIG. 14 is a longitudinal section view of a numerical example 14 of the lens.
Figure 15:
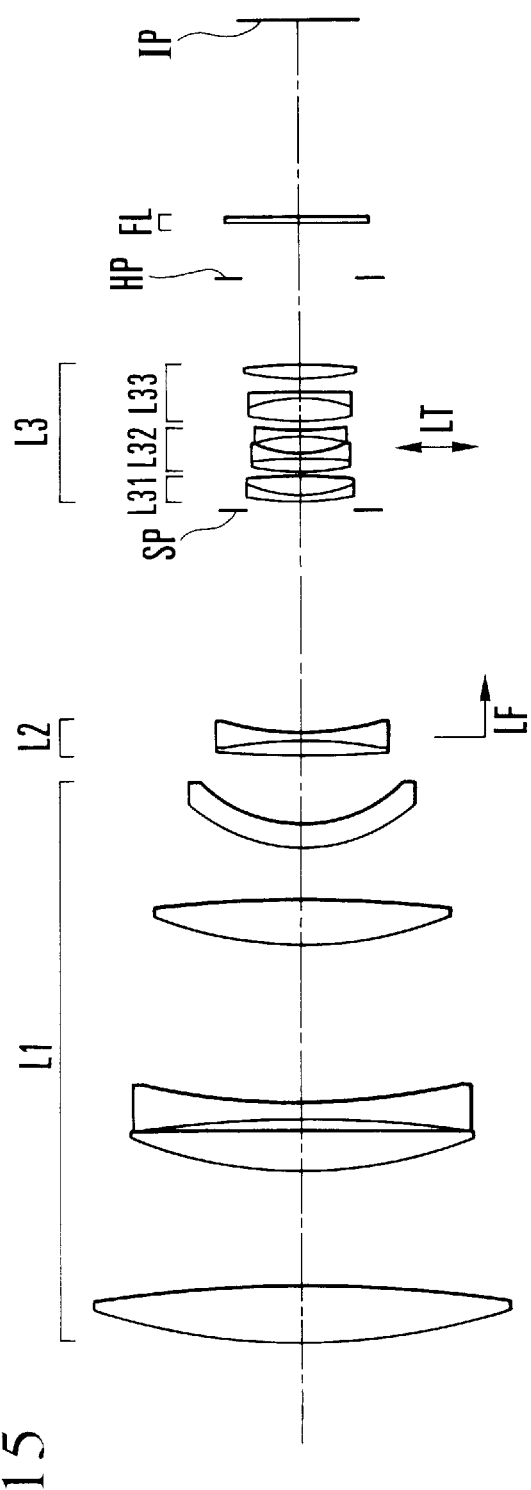
FIG. 15 is a longitudinal section view of a numerical example 15 of the lens.
Figure 16:
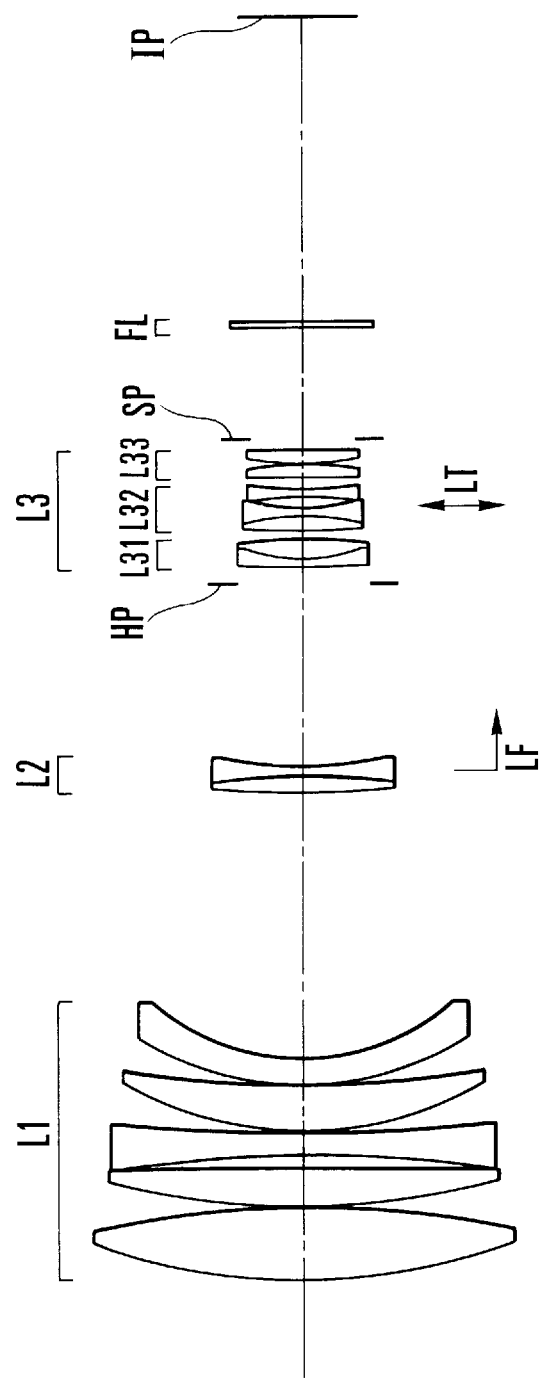
FIG. 16 is a longitudinal section view of a numerical example 16 of the lens.
Figure 18A:
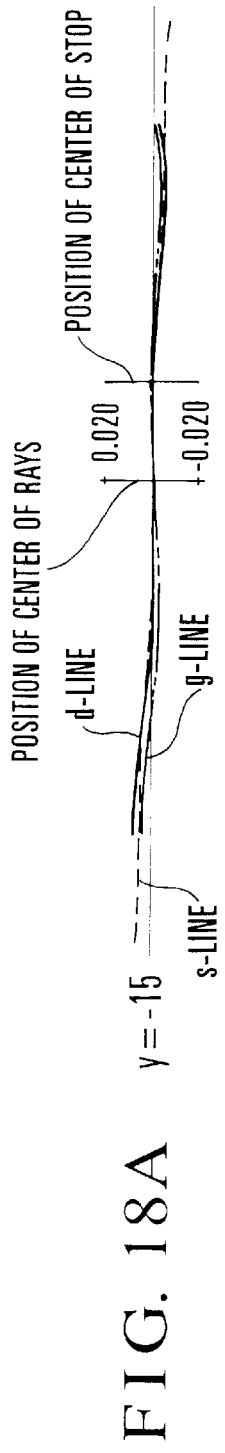
FIGS. 18A to 18C are graphic representations of the lateral aberrations of the numerical example 1 in the normal state (with the image position unchanged).
Figure 18B:
Figure 18C:
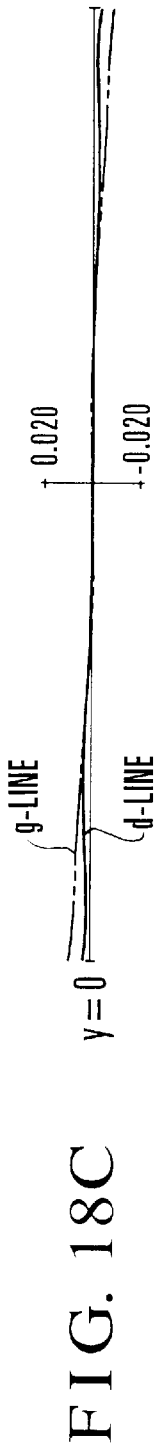
Figure 19A:
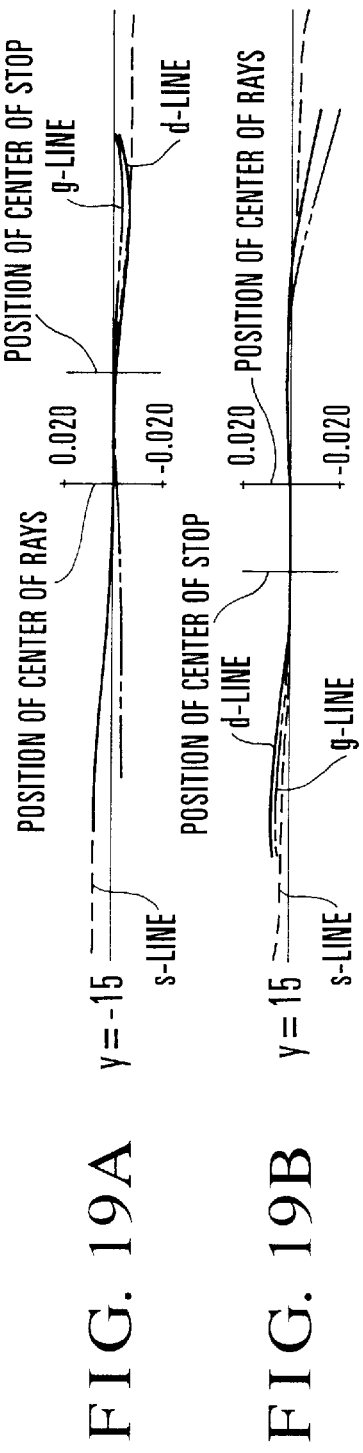
FIGS. 19A to 19C are graphic representations of the lateral aberrations of the numerical example 1 when the image of an infinitely distant object has displaced to a corresponding position to 0.3° in image angle.
Figure 19B:
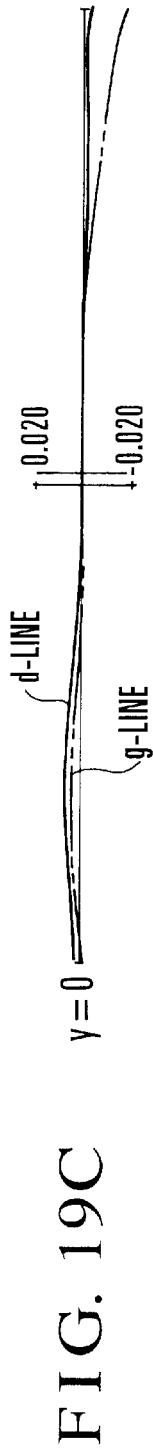
Figure 19C:
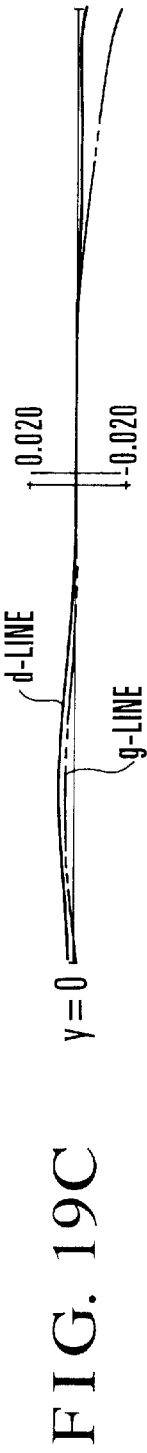
Figure 21A:
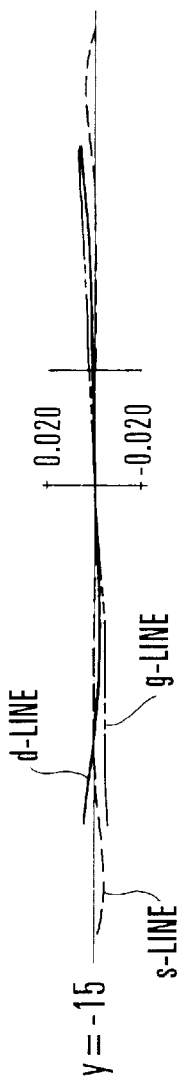
FIGS. 21A to 21C are graphic representations of the lateral aberrations of the numerical example 2 in the normal state (with the image position unchanged).
Figure 21B:
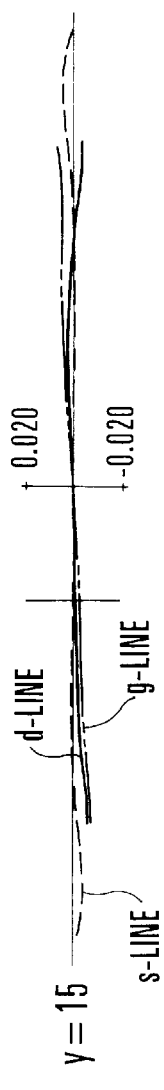
Figure 21C:
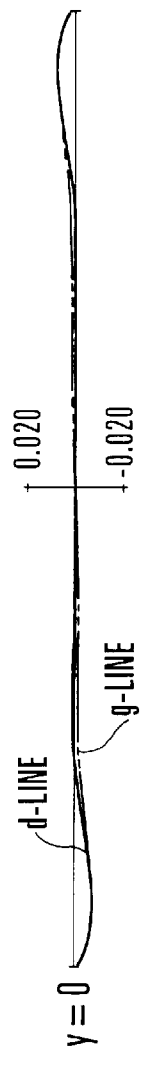
Figure 22A:
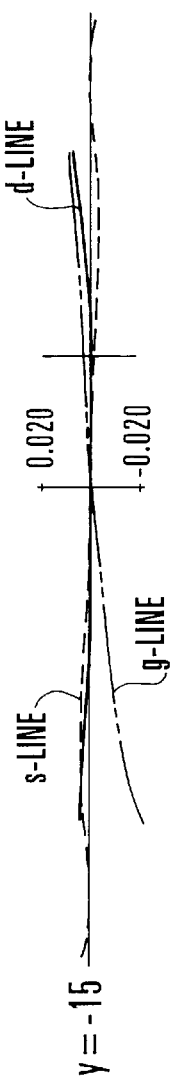
FIGS. 22A to 22C are graphic representations of the lateral aberrations of the numerical example 2 when the image of an infinitely distant object has displaced to a corresponding position to 0.3° in image angle.
Figure 22B:
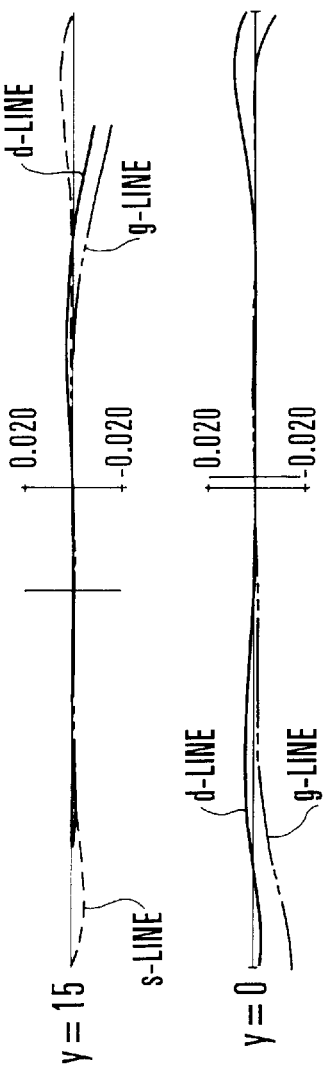
Figure 22C:
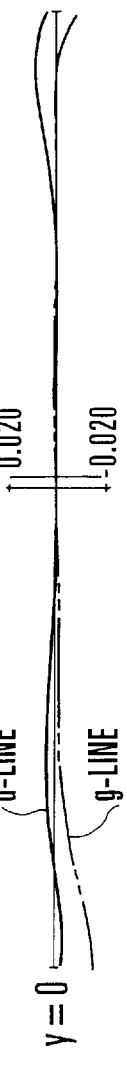
Figure 24A:
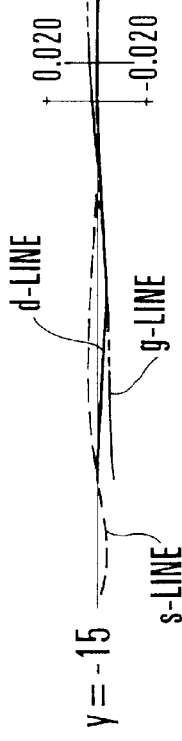
FIGS. 24A to 24C are graphic representations of the lateral aberrations of the numerical example 3 in the normal state (with the image position unchanged).
Figure 24B:
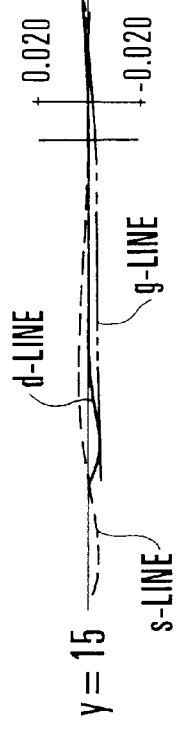
Figure 24C:
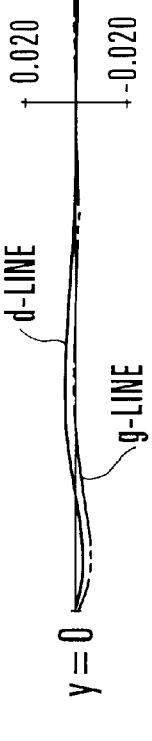
Figure 25A:
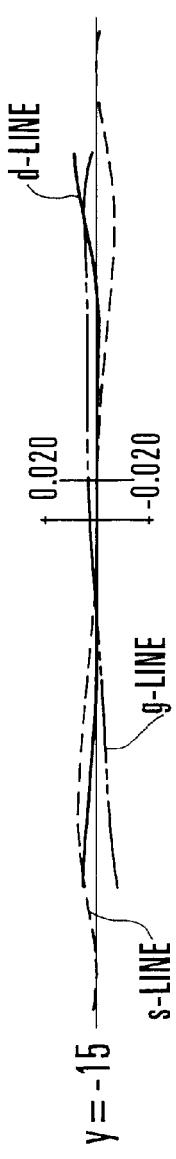
FIGS. 25A to 25C are graphic representations of the lateral aberrations of the numerical example 3 when the image of an infinitely distant object has displaced to a corresponding position to 0.3° in image angle.
Figure 25B:
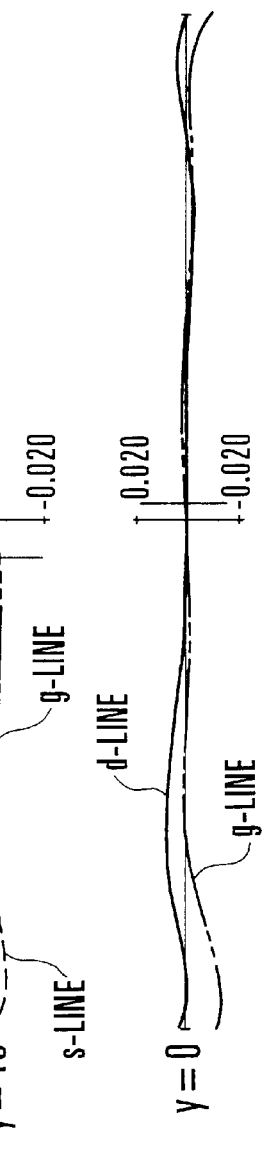
Figure 25C:
Figure 27A:
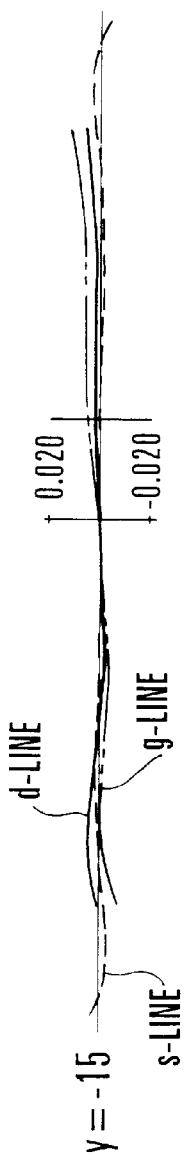
FIGS. 27A to 27C are graphic representations of the lateral aberrations of the numerical example 4 in the normal state (with the image position unchanged).
Figure 27B:
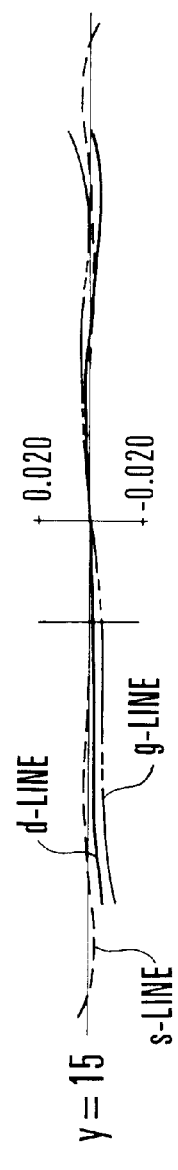
Figure 27C:
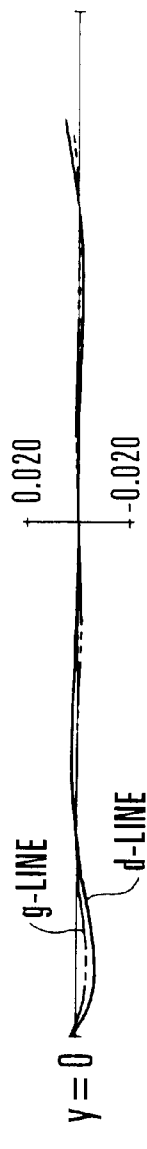
Figure 28A:
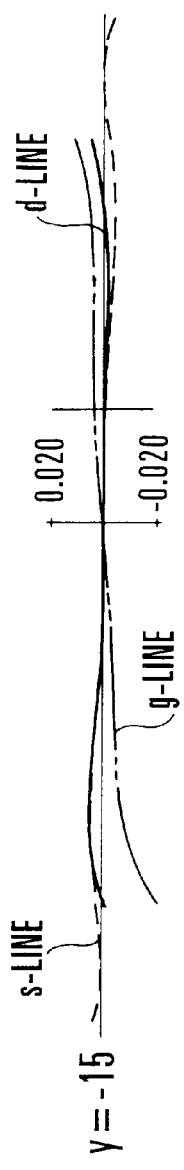
FIGS. 28A to 28C are graphic representations of the lateral aberrations of the numerical example 4 when the image of an infinitely distant object has displaced to a corresponding position to 0.3° in image angle.
Figure 28B:
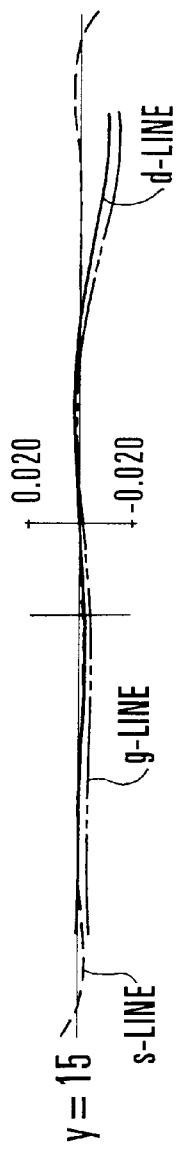
Figure 28C:
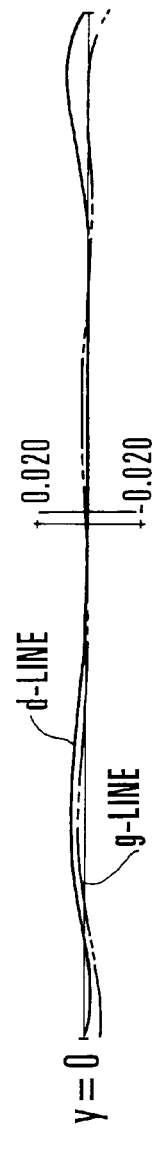
Figure 29A:
FIGS. 29A to 29D are graphic representations of the longitudinal aberrations of the numerical example 5 in the normal state (with the image position unchanged).
Figure 29B:
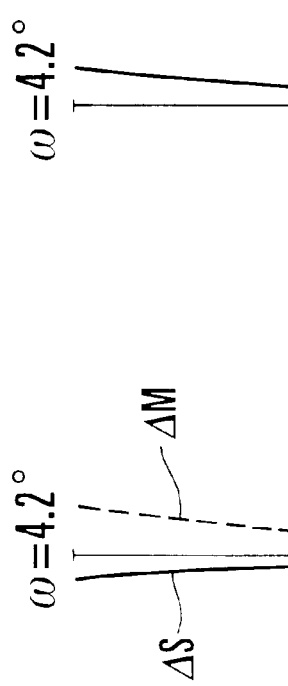
Figure 29C:
Figure 29D:
Figure 30A:
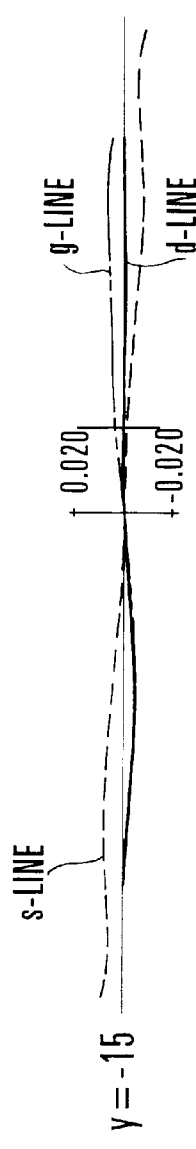
FIGS. 30A to 30C are graphic representations of the lateral aberrations of the numerical example 5 in the normal state (with the image position unchanged).
Figure 30B:
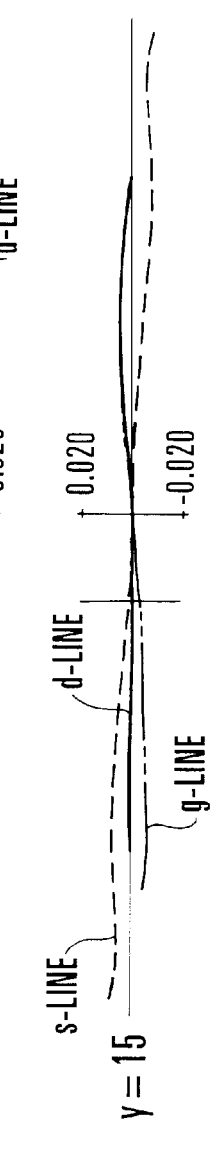
Figure 30C:
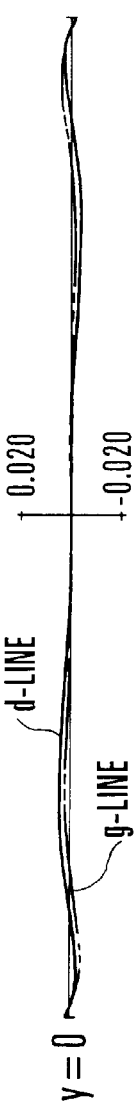
Figure 31A:
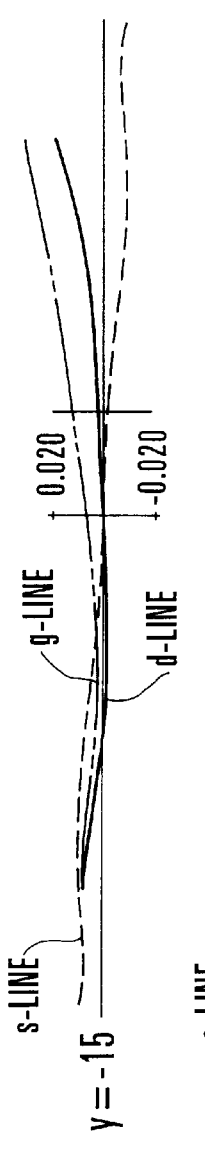
FIGS. 31A to 31C are graphic representations of the lateral aberrations of the numerical example 5 when the image of an infinitely distant object has displaced to a corresponding position to 0.3° in image angle.
Figure 31B:
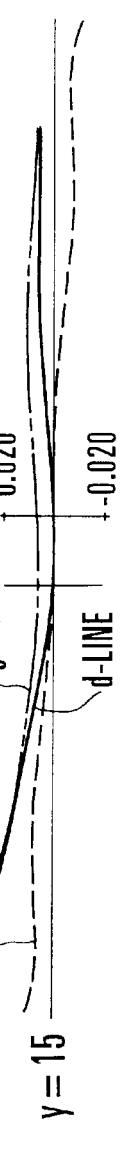
Figure 31C:
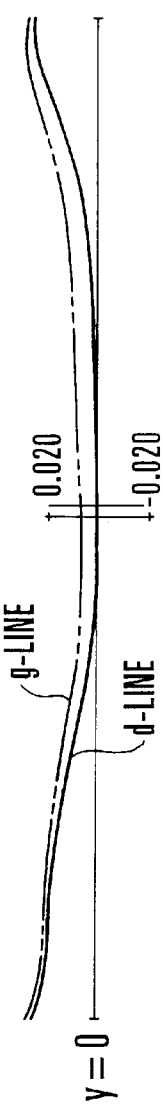
Figure 33A:
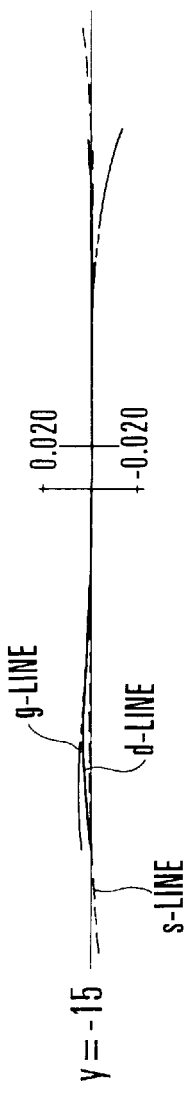
FIGS. 33A to 33C are graphic representations of the lateral aberrations of the numerical example 6 in the normal state (with the image position unchanged).
Figure 33B:
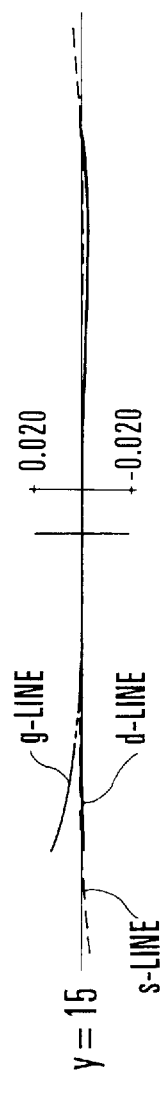
Figure 33C:
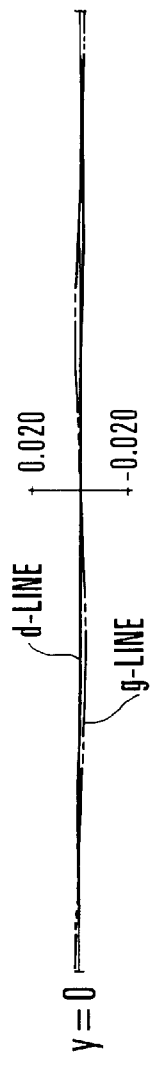
Figure 34A:
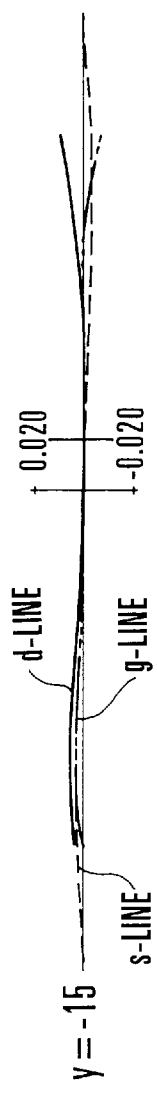
FIGS. 34A to 34C are graphic representations of the lateral aberrations of the numerical example 6 when the image of an infinitely distant object has displaced to a corresponding position to 0.3° in image angle.
Figure 34B:
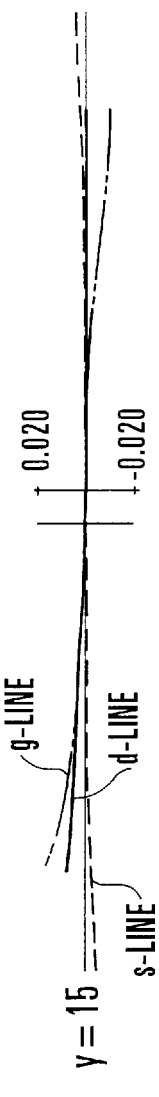
Figure 34C:
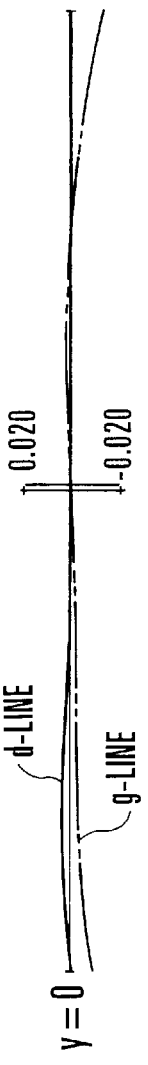
Figure 36A:
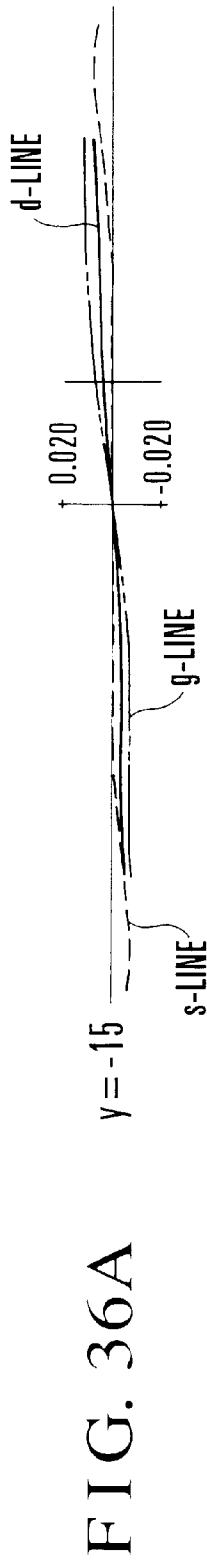
FIGS. 36A to 36C are graphic representations of the lateral aberrations of the numerical example 7 in the normal state (with the image position unchanged).
Figure 36B:
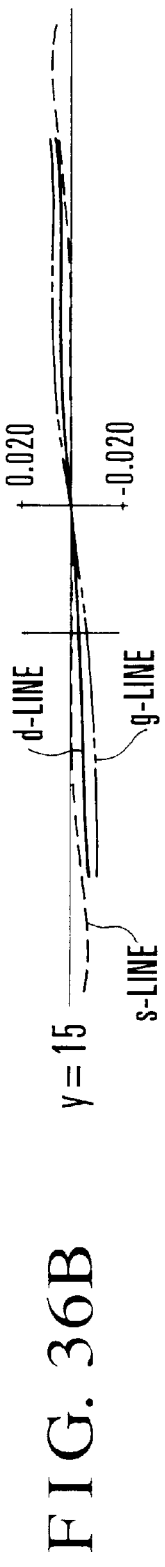
Figure 36C:
Figure 37A:
FIGS. 37A to 37C are graphic representations of the lateral aberrations of the numerical example 7 when the image of an infinitely distant object has displaced to a corresponding position to 0.3° in image angle.
Figure 37B:
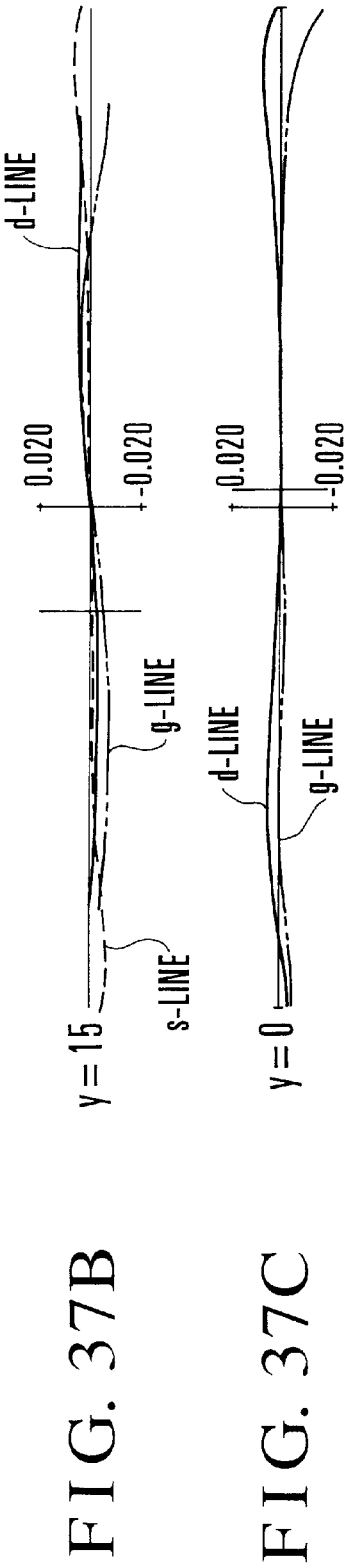
Figure 37C:
Figure 39A:
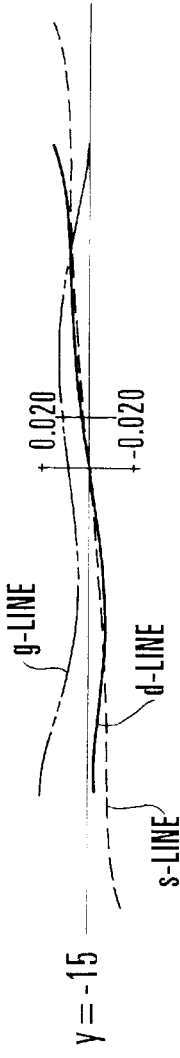
FIGS. 39A to 39C are graphic representations of the lateral aberrations of the numerical example 8 in the normal state (with the image position unchanged).
Figure 39B:
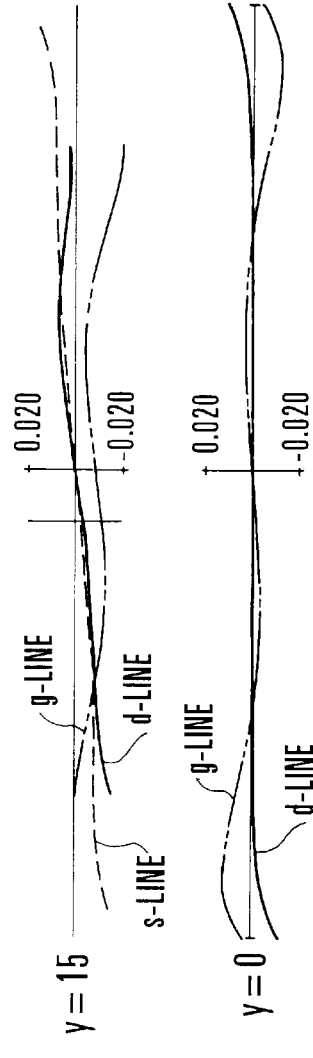
Figure 39C:
Figure 40A:
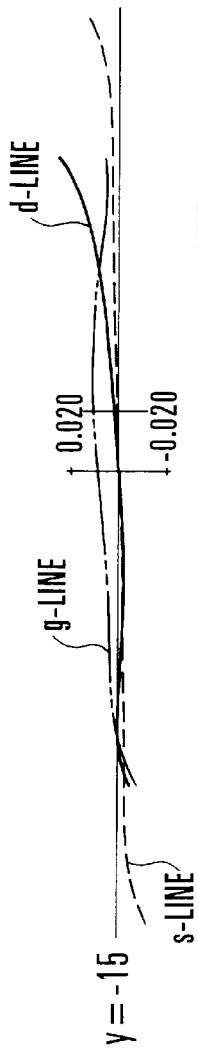
FIGS. 40A to 40C are graphic representations of the lateral aberrations of the numerical example 8 when the image of an infinitely distant object has displaced to a corresponding position to 0.3° in image angle.
Figure 40B:
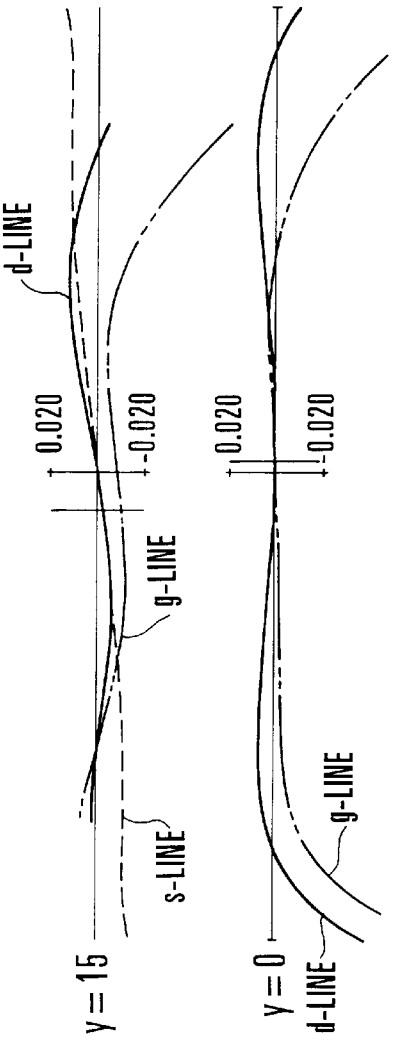
Figure 40C:
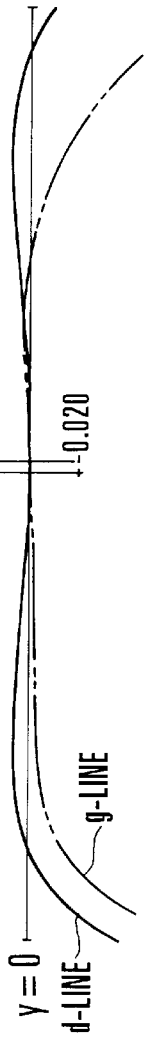
Figure 42A:
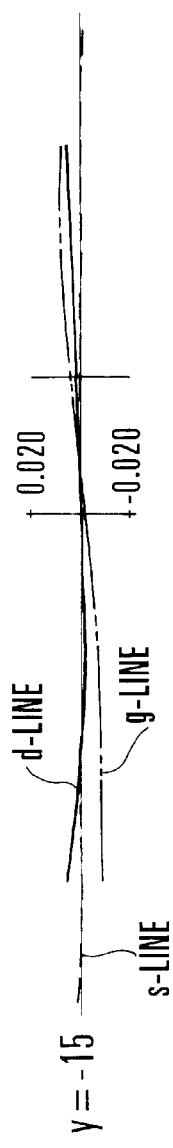
FIGS. 42A to 42C are graphic representations of the lateral aberrations of the numerical example 9 in the normal state (with the image position unchanged).
Figure 42B:
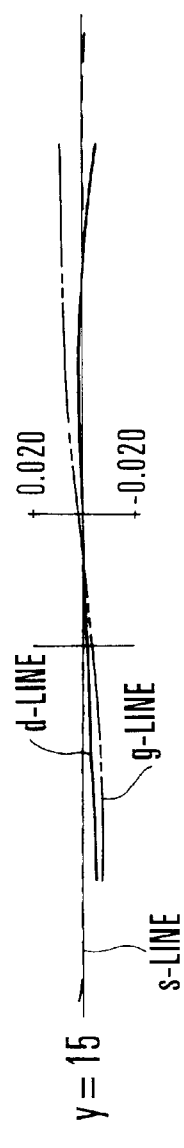
Figure 42C:
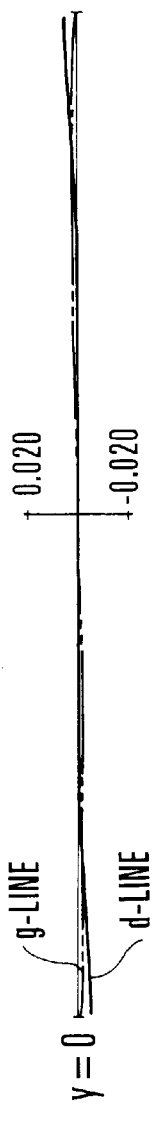
Figure 43A:
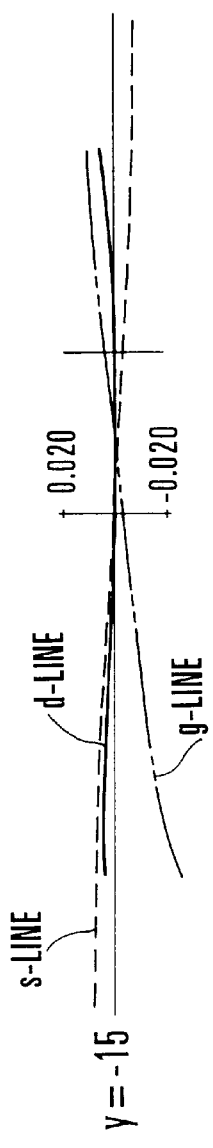
FIGS. 43A to 43C are graphic representations of the lateral aberrations of the numerical example 9 when the image of an infinitely distant object has displaced to a corresponding position to 0.3° in image angle.
Figure 43B:
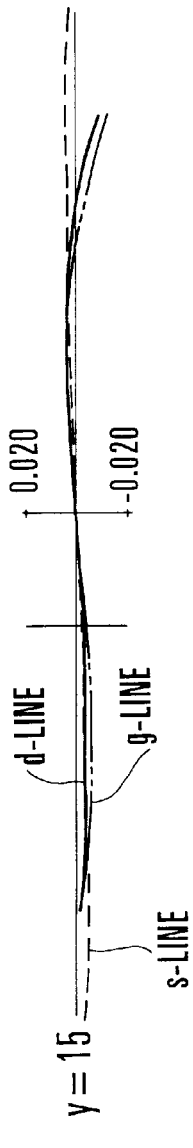
Figure 43C:
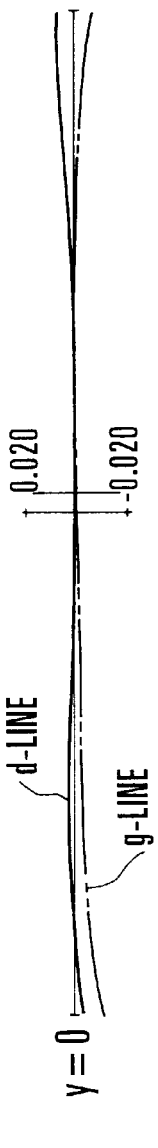
Figures 44A, 44B, 44C, 44D:
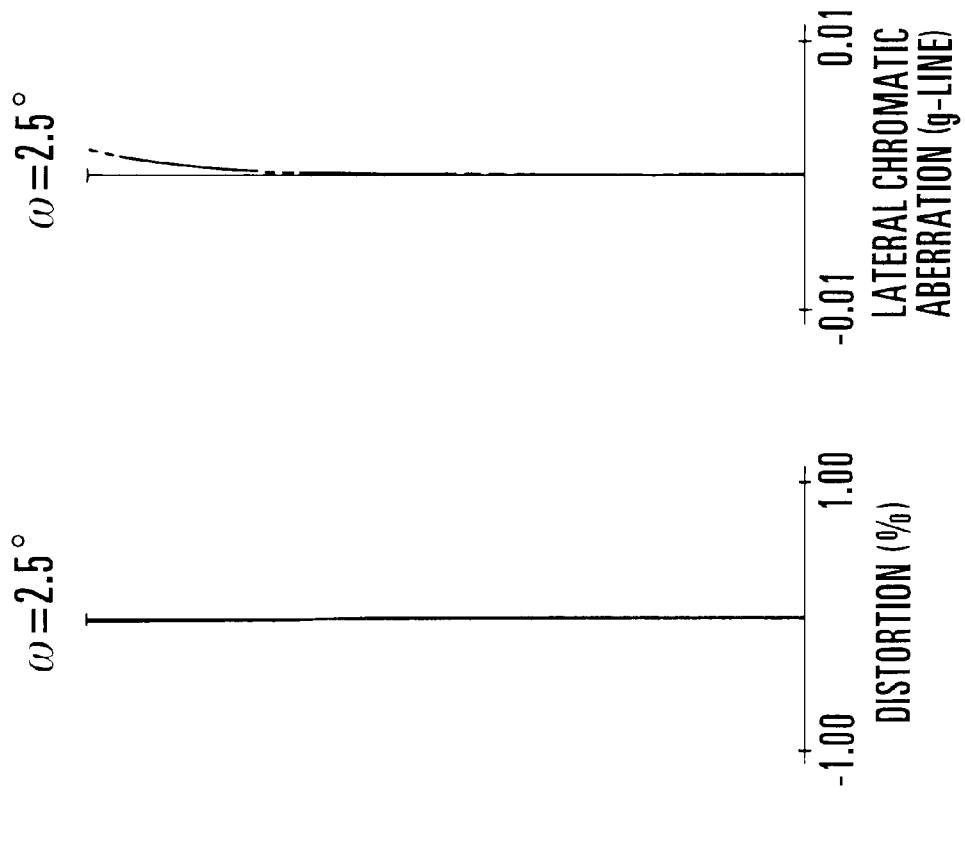
FIGS. 44A to 44D are graphic representations of the longitudinal aberrations of the numerical example 10 in the normal state (with the image position unchanged).
Figure 45A:
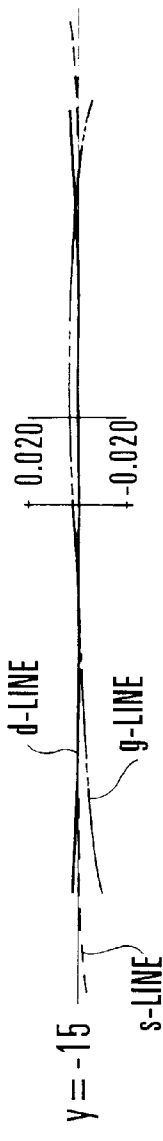
FIGS. 45A to 45C are graphic representations of the lateral aberrations of the numerical example 10 in the normal state (with the image position unchanged).
Figure 45B:
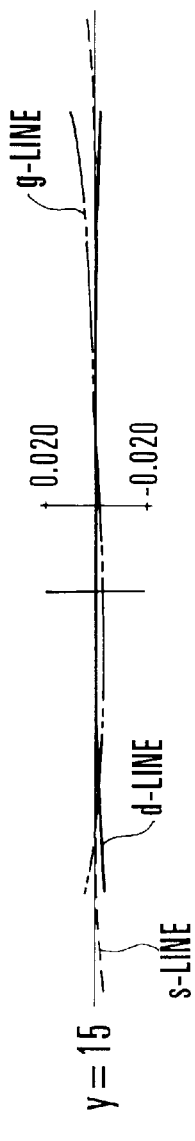
Figure 45C:
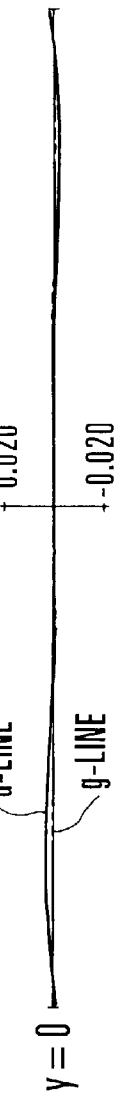
Figure 46A:
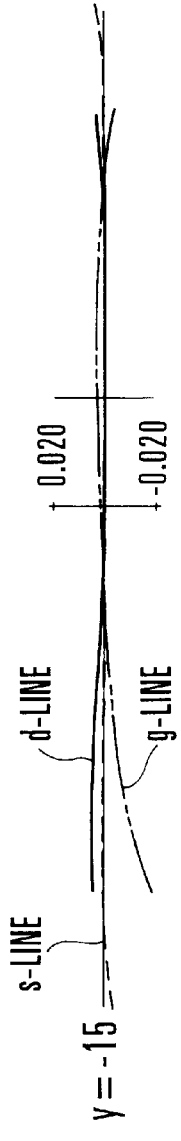
FIGS. 46A to 46C are graphic representations of the lateral aberrations of the numerical example 10 when the image of an infinitely distant object has displaced to a corresponding position to 0.3° in image angle.
Figure 46B:
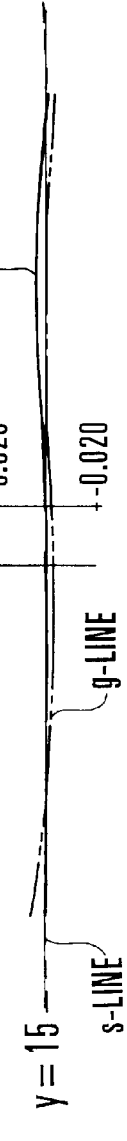
Figure 46C:
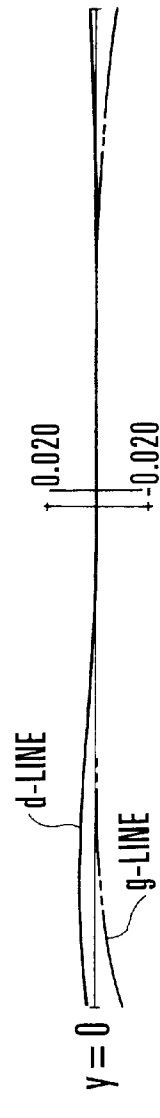
Figures 47A, 47B, 47C, 47D:
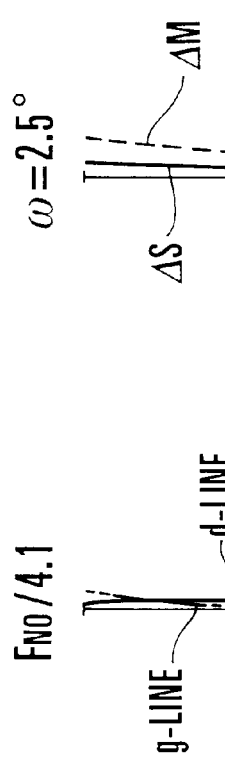
FIGS. 47A to 47D are graphic representations of the longitudinal aberrations of the numerical example 11 in the normal state (with the image position unchanged).
Figure 48A:
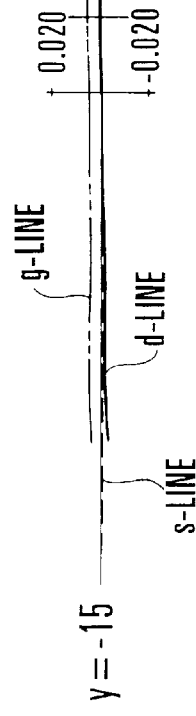
FIGS. 48A to 48C are graphic representations of the lateral aberrations of the numerical example 11 in the normal state (with the image position unchanged).
Figure 48B:
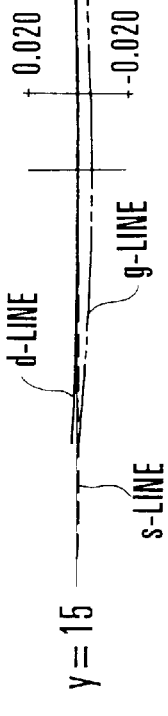
Figure 48C:
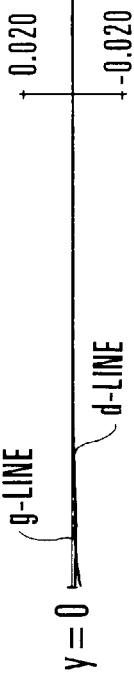
Figure 49A:
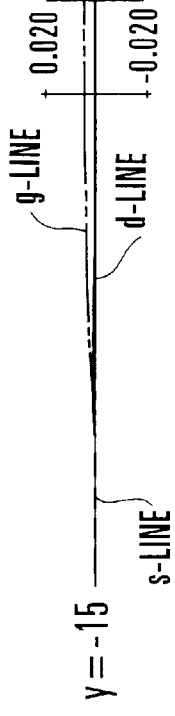
FIGS. 49A to 49C are graphic representations of the lateral aberrations of the numerical example 11 when the image of an infinitely distant object has displaced to a corresponding position to 0.3° in image angle.
Figure 49B:
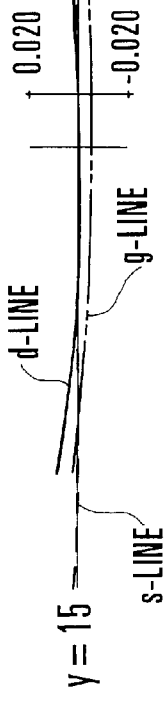
Figure 49C:
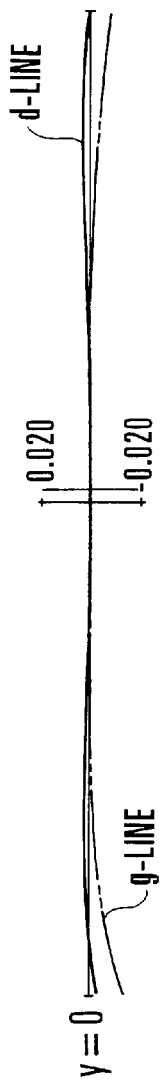
Figure 51A:
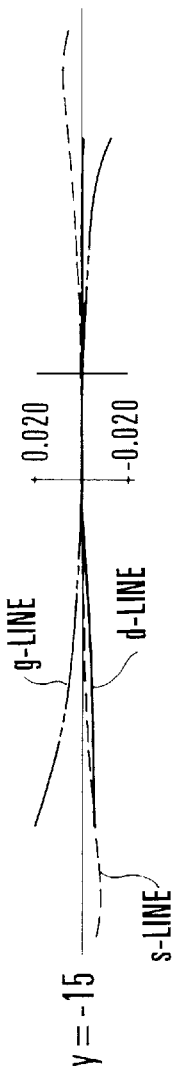
FIGS. 51A to 51C are graphic representations of the lateral aberrations of the numerical example 12 in the normal state (with the image position unchanged).
Figure 51B:
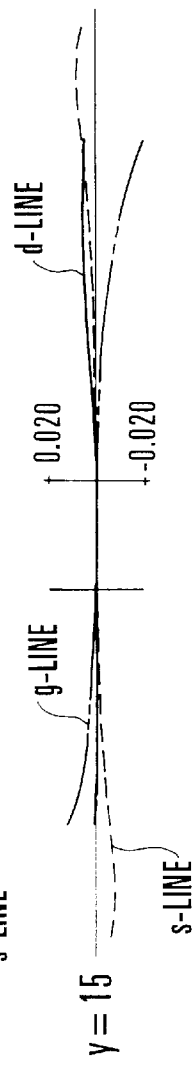
Figure 51C:
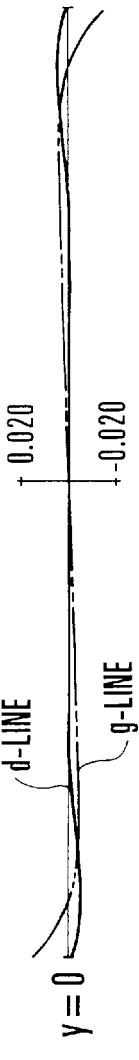
Figure 52A:
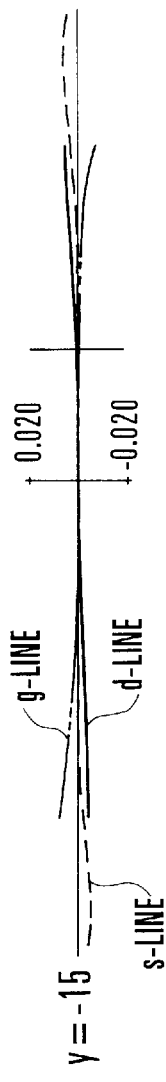
FIGS. 52A to 52C are graphic representations of the lateral aberrations of the numerical example 12 when the image of an infinitely distant object has displaced to a corresponding position to 0.3° in image angle.
Figure 52B:
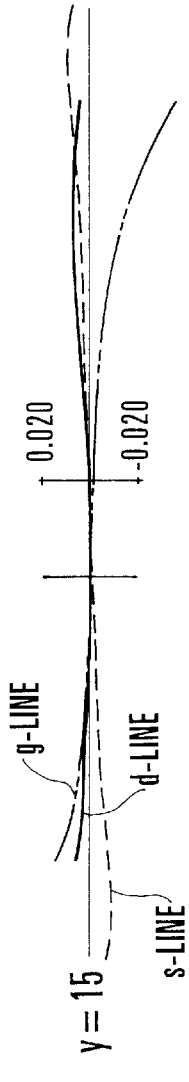
Figure 52C:
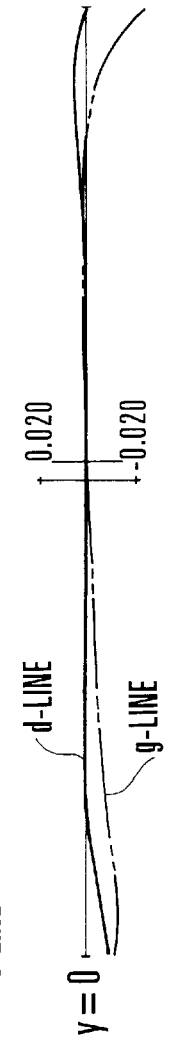
Figure 54A:
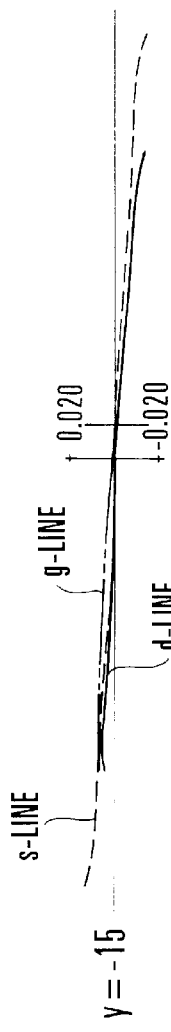
FIGS. 54A to 54C are graphic representations of the lateral aberrations of the numerical example 13 in the normal state (with the image position unchanged).
Figure 54B:
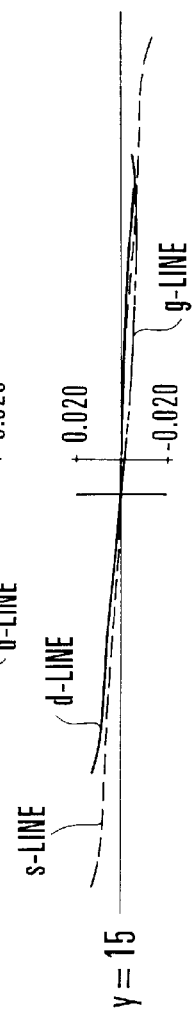
Figure 54C:
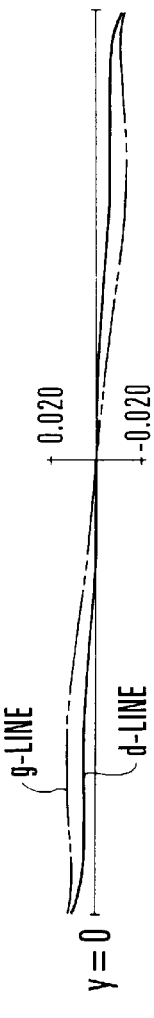
Figure 55A:
FIGS. 55A to 55C are graphic representations of the lateral aberrations of the numerical example 13 when the image of an infinitely distant object has displaced to a corresponding position to 0.3° in image angle.
Figure 55B:
Figure 55C:
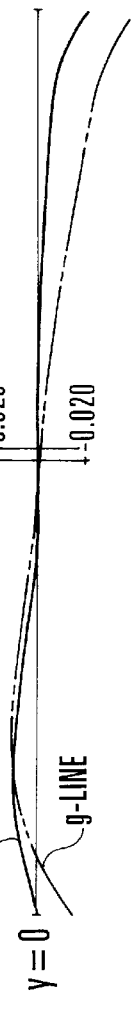
Figure 57A:
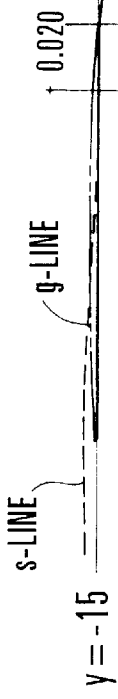
FIGS. 57A to 57C are graphic representations of the lateral aberrations of the numerical example 14 in the normal state (with the image position unchanged).
Figure 57B:
Figure 57C:
Figure 58A:
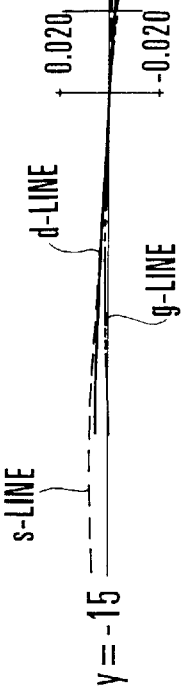
FIGS. 58A to 58C are graphic representations of the lateral aberrations of the numerical example 14 when the image of an infinitely distant object has displaced to a corresponding position to 0.3° in image angle.
Figure 58B:
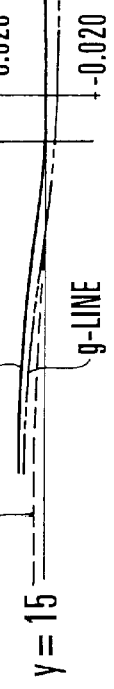
Figure 58C:
Figure 60A:
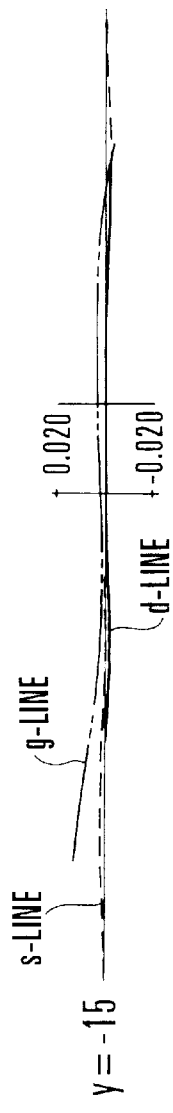
FIGS. 60A to 60C are graphic representations of the lateral aberrations of the numerical example 15 in the normal state (with the image position unchanged).
Figure 60B:
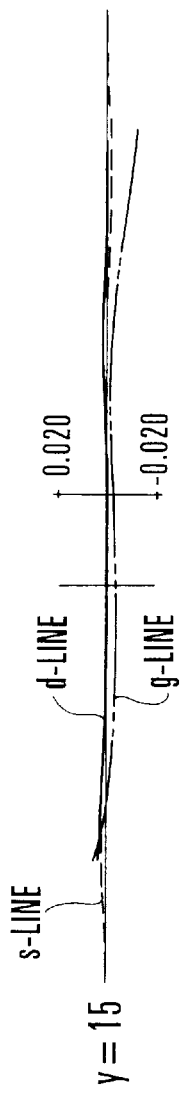
Figure 60C:
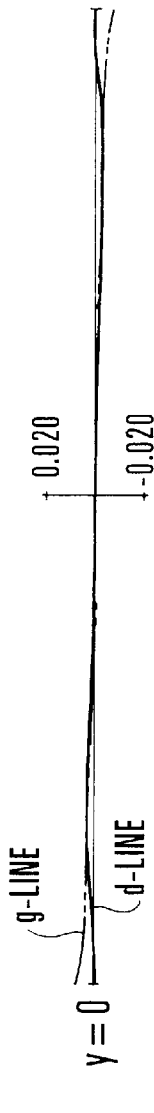
Figure 61A:
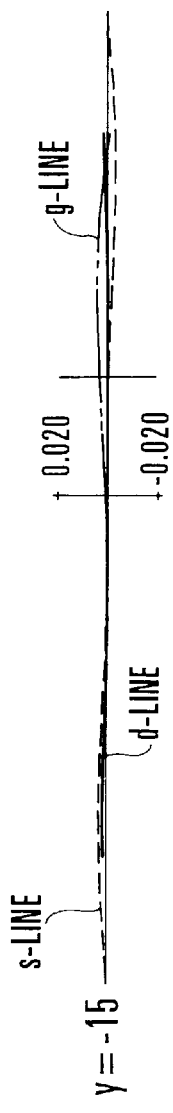
FIGS. 61A to 61C are graphic representations of the lateral aberrations of the numerical example 15 when the image of an infinitely distant object has displaced to a corresponding position to 0.3° in image angle.
Figure 61B:
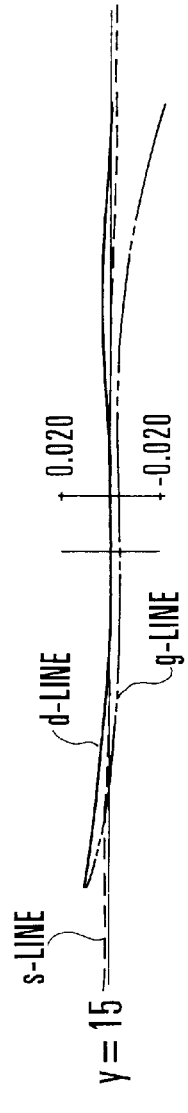
Figure 61C:
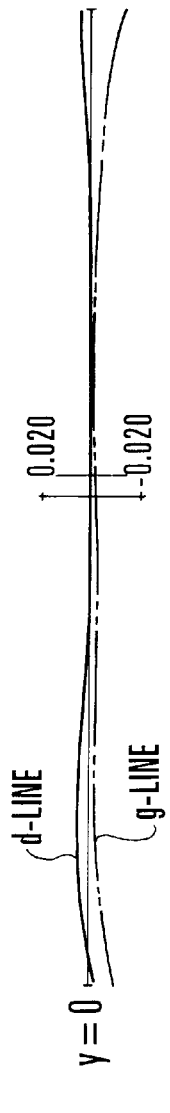
Figure 62A:
FIGS. 62A to 62D are graphic representations of the longitudinal aberrations of the numerical example 16 in the normal state (with the image position unchanged).
Figure 62B:
Figure 62C:
Figure 62D:
Figures 63A, 63B, 63C, 64A, 64B, 64C:
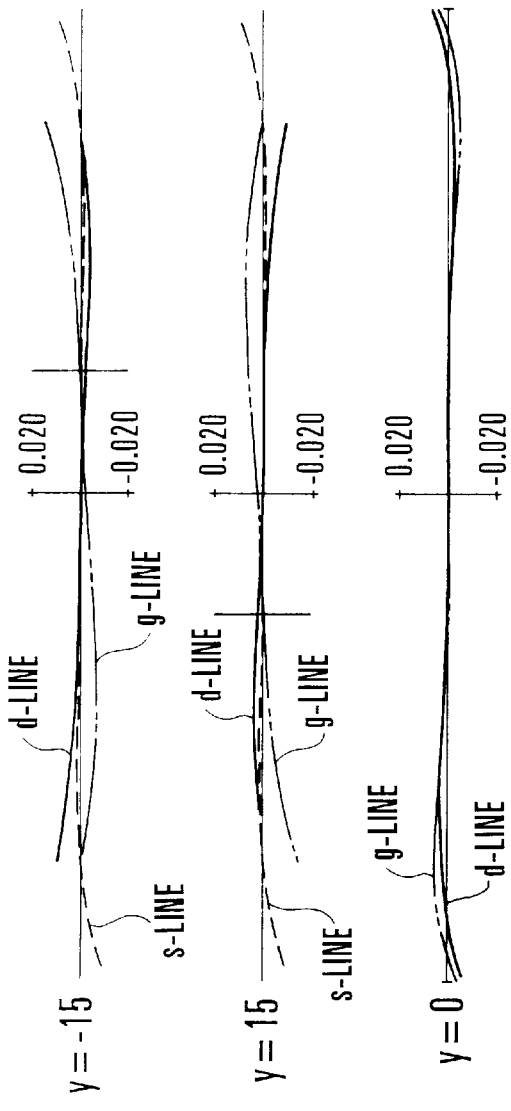
FIGS. 63A to 63C are graphic representations of the lateral aberrations of the numerical example 16 in the normal state (with the image position unchanged).
FIGS. 64A to 64C are graphic representations of the lateral aberrations of the numerical example 16 when the image of an infinitely distant object has displaced to a corresponding position to 0.3° in image angle.
Figure 65:
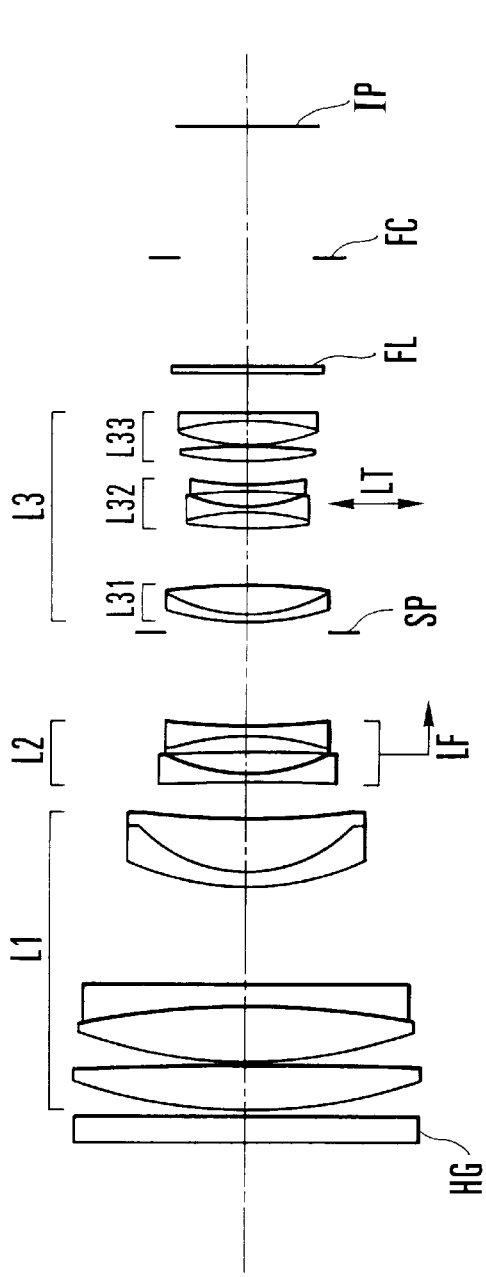
FIG. 65 is a longitudinal section view of a numerical example 17 of the lens.
Figure 66:
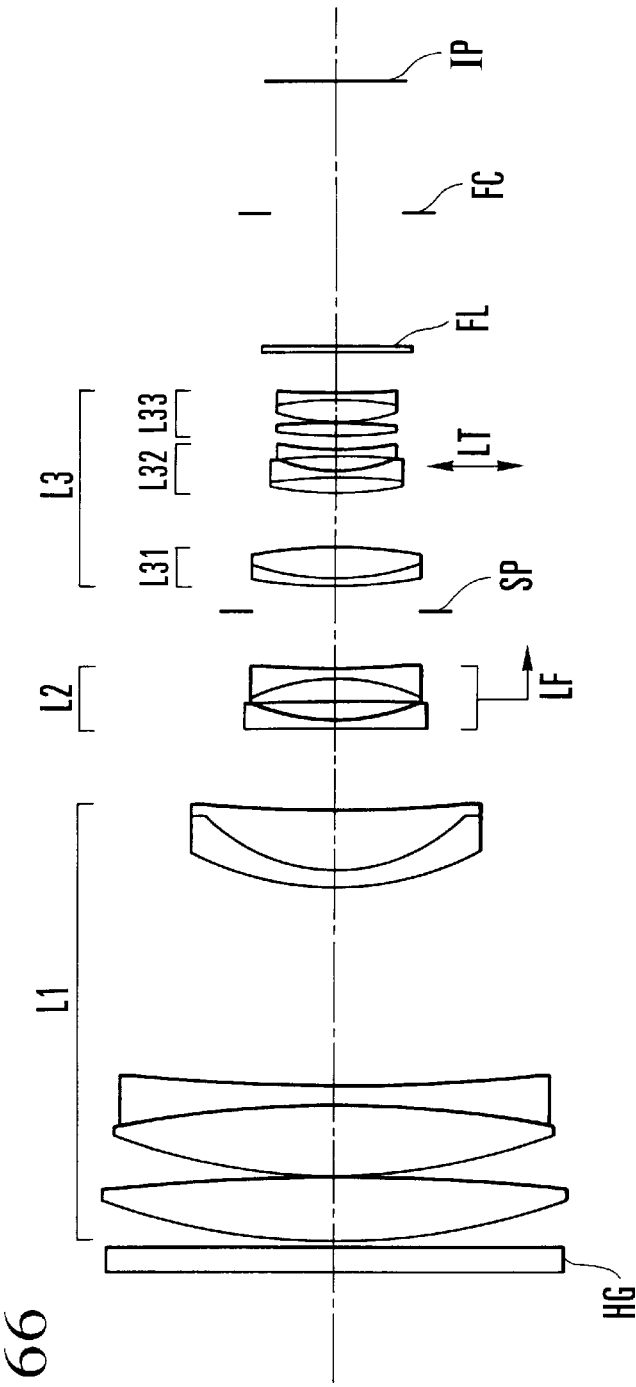
FIG. 66 is a longitudinal section view of a numerical example 18 of the lens.
Figure 67:
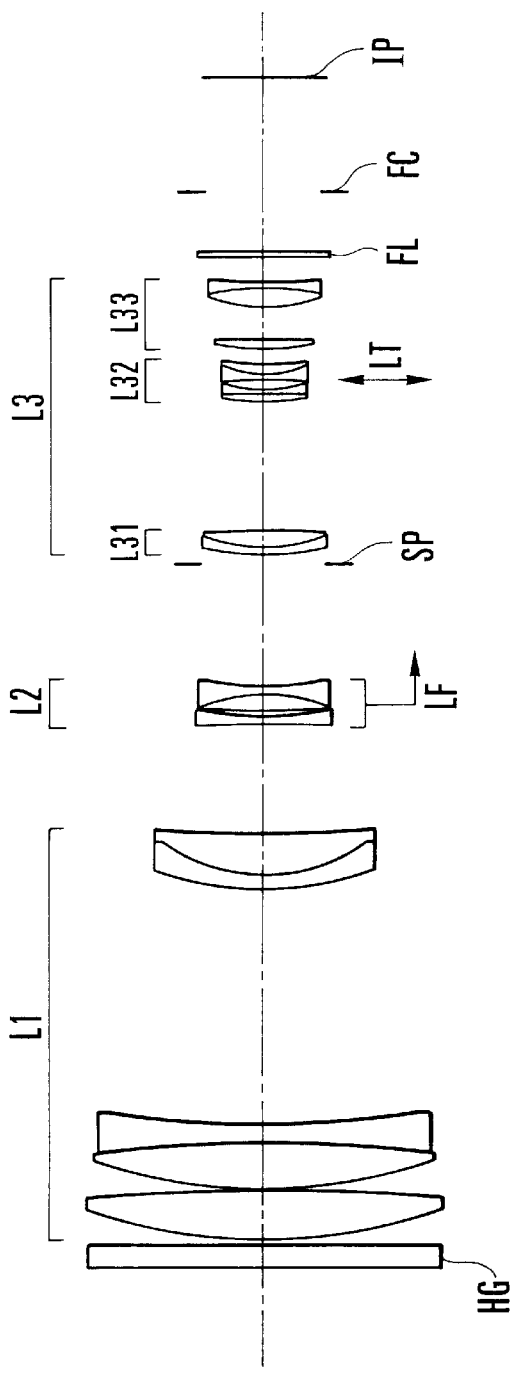
FIG. 67 is a longitudinal section view of a numerical example 19 of the lens.
Figure 68:
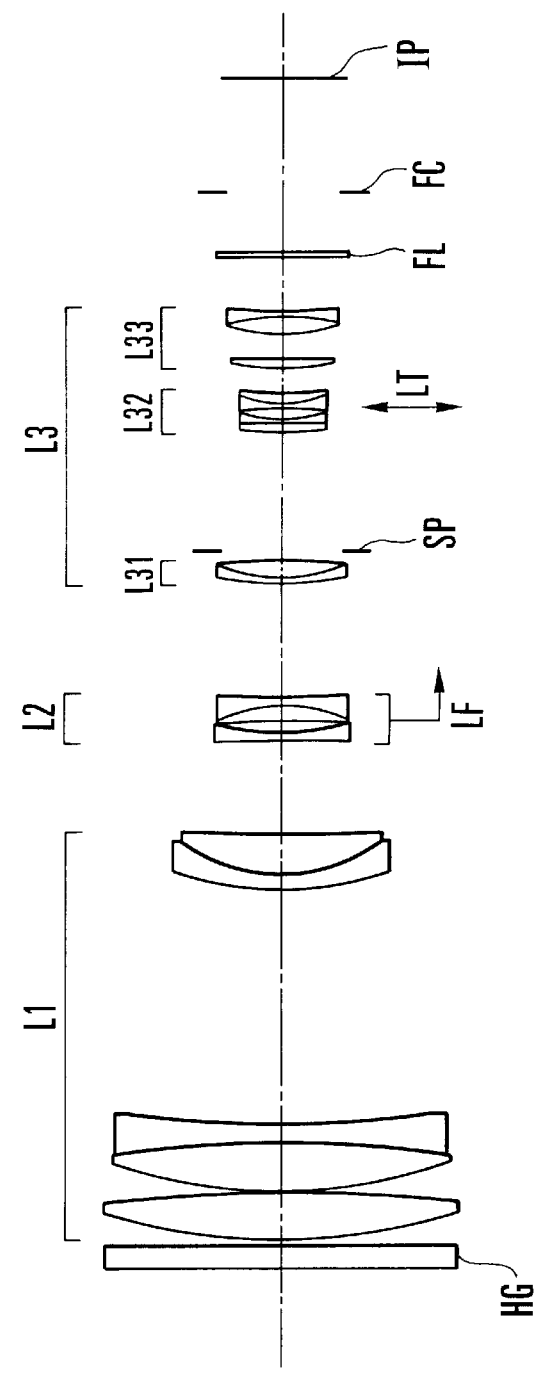
FIG. 68 is a longitudinal section view of a numerical example 20 of the lens.
Figure 69:
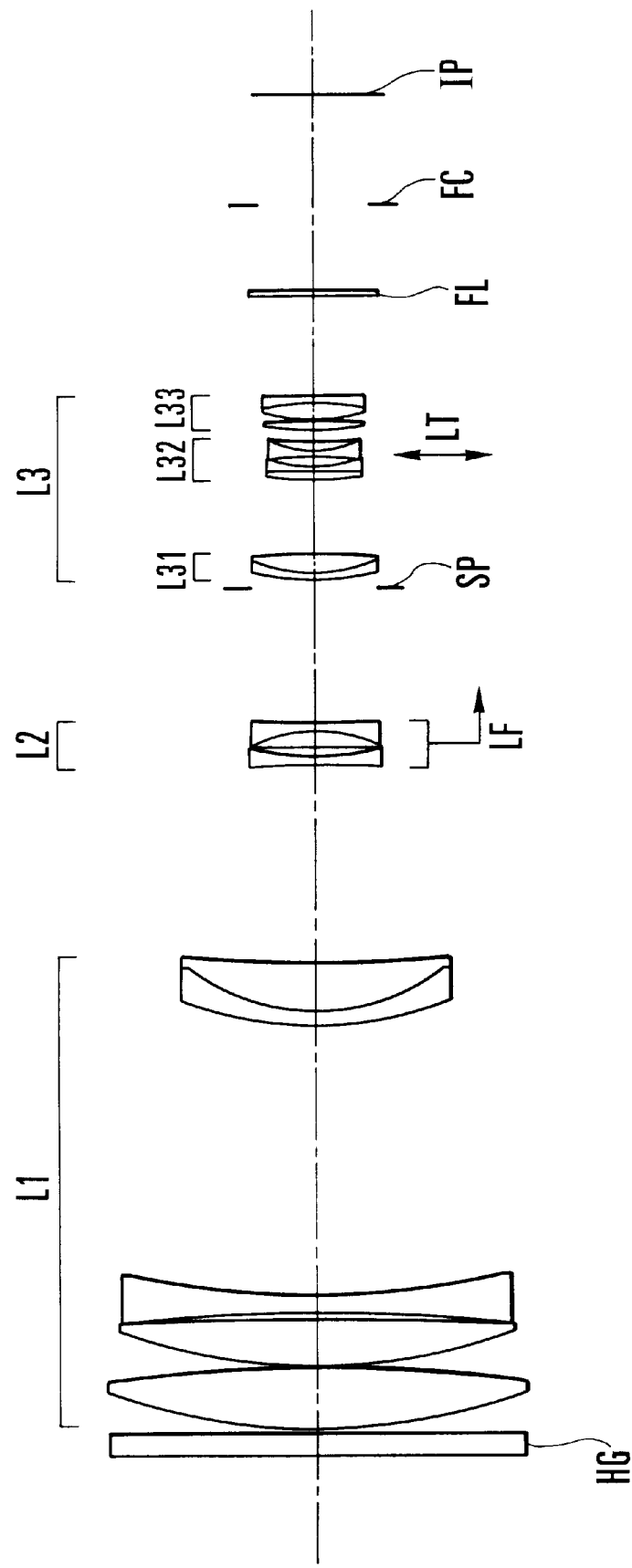
FIG. 69 is a longitudinal section view of a numerical example 21 of the lens.
Figure 85:
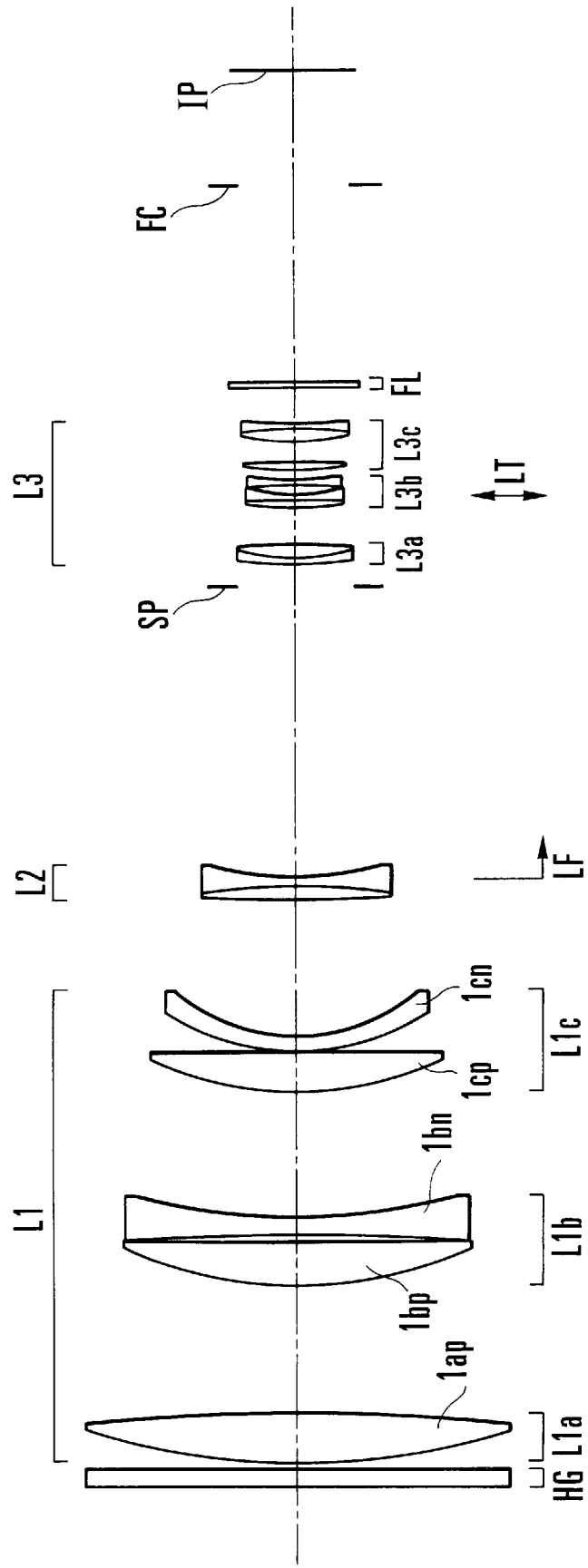
FIG. 85 is a longitudinal section view of a numerical example 22 of the lens.
Figure 86:
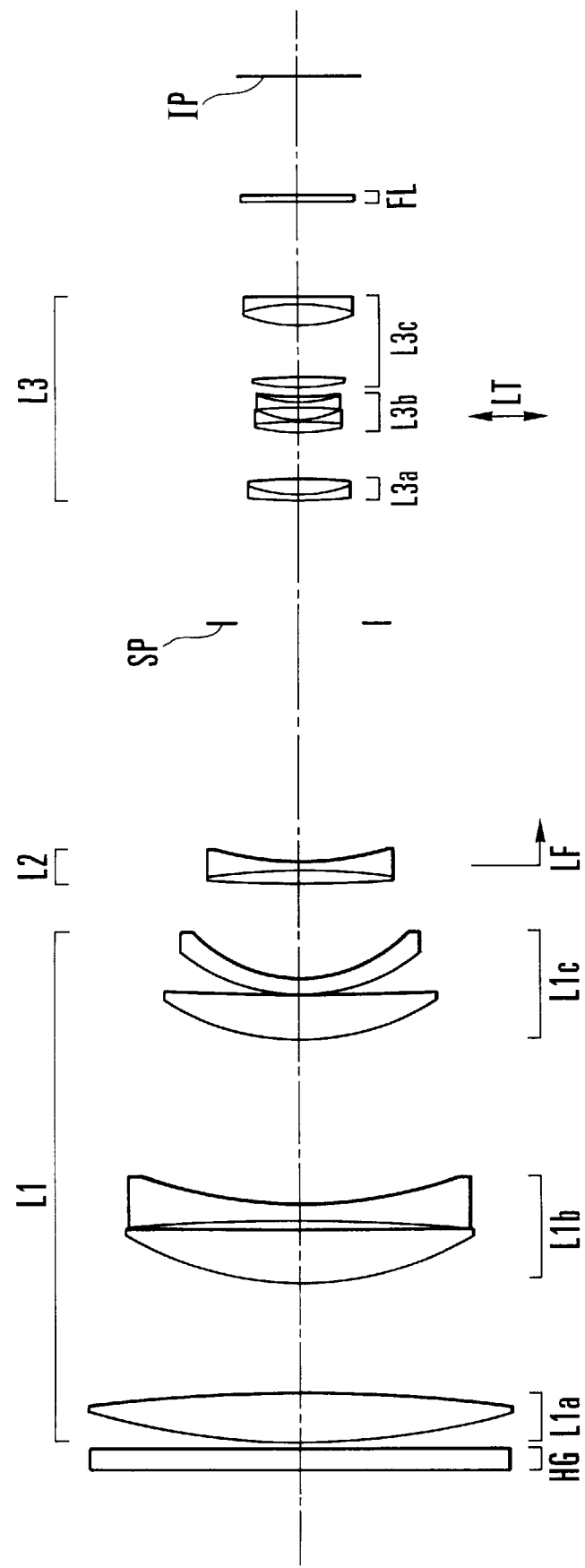
FIG. 86 is a longitudinal section view of a numerical example 23 of the lens.
Figure 87:
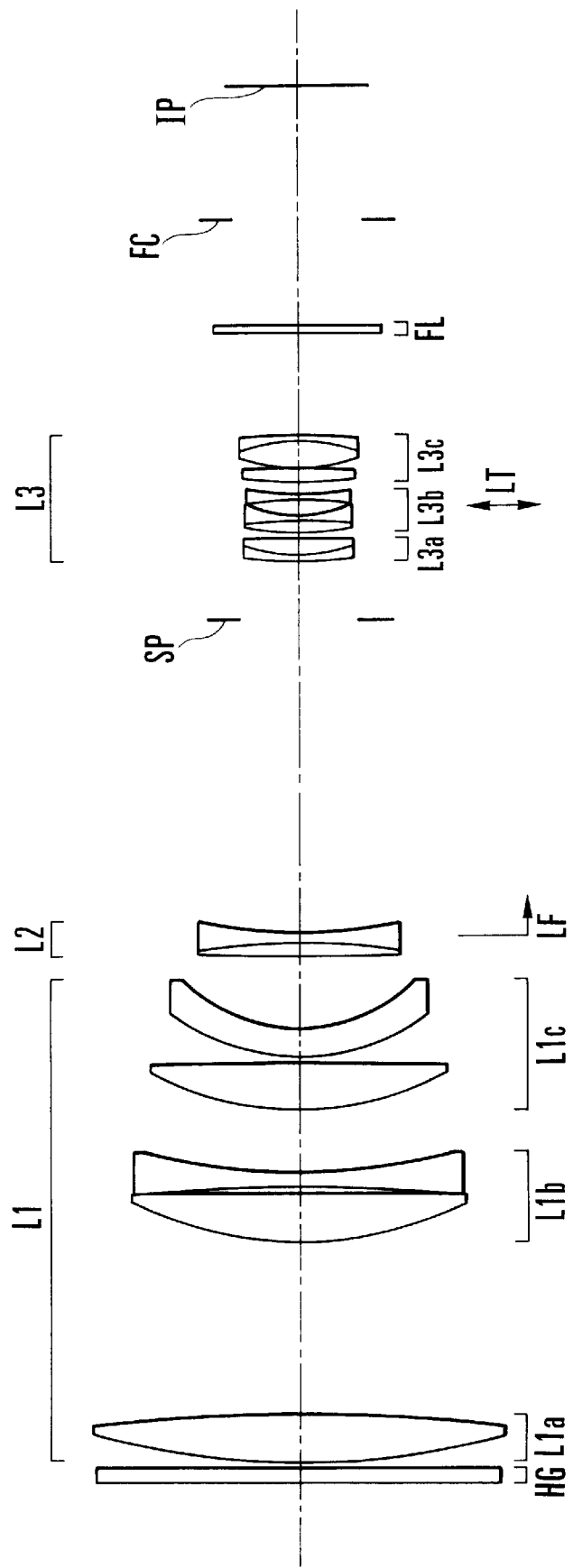
FIG. 87 is a longitudinal section view of a numerical example 24 of the lens.
Figure 88:
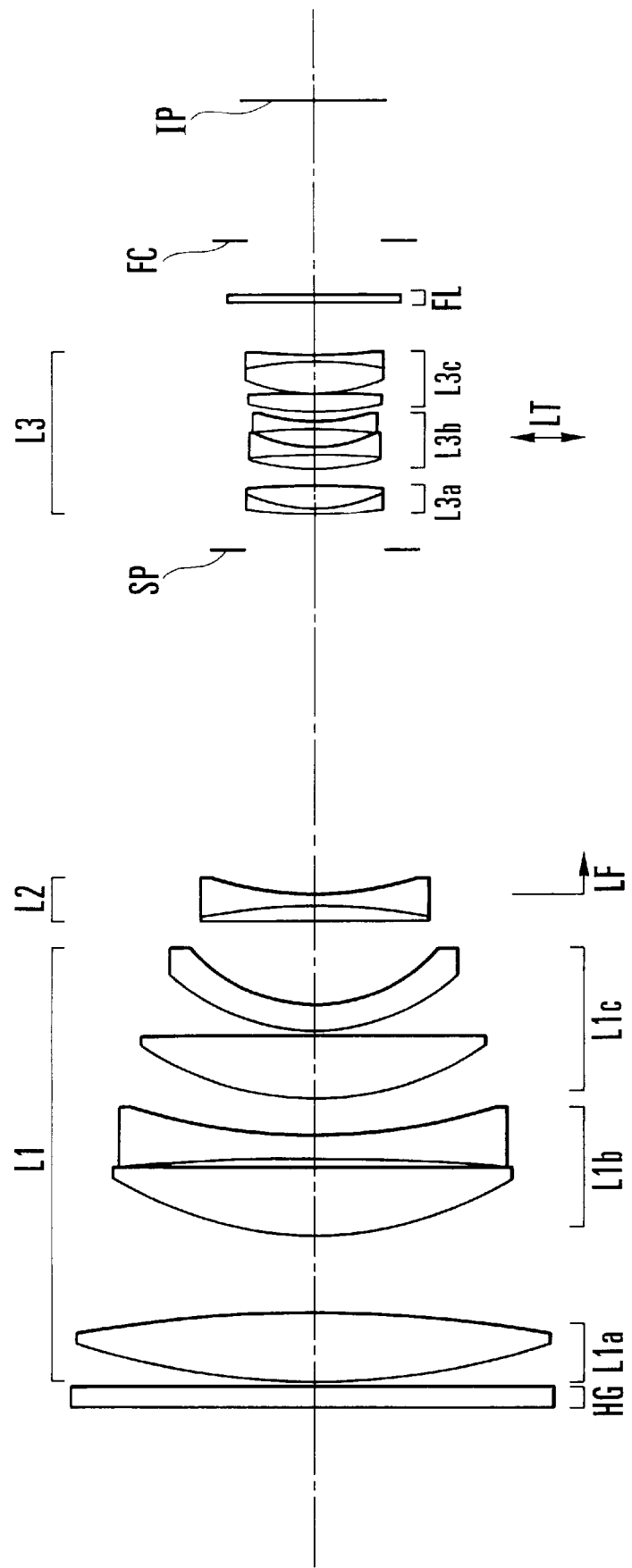
FIG. 88 is a longitudinal section view of a numerical example 25 of the lens.
Figures 89A, 89B, 89C, 89D:
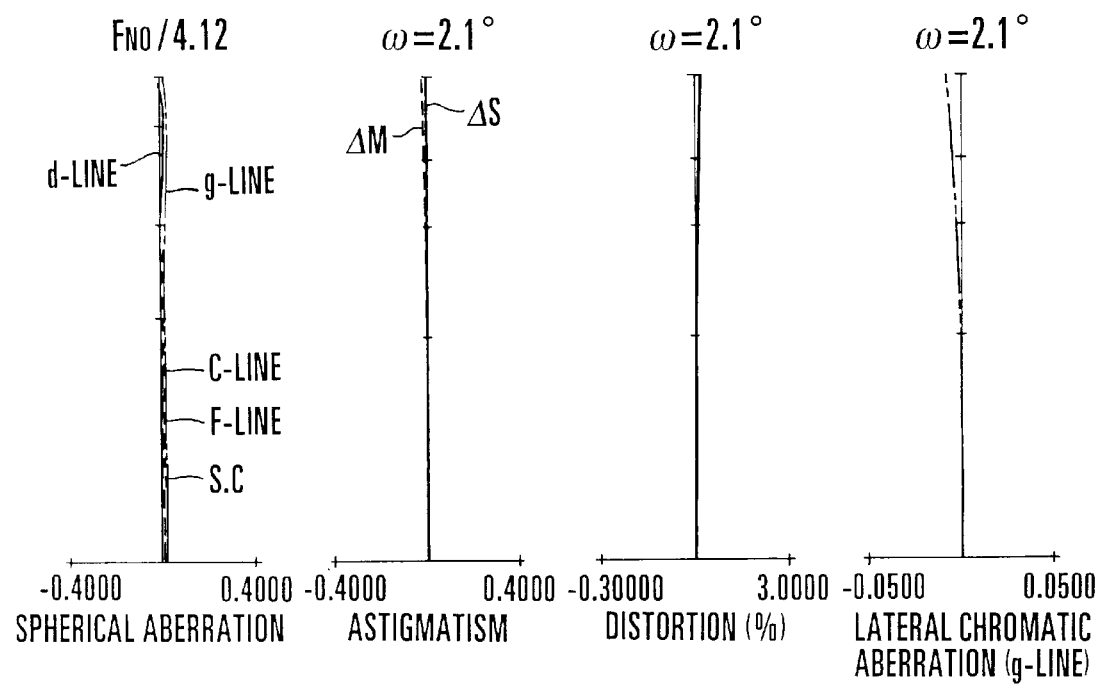
FIGS. 89A to 89D are graphic representations of the various aberrations of the numerical example 22.
Figures 90A, 90B, 90C, 90D:
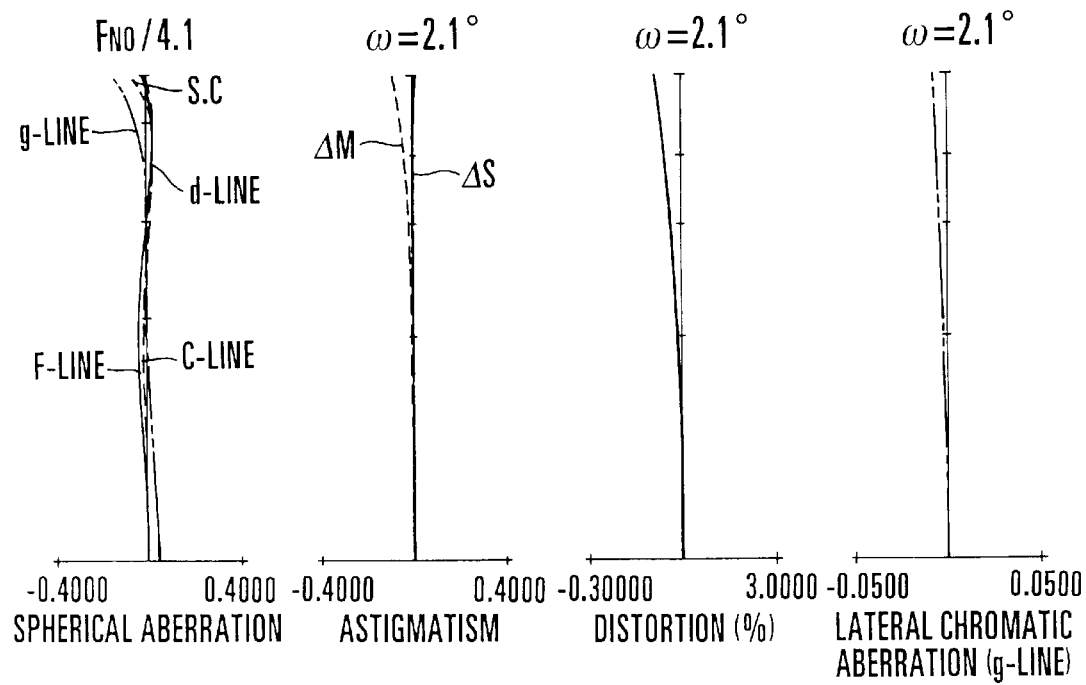
FIGS. 90A to 90D are graphic representations of the various aberrations of the numerical example 23.
Figures 91A, 91B, 91C, 91D:
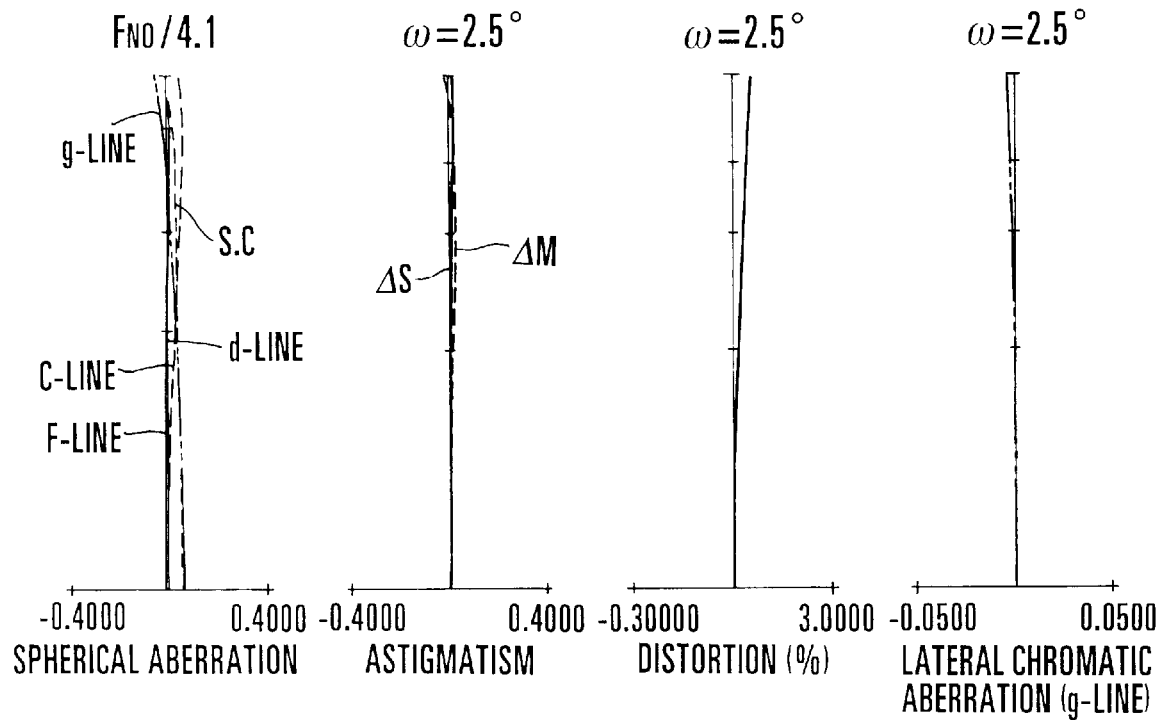
FIGS. 91A to 91D are graphic representations of the various aberrations of the numerical example 24.
Figures 92A, 92B, 92C, 92D:
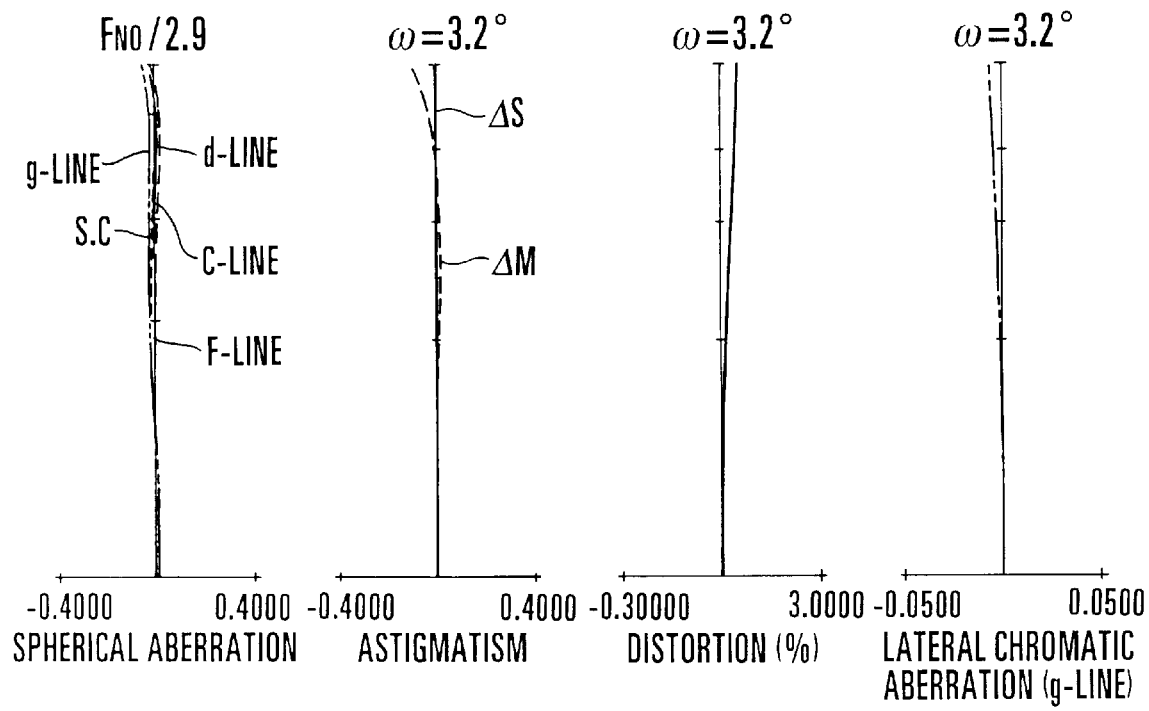
FIGS. 92A to 92D are graphic representations of the various aberrations of the numerical example 25.

Hereinafter, preferred embodiments of the invention will be described in detail with reference to the drawings.

(First Embodiment)

FIGS. 1 to 16 in lens block diagrams show sixteen numerical examples 1 to 16 of a first embodiment of the invention, respectively. Each optical system comprises, in order from an object side, a first lens unit L1 of positive refractive power, a second lens unit L2 of negative refractive power and a third lens unit L3 of positive refractive power.

The third lens unit L3 includes three lens subunits, i.e., a first lens subunit L31 of positive refractive power, a second lens subunit L32 of negative refractive power and a third lens subunit L33 of positive refractive power. SP stands for an aperture stop, FL stands for an optical filter, and IP stands for an image plane.

In the present embodiment, during focusing from an infinitely distant object to shorter object distances, the second lens unit L2 axially moves toward the image side as indicated by an arrow LF. Also, when the optical system vibrates, the shake of the image on the image plane IP is compensated for (or the image is stabilized) by moving the second lens subunit L32 in directions perpendicular to an optical axis, as shown by a double-headed arrow LT.

According to the present embodiment, the optical system has a feature that, as compared with the first lens unit L1, the second lens unit L2 is small in diameter and far lighter in weight and has a negative refractive power. This second lens unit L2 is selected to be used as the focusing lens. So, an electric motor of low torque and small size can be utilized in a drive device therefor. Another feature is that the overall refractive power of the first and second lens units L1 and L2 is made positive. As the second lens unit L2 produces a convergent light beam, the first lens subunit L31 further converges it. This makes it easier to minimize the diameter of the second lens subunit L32 (as the image displacement compensating unit). Still another feature is that the third lens subunit L33 of positive refractive power follows the second lens subunit L32. This allows the negative refractive power of the second lens subunit L32 to increase, while keeping the constant focal length of the entire optical system, thereby making it easier to translate a lesser decentering movement of the second lens subunit L32 to the displacement large enough of the image on the focal plane. (The relationship between the decentered amount and the image displacement is hereinafter called the "image displacement sensitivity".)

The present embodiment has set forth such features to stabilize the image well when the user uses the video camera or still camera with the telephoto lens held by his or her hands, or on an unsteady tripod or mono-pod.

In the present embodiment, not only the inner-focusing and the compensation for the image shake on the focal plane are carried out as such, but also proper rules of design for the optical parameters of each of the lens units are determined. Accordingly, the image shake is compensated for well in such a manner as to assure minimization of the bulk and size of the entire optical system. In addition, as the second lens subunit L32 moves in the directions perpendicular to the optical axis, lesser decentering aberrations, especially coma, astigmatism and field curvature, are produced and a good optical performance is maintained stable throughout the entire focusing range.

To facilitate the reduction of the produced amount of decentering aberrations and the maintenance of good stability of optical performance throughout the entire focusing range, it is preferred to satisfy at least one of the following features or conditions.

(a-1) The second lens subunit L32 has an air lens of bi-convex form, and the following condition is satisfied:

$$0.6 < \text{fair}/f32 < 1.4 \qquad (1)$$

where "fair" is the focal length of the air lens, and f32 is the focal length of the second lens subunit L32. Incidentally, the focal length of an air lens is determined by the refractive indices of the materials disposed before and behind the air lens.

The inequalities of condition (1) are provided for creating the air lens of appropriate shape in the interior of the second lens subunit L32 to obtain a good image quality in either of the normal state (with the image not displaced) and the image-stabilized state. When the numerical range of the condition (1) is exceeded, it becomes difficult to take a balance of the image quality between the normal state and the image-displayed state.

(a-2) The second lens subunit L32 has an air lens of bi-convex form, and the following condition is satisfied:

$$0.15 < \left| \frac{Rair1 + Rair2}{Rair1 - Rair2} \right| < 0.7 \qquad (2)$$

where Rair1 and Rair2 are radii of curvature of lens surfaces on the object side and the image side of the air lens, respectively.

The inequalities of condition (2) give an appropriate range for the radii of curvature of lens surfaces on the object side and the image side of the air lens so as to further improve the optical performance. When the range of the condition (2) is exceeded, similarly to the condition (1), it becomes difficult to take a balance of the image quality between the normal state and the image-displaced state.

(a-3) Letting the focal length of the i-th lens unit be denoted by fi, and the focal lengths of the first lens subunit L31, the second lens subunit L32 and the third lens subunit L33 be denoted by f31, f32 and f33, respectively, the following conditions are satisfied:

$$0.3 < f1/f < 0.75 \qquad (3)$$

$$0.2 < |f2/f| < 0.7 \qquad (4)$$

$$0.1 < f/f3 < 1.5 \qquad (5)$$

$$0.12 < f31/f < 0.5 \qquad (6)$$

$$0.05 < |f32/f| < 0.15 \qquad (7)$$

$$0.08 < f33/f < 0.25 \qquad (8)$$

It is to be noted that the conditions (3) to (8) are not necessary to satisfy at once; so they may be selectively satisfied. Even in this case, their results to be described later are obtained individually.

The technical significance of each of the conditions (3) to (8) is next described below.

The inequalities of condition (3) give a proper range for the refractive power of the positive first lens unit L1. When the upper limit of the condition (3) is exceeded, as this means that the refractive power of the first lens unit L1 is too weak, the telephoto ability weakens, causing the total length of the entire optical system to increase objectionably. The converging action also becomes too weak. Therefore, a bulky light bundle enters the second lens unit L2. To admit of this, the diameter of the second lens unit L2 has to be increased greatly. Also, to keep the constant angle of field, the refractive power of the second lens unit L2 has to be weakened. Therefore, the total focusing movement increases greatly. When the lower limit is exceeded, as this means that the positive refractive power is too strong, spherical aberrations of high orders are produced, which are hardly corrected by the other lens units.

The inequalities of condition (4) give a proper range for the refractive power of the focusing, or negative second, lens unit L2. When the upper limit of the condition (4) is exceeded, the focusing movement from infinity to a certain finite distance increases to hinder minimization of the size of the lens system. Also, the second lens unit L2 of negative refractive power can no longer correct the various aberrations, especially spherical aberration, produced by the first lens unit L1 of positive refractive power. When the lower limit is exceeded, the spherical aberration is over-corrected by the second lens unit L2 of negative refractive power. As a result, it becomes difficult to retain the good correction of the image aberrations.

The inequalities of condition (5) give a proper range for the refractive power of the third lens unit L3 of positive refractive power. When the upper limit of the condition (5) is exceeded, too long a back focal distance results. Therefore, the size of the entire optical system is hardly minimized and, moreover, the positive distortion produced by the first lens unit becomes difficult to correct.

When the lower limit is exceeded, the number of lens elements in the third lens unit has to be increased so as to correct spherical aberration, coma flare or the like. As a result, the size of the entire optical system is hardly minimized and, moreover, the light transmittance of the optical system worsens. So, these violations are objectionable.

The inequalities of conditions (6) to (8) give proper ranges for the refractive powers of the lens subunits in the third lens unit, and have an aim that, as the second lens subunit L32 axially moves in the directions perpendicular to the optical axis to stabilize the image, a high sensitivity of image displacement is obtained while still securing the good imaging performance. When the numerical ranges of these conditions (6) to (8) are exceeded, it becomes difficult to keep the balance therebetween.

(a-4) The second lens unit L2 has at least one positive lens and at least one negative lens, and, letting the mean Abbe numbers of materials of the positive lens and the negative lens be denoted by vp and vn, respectively, the following condition is satisfied:

$$7.5 < vn - vp < 30 \qquad (9)$$

In the present embodiment, the second lens unit L2 must be decreased in weight to decrease the torque of the focusing driver and the variation with focusing of aberrations must be reduced. To these purposes, it is preferred to construct the second lens unit L2 with a positive lens having a stronger convex surface facing the image side than the object side and a negative lens having a stronger concave surface facing the image side than the object side, as arranged in this order from the object side. The inequalities of condition (9) give a proper range for the difference between the Abbe numbers of materials of the positive and negative lenses and have an aim to correct well the variation with focusing of chromatic aberrations.

It is to be noted that, in a case where the second lens unit L2 has its refractive power made strong in order to reduce its total focusing movement, two or more negative lenses may be used.

(a-5) The second lens subunit L32 consists of, in order from the object side, a positive lens of bi-convex form and two negative lenses of bi-concave form. With this arrangement, when stabilizing the image, the good optical performance is maintained stable.

(a-6) The second lens subunit L32 consists of, in order from the object side, a negative lens of meniscus form convex toward the object side, a positive lens of meniscus form convex toward the object side and a negative lens of bi-concave form. With this arrangement, when stabilizing the image, the good optical performance is maintained stable.

(a-7) The second lens unit L2 consists of a positive lens and a negative lens. With this arrangement, the variation with focusing of chromatic aberrations is corrected well.

(a-8) The third lens subunit L33 has a plurality of positive lenses. To achieve a high sensitivity of image displacement, the third lens subunit L33 is better given a somewhat strong positive refractive power. Particularly for a large relative aperture lens system to achieve, it is preferred that the third lens subunit L33 has a plurality of positive lenses with an advantage of correcting, among others, spherical aberrations of higher orders. If the third lens subunit L33 further includes at least one positive cemented lens composed of negative and positive lenses, or at least one pair of positive and negative lenses with their confronting surfaces of nearly equal radii of curvature to each other, even more improved chromatic aberrations can be expected.

(a-9) In order to make it easier to correct the residual aberrations produced by the first and second lens units L1 and L2 by a lens unit on the image side, the first lens sub unit L31 is desired to have at least one positive lens and at least one negative lens. Also, the second lens subunit L32 is desired to have a plurality of negative lenses and at least one positive lens. With this arrangement, when stabilizing the image, the variation of chromatic aberrations can be reduced.

(a-10) The first lens unit L1 is better constructed with a plurality of positive lenses and at least one negative lens. To attain a high image quality, the first lens unit L1 is better constructed with, in order from the object side, a positive lens of bi-convex form, a positive lens whose front surface is strong convex, a bi-concave lens and a positive lens whose front surface is strong convex. More preferably, these lenses are followed by a negative lens of meniscus form convex toward the object side.

(a-11) To protect the exposed lens surface to the outside and prevent occurrence of a change of the position of the sharp focus owing to the expansion or contraction of the lens elements with change of the ambient temperature, use may be made of a flat glass plate or transparent member or a lens of weak refractive power on the object side of the lens system.

(a-12) An iris diaphragm (aperture stop SP) may take any position whatever in the lens system, provided that, when stopped down, the light beam which goes to the margin of the useful image circle is not vignetted. On consideration of the space efficiency of layout of the drive mechanism for the focusing lens unit, the moving mechanism for the image stabilizing subunit and the mother board of electric circuitry, however, the iris diaphragm is better positioned in the air space between the second lens unit L2 and the third lens unit L3, or in the interior of the third lens unit L3.

(a-13) The optical filter FL is positioned in the space between the rearmost lens surface and the image plane, as desired because of assuring minimization of the diameter of the filter and from the point of view of the space efficiency.

(a-14) A fixed stop HP is better positioned in the air space between the rearmost lens surface and the image plane. With this arrangement, when stabilizing the image, the asymmetry of corner illuminations can be reduced.

(a-15) It is more preferred that the numerical ranges of the above-described conditions (1) to (9) are made narrower as follows:

$$0.7 < \text{fair}/f32 < 1.2 \tag{1a}$$

$$0.15 < \left| \frac{Rair1 + Rair2}{Rair1 - Rair2} \right| < 0.6 \tag{2a}$$

$$0.4 < f1/f < 0.7 \tag{3a}$$

$$0.25 < |f2/f| < 0.6 \tag{4a}$$

$$0.1 < f/f3 < 1.2 \tag{5a}$$

$$0.15 < f31/f < 0.45 \tag{6a}$$

$$0.06 < |f32/f| < 0.14 \tag{7a}$$

$$0.11 < f33/f < 0.23 \tag{8a}$$

$$8.0 < vn \times vp < 27 \tag{9a}$$

Next, sixteen numerical examples 1 to 16 of the first embodiment are shown. In the numerical data for the examples 1 to 16, Ri is the radius of curvature of the i-th lens surface, when counted from the object side, Di is the i-th axial lens thickness or air separation, when counted from the object side, and Ni and vi are respectively the refractive index and Abbe number of the material of the i-th lens element, when counted from the object side. In the numerical examples 1 to 7 and 9 to 16, the last two surfaces define a glass block such as phase plate or filter. In the numerical example 8, the second and third surfaces from the last define a glass block. The values of the factors in the above-described conditions (1) to (9) for the numerical examples 1 to 16 are listed in Table-1.

Numerical Example 1:

f = 293.58   Fno = 2.9   2ω = 8.4°

| | | | |
|---|---|---|---|
| R1 = 130.154 | D1 = 16.56 | N1 = 1.496999 | v1 = 81.5 |
| R2 = −352.589 | D2 = 14.11 | | |
| R3 = 96.004 | D3 = 11.02 | N2 = 1.496999 | v2 = 81.5 |
| R4 = 793.095 | D4 = 4.07 | | |
| R5 = −311.697 | D5 = 4.00 | N3 = 1.785896 | v3 = 44.2 |
| R6 = 127.604 | D6 = 0.15 | | |
| R7 = 79.467 | D7 = 13.88 | N4 = 1.433870 | v4 = 95.1 |
| R8 = −483.755 | D8 = Q.17 | | |
| R9 = 51.083 | D9 = 5.90 | N5 = 1.487490 | v5 = 70.2 |
| R10 = 40.134 | D10 = 26.71 | | |
| R11 = 1686.885 | D11 = 4.61 | N6 = 1.805181 | v6 = 25.4 |
| R12 = −107.660 | D12 = 2.20 | N7 = 1.834807 | v7 = 42.7 |
| R13 = 94.265 | D13 = 40.40 | | |
| R14 = Stop | D14 = 8.51 | | |
| R15 = 79.490 | D15 = 1.80 | N8 = 1.846658 | v8 = 23.9 |
| R16 = 35.239 | D16 = 7.20 | N9 = 1.719995 | v9 = 50.2 |
| R17 = −238.114 | D17 = 0.95 | | |
| R18 = 129.720 | D18 = 4.25 | N10 = 1.846658 | v10 = 23.9 |
| R19 = −97.425 | D19 = 1.65 | N11 = 1.603112 | v11 = 60.6 |
| R20 = 36.658 | D20 = 5.52 | | |
| R21 = −76.051 | D21 = 1.60 | N12 = 1.772499 | v12 = 49.6 |

-continued

| | | | |
|---|---|---|---|
| R22 = 66.247 | D22 = 2.82 | | |
| R23 = 78.646 | D23 = 9.30 | N13 = 1.719995 | ν13 = 50.2 |
| R24 = −39.586 | D24 = 1.80 | N14 = 1.834000 | ν14 = 37.2 |
| R25 = −155.699 | D25 = 4.00 | | |
| R26 = 81.751 | D26 = 5.50 | N15 = 1.696797 | ν15 = 55.5 |
| R27 = ∞ | D27 = 8.00 | | |
| R28 = ∞ | D28 = 2.00 | N16 = 1.516330 | ν16 = 64.1 |
| R29 = ∞ | D29 = 0.00 | | |

Numerical Example 2 f = 294.17    Fno = 2.9    2ω = 8.4°

| | | | |
|---|---|---|---|
| R1 = 127.473 | D1 = 17.00 | N1 = 1.433870 | ν1 = 95.1 |
| R2 = −307.517 | D2 = 10.73 | | |
| R3 = 99.685 | D3 = 11.30 | N2 = 1.496999 | ν2 = 81.6 |
| R4 = 643.990 | D4 = 5.85 | | |
| R5 = −304.401 | D5 = 4.50 | N3 = 1.772499 | ν3 = 49.6 |
| R6 = 121.012 | D6 = 0.15 | | |
| R7 = 83.253 | D7 = 14.00 | N4 = 1.496999 | ν4 = 81.6 |
| R8 = −619.135 | D8 = 0.15 | | |
| R9 = 52.533 | D9 = 5.80 | N5 = 1.603420 | ν5 = 38.0 |
| R10 = 42.498 | D10 = 32.70 | | |
| R11 = 1185.504 | D11 = 3.76 | N6 = 1.846659 | ν6 = 23.8 |
| R12 = −164.476 | D12 = 0.00 | | |
| R13 = −164.476 | D13 = 2.20 | N7 = 1.834807 | ν7 = 42.7 |
| R14 = 98.692 | D14 = 47.87 | | |
| R15 = Stop | D15 = 6.05 | | |
| R16 = 70.883 | D16 = 1.80 | N8 = 1.846659 | ν8 = 23.8 |
| R17 = 29.520 | D17 = 8.40 | N9 = 1.785896 | ν9 = 44.2 |
| R18 = −767.243 | D18 = 0.95 | | |
| R19 = 78.009 | D19 = 4.87 | N10 = 1.846659 | ν10 = 23.8 |
| R20 = −87.548 | D20 = 1.65 | N11 = 1.696797 | ν11 = 55.5 |
| R21 = 33.742 | D21 = 4.84 | | |
| R22 = −85.087 | D22 = 1.60 | N12 = 1.834807 | ν12 = 42.7 |
| R23 = 59.332 | D23 = 2.16 | | |
| R24 = 97.295 | D24 = 8.00 | N13 = 1.749497 | ν13 = 35.3 |
| R25 = −38.518 | D25 = 1.80 | N14 = 1.805181 | ν14 = 25.4 |
| R26 = −182.752 | D26 = 0.15 | | |
| R27 = 53.888 | D27 = 5.40 | N15 = 1.516330 | ν15 = 64.2 |
| R28 = −1394.217 | D28 = 10.00 | | |
| R29 = −1394.217 | D29 = 2.00 | N16 = 1.516330 | ν16 = 64.2 |
| R30 = −1394.217 | D30 = 0.00 | | |

Numerical Example 3:

f = 294.60    Fno = 2.9    2ω = 8.4°

| | | | |
|---|---|---|---|
| R1 = 155.346 | D1 = 17.00 | N1 = 1.496999 | ν1 = 81.6 |
| R2 = −255.011 | D2 = 0.15 | | |
| R3 = 105.911 | D3 = 12.00 | N2 = 1.438750 | ν2 = 95.0 |
| R4 = 1180.529 | D4 = 4.36 | | |
| R5 = −309.541 | D5 = 4.50 | N3 = 1.772499 | ν3 = 49.6 |
| R6 = 140.895 | D6 = 14.92 | | |
| R7 = 80.148 | D7 = 15.00 | N4 = 1.496999 | ν4 = 81.6 |
| R8 = 13727.840 | D8 = 0.15 | | |
| R9 = 53.615 | D9 = 5.00 | N5 = 1.581439 | ν5 = 40.8 |
| R10 = 43.375 | D10 = 34.00 | | |
| R11 = 167.036 | D11 = 3.99 | N6 = 1.846659 | ν6 = 23.8 |
| R12 = −683.959 | D12 = 0.58 | | |
| R13 = −425.247 | D13 = 2.20 | N7 = 1.882997 | ν7 = 40.8 |
| R14 = 80.847 | D14 = 22.54 | | |
| R15 = Stop | D15 = 7.64 | | |
| R16 = 151.995 | D16 = 1.80 | N8 = 1.846658 | ν8 = 23.9 |
| R17 = 39.448 | D17 = 8.70 | N9 = 1.816000 | ν9 = 46.6 |
| R18 = −229.473 | D18 = 1.00 | | |
| R19 = 69.553 | D19 = 5.00 | N10 = 1.846658 | ν10 = 23.9 |
| R20 = −140.993 | D20 = 1.70 | N11 = 1.754998 | ν11 = 52.3 |
| R21 = 34.675 | D21 = 5.52 | | |
| R22 = −109.578 | D22 = 1.65 | N12 = 1.834807 | ν12 = 42.7 |
| R23 = 80.898 | D23 = 2.50 | | |
| R24 = 118.731 | D24 = 4.70 | N13 = 1.725999 | ν13 = 53.6 |
| R25 = −241.783 | D25 = 2.64 | | |
| R26 = 52.272 | D26 = 6.00 | N14 = 1.487490 | ν14 = 70.2 |
| R27 = 323.032 | D27 = 10.00 | | |
| R28 = ∞ | D28 = 2.00 | N15 = 1.516330 | ν15 = 64.2 |
| R29 = ∞ | D29 = 0.00 | | |

Numerical Example 4:

f = 293.97    Fno = 2.9    2ω = 8.4°

| | | | |
|---|---|---|---|
| R1 = 137.107 | D1 = 17.30 | N1 = 1.496999 | ν1 = 81.6 |
| R2 = −283.319 | D2 = 2.31 | | |
| R3 = 89.821 | D3 = 13.20 | N2 = 1.496999 | ν2 = 81.6 |
| R4 = 711.950 | D4 = 4.37 | | |
| R5 = −332.080 | D5 = 4.00 | N3 = 1.756998 | ν3 = 47.8 |
| R8 = 117.445 | D6 = 0.15 | | |
| R7 = 76.079 | D7 = 16.50 | N4 = 1.433870 | ν4 = 95.1 |
| R8 = −479.886 | D8 = 0.15 | | |
| R9 = 44.980 | D9 = 5.90 | N5 = 1.625882 | ν5 = 35.7 |
| R10 = 36.558 | D10 = 24.40 | | |
| R11 = 3005.033 | D11 = 4.29 | N6 = 1.846659 | ν6 = 23.8 |
| R12 = −117.913 | D12 = 0.00 | | |
| R13 = −117.913 | D13 = 2.20 | N7 = 1.834807 | ν7 = 42.7 |
| R14 = 75.547 | D14 = 40.16 | | |
| R15 = Stop | D15 = 8.91 | | |
| R16 = 63.764 | D16 = 1.80 | N8 = 1.846658 | ν8 = 23.9 |
| R17 = 31.830 | D17 = 8.40 | N9 = 1.696797 | ν9 = 55.5 |
| R18 = −301.122 | D18 = 0.95 | | |
| R19 = 79.604 | D19 = 4.71 | N10 = 1.846659 | ν10 = 23.8 |
| R20 = −117.900 | D20 = 1.70 | N11 = 1.651597 | ν11 = 58.5 |
| R21 = 30.513 | D21 = 5.93 | | |
| R22 = −69.281 | D22 = 1.65 | N12 = 1.834807 | ν12 = 42.7 |
| R23 = 79.237 | D23 = 1.81 | | |
| R24 = 87.567 | D24 = 6.00 | N13 = 1.518229 | ν13 = 59.0 |
| R25 = −131.515 | D25 = 4.34 | | |
| R26 = 63.796 | D26 = 6.50 | N14 = 1.563839 | ν14 = 60.7 |
| R27 = −274.113 | D27 = 10.00 | | |
| R28 = ∞ | D28 = 2.00 | N15 = 1.516330 | ν15 = 64.2 |
| R29 = ∞ | D29 = 0.00 | | |

Numerical Example 5:

f = 294.60    Fno = 2.9    2ω = 8.4°

| | | | |
|---|---|---|---|
| R1 = 160.901 | D1 = 17.50 | N1 = 1.487490 | ν1 = 70.2 |
| R2 = −236.537 | D2 = 1.47 | | |
| R3 = 109.787 | D3 = 13.00 | N2 = 1.438750 | ν2 = 95.0 |
| R4 = −36510.670 | D4 = 4.10 | | |
| R5 = −252.975 | D5 = 4.50 | N3 = 1.804000 | ν3 = 46.6 |
| R6 = 160.446 | D6 = 29.63 | | |
| R7 = 91.963 | D7 = 17.00 | N4 = 1.438750 | ν4 = 95.0 |
| R8 = −303.068 | D8 = 2.44 | | |
| R9 = 49.410 | D9 = 5.50 | N5 = 1.516800 | ν5 = 64.2 |
| R10 = 41.061 | D10 = 34.00 | | |
| R11 = 258.070 | D11 = 4.34 | N6 = 1.846659 | ν6 = 23.8 |
| R12 = −148.644 | D12 = 0.24 | | |
| R13 = −143.583 | D13 = 2.20 | N7 = 1.882997 | ν7 = 40.8 |
| R14 = 73.831 | D14 = 22.64 | | |
| R15 = Stop | D15 = 6.89 | | |
| R16 = 86.175 | D16 = 1.80 | N8 = 1.846658 | ν8 = 23.9 |
| R17 = 37.454 | D17 = 8.70 | N9 = 1.740999 | ν9 = 52.6 |
| R18 = −251.183 | D18 = 1.00 | | |
| R19 = 72.319 | D19 = 5.00 | N10 = 1.846658 | ν10 = 23.9 |
| R20 = −265.500 | D20 = 1.70 | N11 = 1.677900 | ν11 = 55.3 |
| R21 = 32.565 | D21 = 5.09 | | |
| R22 = −79.925 | D22 = 1.65 | N12 = 1.834807 | ν12 = 42.7 |
| R23 = 81.766 | D23 = 2.00 | | |
| R24 = 95.485 | D24 = 4.70 | N13 = 1.589130 | ν13 = 61.2 |
| R25 = −358.724 | D25 = 2.50 | | |
| R26 = 64.449 | D26 = 6.00 | N14 = 1.620410 | ν14 = 60.3 |
| R27 = −323.156 | D27 = 10.00 | | |
| R28 = ∞ | D28 = 2.00 | N15 = 1.516330 | ν15 = 64.2 |
| R29 = ∞ | D29 = 0.00 | | |

Numerical Example 6:

f = 294.59    Fno = 2.9    2ω = 8.4°

| | | | |
|---|---|---|---|
| R1 = 109.004 | D1 = 20.00 | N1 = 1.438750 | ν1 = 95.0 |
| R2 = −337.044 | D2 = 7.68 | | |
| R3 = 120.763 | D3 = 10.68 | N2 = 1.496999 | ν2 = 81.6 |
| R4 = 1437.484 | D4 = 3.40 | | |
| R5 = −357.888 | D5 = 4.50 | N3 = 1.834807 | ν3 = 42.7 |
| R6 = 162.770 | D6 = 2.19 | | |
| R7 = 66.497 | D7 = 12.00 | N4 = 1.496999 | ν4 = 81.6 |

-continued

| | | | |
|---|---|---|---|
| R8 = 213.508 | D8 = 8.57 | | |
| R9 = 78.563 | D9 = 4.30 | N5 = 1.783000 | ν5 = 36.1 |
| R10 = 46.466 | D10 = 11.47 | | |
| R11 = 70.759 | D11 = 6.00 | N6 = 1.805177 | ν6 = 25.4 |
| R12 = 111.421 | D12 = 12.46 | | |
| R13 = 223.657 | D13 = 6.40 | N7 = 1.846659 | ν7 = 23.8 |
| R14 = −95.192 | D14 = 2.20 | N8 = 1.873996 | ν8 = 35.3 |
| R15 = 74.016 | D15 = 34.25 | | |
| R16 = Stop | D16 = 0.15 | | |
| R17 = 95.372 | D17 = 1.80 | N9 = 1.846658 | ν9 = 23.9 |
| R18 = 39.225 | D18 = 8.00 | N10 = 1.788001 | ν10 = 47.4 |
| R19 = −317.147 | D19 = 1.00 | | |
| R20 = 85.813 | D20 = 4.81 | N11 = 1.846658 | ν11 = 23.9 |
| R21 = −148.467 | D21 = 1.70 | N12 = 1.693501 | ν12 = 53.2 |
| R22 = 39.654 | D22 = 4.31 | | |
| R23 = −109.978 | D23 = 1.65 | N13 = 1.772499 | ν13 = 49.6 |
| R24 = 70.657 | D24 = 2.50 | | |
| R25 = 92.243 | D25 = 5.09 | N14 = 1.743198 | ν14 = 49.3 |
| R26 = −82.526 | D26 = 1.65 | N15 = 1.846658 | ν15 = 23.9 |
| R27 = −545.554 | D27 = 0.15 | | |
| R28 = 70.252 | D28 = 4.00 | N16 = 1.772499 | ν16 = 49.6 |
| R29 = 221.586 | D29 = 10.00 | | |
| R30 = ∞ | D30 = 2.00 | N17 = 1.516330 | ν17 = 64.2 |
| R31 = ∞ | D31 = 0.00 | | |

Numerical Example 7:

f = 392.63  Fno = 2.9  2ω = 6.3°

| | | | |
|---|---|---|---|
| R1 = 230.594 | D1 = 19.50 | N1 = 1.496999 | ν1 = 81.6 |
| R2 = −485.236 | D2 = 25.00 | | |
| R3 = 116.456 | D3 = 18.50 | N2 = 1.496999 | ν2 = 81.6 |
| R4 = 16559.440 | D4 = 3.16 | | |
| R5 = −598.951 | D5 = 5.00 | N3 = 1.834807 | ν3 = 42.7 |
| R6 = 180.809 | D6 = 5.00 | | |
| R7 = 101.603 | D7 = 18.00 | N4 = 1.433870 | ν4 = 95.1 |
| R8 = −1247.770 | D8 = 0.30 | | |
| R9 = 61.716 | D9 = 8.00 | N5 = 1.516330 | ν5 = 64.2 |
| R10 = 49.261 | D10 = 32.01 | | |
| R11 = 554.747 | D11 = 5.50 | N6 = 1.805181 | ν6 = 25.4 |
| R12 = −143.642 | D12 = 3.20 | N7 = 1.882997 | ν7 = 40.8 |
| R13 = 113.429 | D13 = 80.43 | | |
| R14 = Stop | D14 = 3.00 | | |
| R15 = 147.302 | D15 = 2.00 | N8 = 1.846658 | ν8 = 23.9 |
| R16 = 48.444 | D16 = 7.50 | N9 = 1.772499 | ν9 = 49.6 |
| R17 = −261.799 | D17 = 2.50 | | |
| R18 = 94.352 | D18 = 4.80 | N10 = 1.846659 | ν10 = 23.8 |
| R19 = −180.338 | D19 = 2.00 | N11 = 1.696797 | ν11 = 55.5 |
| R20 = 37.593 | D20 = 7.00 | | |
| R21 = −125.641 | D21 = 2.00 | N12 = 1.772499 | ν12 = 49.6 |
| R22 = 90.522 | D22 = 3.00 | | |
| R23 = 71.238 | D23 = 7.00 | N13 = 1.487490 | ν13 = 70.2 |
| R24 = −100.000 | D24 = 0.30 | | |
| R25 = 56.853 | D25 = 5.50 | N14 = 1.804000 | ν14 = 46.6 |
| R26 = 2177.114 | D26 = 0.30 | | |
| R27 = −288.865 | D27 = 2.50 | N15 = 1.882997 | ν15 = 40.8 |
| R28 = 127.690 | D28 = 10.00 | | |
| R29 = ∞ | D29 = 10.00 | | |
| R30 = ∞ | D30 = 2.00 | N16 = 1.516330 | ν16 = 64.2 |
| R31 = ∞ | D31 = 0.00 | | |

Numerical Example 8:

f = 392.36  Fno = 2.9  2ω = 6.3°

| | | | |
|---|---|---|---|
| R1 = 37.048 | D1 = 20.50 | N1 = 1.496999 | ν1 = 81.6 |
| R2 = −398.288 | D2 = 8.01 | | |
| R3 = 123.081 | D3 = 20.00 | N2 = 1.496999 | ν2 = 81.6 |
| R4 = −8130.379 | D4 = 3.51 | | |
| R5 = −518.159 | D5 = 5.00 | N3 = 1.841000 | ν3 = 43.2 |
| R6 = 196.083 | D6 = 0.30 | | |
| R7 = 110.636 | D7 = 20.00 | N4 = 1.433870 | ν4 = 95.1 |
| R8 = −800.686 | D8 = 0.40 | | |
| R9 = 64.472 | D9 = 8.00 | N5 = 1.487490 | ν5 = 70.2 |
| R10 = 51.983 | D10 = 34.60 | | |
| R11 = 3054.493 | D11 = 6.50 | N6 = 1.846659 | ν6 = 23.8 |
| R12 = −120.403 | D12 = 3.20 | N7 = 1.882997 | ν7 = 40.8 |
| R13 = 113.234 | D13 = 77.91 | | |
| R14 = Stop | D14 = 3.00 | | |
| R15 = 70.358 | D15 = 2.00 | N8 = 1.850259 | ν8 = 32.3 |
| R16 = 29.246 | D16 = 17.00 | N9 = 1.788001 | ν9 = 47.4 |
| R17 = −54.603 | D17 = 2.00 | N10 = 1.784723 | ν10 = 25.7 |
| R18 = −212.724 | D18 = 1.50 | | |
| R19 = 97.548 | D19 = 5.50 | N11 = 1.846659 | ν11 = 23.8 |
| R20 = 54.071 | D20 = 1.50 | N12 = 1.772499 | ν12 = 49.6 |
| R21 = 36.315 | D21 = 4.67 | | |
| R22 = −68.773 | D22 = 1.70 | N13 = 1.772499 | ν13 = 49.6 |
| R23 = 54.913 | D23 = 3.46 | | |
| R24 = 81.617 | D24 = 11.00 | N14 = 1.712995 | ν14 = 53.8 |
| R25 = −31.984 | D25 = 2.50 | N15 = 1.882997 | ν15 = 40.8 |
| R26 = −103.789 | D26 = 0.70 | | |
| R27 = 63.560 | D27 = 6.00 | N16 = 1.487490 | ν16 = 70.2 |
| R28 = −2394.641 | D28 = 10.00 | | |
| R29 = ∞ | D29 = 2.00 | N17 = 1.516330 | ν17 = 64.2 |
| R30 = ∞ | D30 = 15.00 | | |
| R31 = ∞ | D31 = 0.00 | | |

Numerical Example 9:

f = 392.64  Fno = 2.9  2ω = 6.3°

| | | | |
|---|---|---|---|
| R1 = 167.587 | D1 = 27.00 | N1 = 1.433870 | ν1 = 95.1 |
| R2 = −346.205 | D2 = 1.87 | | |
| R3 = 163.356 | D3 = 16.00 | N2 = 1.496999 | ν2 = 81.6 |
| R4 = 25425.580 | D4 = 4.96 | | |
| R5 = −447.338 | D5 = 6.00 | N3 = 1.834807 | ν3 = 42.7 |
| R6 = 267.426 | D6 = 21.31 | | |
| R7 = 103.158 | D7 = 17.00 | N4 = 1.496999 | ν4 = 81.6 |
| R8 = 683.915 | D8 = 0.15 | | |
| R9 = 75.382 | D9 = 8.00 | N5 = 1.516330 | ν5 = 64.2 |
| R10 = 55.902 | D10 = 39.39 | | |
| R11 = 1931.153 | D11 = 5.00 | N6 = 1.846659 | ν6 = 23.8 |
| R12 = −225.124 | D12 = 3.30 | N7 = 1.772499 | ν7 = 49.6 |
| R13 = 109.389 | D13 = 85.72 | | |
| R14 = Stop | D14 = 3.00 | | |
| R15 = 88.332 | D15 = 2.00 | N8 = 1.846658 | ν8 = 23.9 |
| R16 = 39.146 | D16 = 8.50 | N9 = 1.772499 | ν9 = 49.6 |
| R17 = −739.093 | D17 = 1.50 | | |
| R18 = 62.058 | D18 = 6.00 | N10 = 1.846659 | ν10 = 23.8 |
| R19 = −399.632 | D19 = 2.00 | N11 = 1.712995 | ν11 = 53.8 |
| R20 = 33.551 | D20 = 7.00 | | |
| R21 = −115.612 | D21 = 2.00 | N12 = 1.834807 | ν12 = 42.7 |
| R22 = 71.877 | D22 = 4.90 | | |
| R23 = 73.591 | D23 = 6.00 | N13 = 1.712995 | ν13 = 53.8 |
| R24 = 628.875 | D24 = 5.00 | | |
| R25 = 61.246 | D25 = 9.00 | N14 = 1.516330 | ν14 = 64.2 |
| R26 = −74.111 | D26 = 2.50 | N15 = 1.834000 | ν15 = 37.2 |
| R27 = −242.883 | D27 = 10.00 | | |
| R28 = ∞ | D28 = 10.00 | | |
| R29 = ∞ | D29 = 2.00 | N16 = 1.516330 | ν16 = 64.2 |
| R30 = ∞ | D30 = 0.00 | | |

Numerical Example 10:

f = 490.93  Fno = 4.1  2ω = 5.0°

| | | | |
|---|---|---|---|
| R1 = 242.495 | D1 = 19.00 | N1 = 1.496999 | ν1 = 81.6 |
| R2 = −351.283 | D2 = 0.15 | | |
| R3 = 159.444 | D3 = 15.00 | N2 = 1.433870 | ν2 = 95.1 |
| R4 = 31432.350 | D4 = 3.17 | | |
| R5 = −516.520 | D5 = 6.00 | N3 = 1.834807 | ν3 = 42.7 |
| R6 = 301.745 | D6 = 30.45 | | |
| R7 = 132.657 | D7 = 14.00 | N4 = 1.496999 | ν4 = 81.6 |
| R8 = 8379.413 | D8 = 22.08 | | |
| R9 = 75.972 | D9 = 8.00 | N5 = 1.487490 | ν5 = 70.2 |
| R10 = 59.171 | D10 = 22.80 | | |
| R11 = 13718.510 | D11 = 5.00 | N6 = 1.846659 | ν6 = 23.8 |
| R12 = −203.722 | D12 = 3.50 | N7 = 1.772499 | ν7 = 49.6 |
| R13 = 130.311 | D13 = 78.50 | | |
| R14 = Stop | D14 = 5.00 | | |
| R15 = 137.869 | D15 = 2.00 | N8 = 1.805177 | ν8 = 25.4 |
| R16 = 42.021 | D16 = 7.50 | N9 = 1.712995 | ν9 = 53.8 |
| R17 = −389.647 | D17 = 1.50 | | |
| R18 = 94.344 | D18 = 4.50 | N10 = 1.846659 | ν10 = 23.8 |
| R19 = −358.808 | D19 = 2.00 | N11 = 1.589130 | ν11 = 61.2 |
| R20 = 40.774 | D20 = 6.00 | | |
| R21 = −119.482 | D21 = 2.00 | N12 = 1.882997 | ν12 = 40.8 |
| R22 = 122.392 | D22 = 7.46 | | |

-continued

| | | | |
|---|---|---|---|
| R23 = 112.383 | D23 = 5.00 | N13 = 1.487490 | ν13 = 70.2 |
| R24 = −244.999 | D24 = 5.00 | | |
| R25 = 84.638 | D25 = 5.00 | N14 = 1.581439 | ν14 = 40.8 |
| R26 = 826.832 | D26 = 10.00 | | |
| R27 = ∞ | D27 = 30.00 | | |
| R28 = ∞ | D28 = 2.00 | N15 = 1.516330 | ν15 = 64.2 |
| R29 = ∞ | D29 = 0.00 | | |

Numerical Example 11:

f = 490.43  Fno = 4.1  2ω = 5.0°

| | | | |
|---|---|---|---|
| R1 = 191.078 | D1 = 16.00 | N1 = 1.496999 | ν1 = 81.6 |
| R2 = −837.511 | D2 = 60.00 | | |
| R3 = 148.397 | D3 = 11.00 | N2 = 1.496999 | ν2 = 81.6 |
| R4 = −2763.679 | D4 = 2.89 | | |
| R5 = −359.504 | D5 = 5.00 | N3 = 1.834807 | ν3 = 42.7 |
| R6 = 221.369 | D6 = 0.30 | | |
| R7 = 111.847 | D7 = 13.50 | N4 = 1.433870 | ν4 = 95.1 |
| R8 = −521.704 | D8 = 0.30 | | |
| R9 = 60.000 | D9 = 8.00 | N5 = 1.516330 | ν5 = 64.2 |
| R10 = 50.660 | D10 = 26.25 | | |
| R11 = 21073.760 | D11 = 4.50 | N6 = 1.846659 | ν6 = 23.8 |
| R12 = −289.113 | D12 = 3.00 | N7 = 1.804000 | ν7 = 46.6 |
| R13 = 134.845 | D13 = 94.24 | | |
| R14 = Stop | D14 = 3.00 | | |
| R15 = 123.705 | D15 = 2.00 | N8 = 1.805177 | ν8 = 25.4 |
| R16 = 48.507 | D16 = 7.50 | N9 = 1.622992 | ν9 = 58.1 |
| R17 = −225.974 | D17 = 1.50 | | |
| R18 = 96.072 | D18 = 4.50 | N10 = 1.846659 | ν10 = 23.8 |
| R19 = −179.965 | D19 = 2.00 | N11 = 1.622992 | ν11 = 58.1 |
| R20 = 44.217 | D20 = 5.19 | | |
| R21 = −109.530 | D21 = 2.00 | N12 = 1.806098 | ν12 = 41.0 |
| R22 = 103.109 | D22 = 3.00 | | |
| R23 = 195.226 | D23 = 4.00 | N13 = 1.622992 | ν13 = 58.1 |
| R24 = −295.920 | D24 = 0.20 | | |
| R25 = 75.744 | D25 = 4.00 | N14 = 1.772499 | ν14 = 49.6 |
| R26 = 341.622 | D26 = 30.00 | | |
| R27 = ∞ | D27 = 20.00 | | |
| R28 = ∞ | D28 = 2.00 | N15 = 1.516330 | ν15 = 64.2 |
| R29 = ∞ | D29 = 2.00 | | |

Numerical Example 12:

f = 490.50  Fno = 4.1  2ω = 5.0°

| | | | |
|---|---|---|---|
| R1 = 238.679 | D1 = 15.00 | N1 = 1.496999 | ν1 = 81.5 |
| R2 = −610.460 | D2 = 44.75 | | |
| R3 = 120.122 | D3 = 14.00 | N2 = 1.496999 | ν2 = 81.5 |
| R4 = 20634.630 | D4 = 3.19 | | |
| R5 = −413.582 | D5 = 5.00 | N3 = 1.815543 | ν3 = 44.4 |
| R6 = 187.061 | D6 = 18.30 | | |
| R7 = 119.641 | D7 = 15.00 | N4 = 1.433870 | ν4 = 95.1 |
| R8 = −340.174 | D8 = 0.50 | | |
| R9 = 60.219 | D9 = 8.00 | N5 = 1.516330 | ν5 = 64.1 |
| R10 = 50.784 | D10 = 26.66 | | |
| R11 = 553.174 | D11 = 9.00 | N6 = 1.846658 | ν6 = 23.9 |
| R12 = −88.877 | D12 = 3.00 | N7 = 1.850259 | ν7 = 32.3 |
| R13 = 111.984 | D13 = 61.69 | | |
| R14 = 218.219 | D14 = 7.00 | N8 = 1.725999 | ν8 = 53.6 |
| R15 = −77.067 | D15 = 2.50 | N9 = 1.739998 | ν9 = 28.3 |
| R16 = −269.930 | D16 = 12.84 | | |
| R17 = 189.621 | D17 = 2.00 | N10 = 1.725999 | ν10 = 53.6 |
| R18 = 31.100 | D18 = 3.50 | N11 = 1.846659 | ν11 = 23.8 |
| R19 = 50.030 | D19 = 4.02 | | |
| R20 = −167.997 | D20 = 2.00 | N12 = 1.525416 | ν12 = 64.5 |
| R21 = 87.547 | D21 = 4.04 | | |
| R22 = Stop | D22 = 6.00 | | |
| R23 = 91.757 | D23 = 4.50 | N13 = 1.548141 | ν13 = 45.9 |
| R24 = −285.197 | D24 = 5.00 | | |
| R25 = 83.670 | D25 = 5.50 | N14 = 1.595509 | ν14 = 39.3 |
| R26 = −92.756 | D26 = 2.00 | N15 = 1.846659 | ν15 = 23.8 |
| R27 = 631.030 | D27 = 20.00 | | |
| R28 = ∞ | D28 = 30.00 | | |
| R29 = ∞ | D29 = 2.00 | N16 = 1.516330 | ν16 = 64.1 |
| R30 = ∞ | D30 = 0.00 | | |

Numerical Example 13:

f = 490.50  Fno = 4.1  2ω = 5.0°

| | | | |
|---|---|---|---|
| R1 = 233.300 | D1 = 15.00 | N1 = 1.496999 | ν1 = 81.5 |
| R2 = −694.478 | D2 = 36.06 | | |
| R3 = 115.681 | D3 = 14.00 | N2 = 1.496999 | ν2 = 81.5 |
| R4 = 1695.578 | D4 = 3.60 | | |
| R5 = −500.911 | D5 = 5.00 | N3 = 1.786500 | ν3 = 50.0 |
| R6 = 173.774 | D6 = 17.90 | | |
| R7 = 114.513 | D7 = 15.50 | N4 = 1.433870 | ν4 = 95.1 |
| R8 = −399.628 | D8 = 0.71 | | |
| R9 = 66.962 | D9 = 8.00 | N5 = 1.516330 | ν5 = 64.1 |
| R10 = 53.781 | D10 = 25.00 | | |
| R11 = 360.120 | D11 = 8.00 | N6 = 1.846659 | ν6 = 23.8 |
| R12 = −129.705 | D12 = 3.00 | N7 = 1.850259 | ν7 = 32.3 |
| R13 = 119.592 | D13 = 71.09 | | |
| R14 = 114.524 | D14 = 10.00 | N8 = 1.691002 | ν8 = 54.8 |
| R15 = −60.959 | D15 = 2.50 | N9 = 1.846659 | ν9 = 23.8 |
| R16 = −229.737 | D16 = 4.00 | | |
| R17 = Stop | D17 = 4.60 | | |
| R18 = 116.346 | D18 = 2.00 | N10 = 1.677900 | ν10 = 55.3 |
| R19 = 42.845 | D19 = 5.18 | | |
| R20 = −67.800 | D20 = 2.86 | N11 = 1.846658 | ν11 = 23.9 |
| R21 = −31.608 | D21 = 2.00 | N12 = 1.733997 | ν12 = 51.5 |
| R22 = 128.914 | D22 = 6.67 | | |
| R23 = 124.945 | D23 = 4.50 | N13 = 1.487490 | ν13 = 70.2 |
| R24 = −147.029 | D24 = 5.00 | | |
| R25 = 98.259 | D25 = 4.50 | N14 = 1.518206 | ν14 = 65.0 |
| R26 = −282.836 | D26 = 20.00 | | |
| R27 = ∞ | D27 = 50.00 | | |
| R28 = ∞ | D28 = 2.00 | N15 = 1.516330 | ν15 = 64.1 |
| R29 = ∞ | D29 = 0.00 | | |

Numerical Example 14 f = 490.62  Fno = 4.1  2ω = 5.0°

| | | | |
|---|---|---|---|
| R1 = 229.536 | D1 = 14.20 | N1 = 1.496999 | ν1 = 81.5 |
| R2 = −687.246 | D2 = 49.95 | | |
| R3 = 108.775 | D3 = 13.30 | N2 = 1.496999 | ν2 = 81.5 |
| R4 = 773.530 | D4 = 3.00 | | |
| R5 = −810.671 | D5 = 5.00 | N3 = 1.834807 | ν3 = 42.7 |
| R6 = 203.718 | D6 = 21.03 | | |
| R7 = 98.885 | D7 = 13.50 | N4 = 1.433870 | ν4 = 95.1 |
| R8 = −1780.918 | D8 = 0.54 | | |
| R9 = 74.787 | D9 = 8.00 | N5 = 1.516330 | ν5 = 64.1 |
| R10 = 52.572 | D10 = 21.93 | | |
| R11 = 374.703 | D11 = 5.70 | N6 = 1.805181 | ν6 = 25.4 |
| R12 = −151.410 | D12 = 3.00 | N7 = 1.834000 | ν7 = 37.2 |
| R13 = 111.422 | D13 = 83.31 | | |
| R14 = Stop | D14 = 3.00 | | |
| R15 = 106.903 | D15 = 2.00 | N8 = 1.846658 | ν8 = 23.9 |
| R16 = 54.226 | D16 = 9.00 | N9 = 1.617722 | ν9 = 49.8 |
| R17 = −69.348 | D17 = 2.00 | N10 = 1.698947 | ν10 = 30.1 |
| R18 = −220.900 | D18 = 2.00 | | |
| R19 = 139.053 | D19 = 3.80 | N11 = 1.805177 | ν11 = 25.4 |
| R20 = −154.440 | D20 = 1.80 | N12 = 1.603112 | ν12 = 60.6 |
| R21 = 46.963 | D21 = 4.46 | | |
| R22 = −93.888 | D22 = 1.80 | N13 = 1.651597 | ν13 = 58.5 |
| R23 = 111.389 | D23 = 2.01 | | |
| R24 = 103.442 | D24 = 4.00 | N14 = 1.572501 | ν14 = 57.7 |
| R25 = −949.623 | D25 = 3.84 | | |
| R26 = 100.368 | D26 = 4.00 | N15 = 1.772499 | ν15 = 49.6 |
| R27 = 719.633 | D27 = 5.00 | | |
| R28 = ∞ | D28 = 50.00 | | |
| R29 = ∞ | D29 = 2.00 | N16 = 1.516330 | ν16 = 64.1 |
| R30 = ∞ | D30 = 0.00 | | |

Numerical Example 15:

f = 589.10  Fno = 4.1  2ω = 4.2°

| | | | |
|---|---|---|---|
| R1 = 248.202 | D1 = 20.00 | N1 = 1.496999 | ν1 = 81.6 |
| R2 = −498.430 | D2 = 41.18 | | |
| R3 = 167.006 | D3 = 13.80 | N2 = 1.496999 | ν2 = 81.6 |
| R4 = −9370.595 | D4 = 3.95 | | |
| R5 = −423.560 | D5 = 6.00 | N3 = 1.834807 | ν3 = 42.7 |
| R6 = 267.381 | D6 = 55.58 | | |

-continued

| | | | |
|---|---|---|---|
| R7 = 143.102 | D7 = 16.00 | N4 = 1.433870 | ν4 = 95.1 |
| R8 = −431.781 | D8 = 19.02 | | |
| R9 = 61.131 | D9 = 8.00 | N5 = 1.516330 | ν5 = 64.2 |
| R10 = 51.651 | D10 = 24.07 | | |
| R11 = 444.828 | D11 = 5.00 | N6 = 1.805181 | ν6 = 25.4 |
| R12 = −175.088 | D12 = 3.00 | N7 = 1.834807 | ν7 = 42.7 |
| R13 = 109.777 | D13 = 78.36 | | |
| R14 = Stop | D14 = 3.00 | | |
| R15 = 110.947 | D15 = 2.00 | N8 = 1.805177 | ν8 = 25.4 |
| R16 = 43.577 | D16 = 7.00 | N9 = 1.638539 | ν9 = 55.4 |
| R17 = −252.266 | D17 = 1.50 | | |
| R18 = 99.592 | D18 = 4.50 | N10 = 1.805181 | ν10 = 25.4 |
| R19 = −196.139 | D19 = 2.00 | N11 = 1.589130 | ν11 = 61.2 |
| R20 = 42.436 | D20 = 5.64 | | |
| R21 = −97.387 | D21 = 2.00 | N12 = 1.772499 | ν12 = 49.6 |
| R22 = 91.771 | D22 = 3.50 | | |
| R23 = 99.542 | D23 = 8.00 | N13 = 1.647689 | ν13 = 33.8 |
| R24 = −56.012 | D24 = 2.00 | N14 = 1.805177 | ν14 = 25.4 |
| R25 = −669.242 | D25 = 5.00 | | |
| R26 = 99.606 | D26 = 5.00 | N15 = 1.581439 | ν15 = 40.8 |
| R27 = −224.105 | D27 = 30.00 | | |
| R28 = ∞ | D28 = 20.00 | | |
| R29 = ∞ | D29 = 2.00 | N16 = 1.516330 | ν16 = 64.2 |
| R30 = ∞ | D30 = 2.00 | | |

Numerical Example 16:

f = 595.74   Fno = 4.1   2ω = 4.2°

| | | | |
|---|---|---|---|
| R1 = 212.522 | D1 = 26.00 | N1 = 1.433870 | ν1 = 95.1 |
| R2 = −350.327 | D2 = 1.00 | | |
| R3 = 259.375 | D3 = 14.00 | N2 = 1.496999 | ν2 = 81.6 |
| R4 = −3467.645 | D4 = 4.50 | | |
| R5 = −458.933 | D5 = 8.00 | N3 = 1.834807 | ν3 = 42.7 |
| R6 = 690.686 | D6 = 1.00 | | |
| R7 = 130.800 | D7 = 15.00 | N4 = 1.496999 | ν4 = 81.6 |
| R8 = 386.189 | D8 = 0.50 | | |
| R9 = 111.776 | D9 = 9.00 | N5 = 1.696797 | ν5 = 55.5 |
| R10 = 82.874 | D10 = 92.83 | | |
| R11 = 449.441 | D11 = 5.00 | N6 = 1.805181 | ν6 = 25.4 |
| R12 = −336.359 | D12 = 0.60 | | |
| R13 = −247.748 | D13 = 3.30 | N7 = 1.804000 | ν7 = 46.6 |
| R14 = 141.539 | D14 = 64.90 | | |
| R15 = ∞ | D15 = 5..97 | | |
| R16 = 366.708 | D16 = 3.00 | N8 = 1.846659 | ν8 = 23.8 |
| R17 = 58.799 | D17 = 7.20 | N9 = 1.804000 | ν9 = 46.6 |
| R18 = −209.451 | D18 = 3.00 | | |
| R19 = 368.967 | D19 = 4.80 | N10 = 1.846659 | ν10 = 23.8 |
| R20 = −93.813 | D20 = 3.00 | N11 = 1.729157 | ν11 = 54.7 |
| R21 = 69.657 | D21 = 3.90 | | |
| R22 = −176.340 | D22 = 3.00 | N12 = 1.729157 | ν12 = 54.7 |
| R23 = 144.869 | D23 = 3.98 | | |
| R24 = 659.362 | D24 = 4.80 | N13 = 1.583126 | ν13 = 59.4 |
| R25 = −139.392 | D25 = 0.30 | | |
| R26 = 91.884 | D26 = 4.80 | N14 = 1.487490 | ν14 = 70.2 |
| R27 = 1894.177 | D27 = 4.00 | | |
| R28 = Stop | D28 = 40.00 | | |
| R29 = ∞ | D29 = 2.00 | N15 = 1.516330 | ν15 = 64.2 |
| R30 = ∞ | D30 = 153.68 | | |

TABLE 1

| Condition | Numerical Example | | |
|---|---|---|---|
| Factor & No. | 1 | 2 | 3 |
| (3) f1/f | 0.545 | 0.593 | 0.598 |
| (4) \|f2/f\| | 0.394 | 0.444 | 0.525 |
| (5) f/f3 | 0.828 | 1.016 | 0.408 |
| (6) f31/f | 0.341 | 0.313 | 0.411 |
| (7) \|f32/f\| | 0.116 | 0.109 | 0.130 |
| (8) f33/f | 0.178 | 0.170 | 0.204 |
| (1) fair/f32 | 1.067 | 0.994 | 0.859 |
| (2) * | 0.350 | 0.432 | 0.519 |
| (9) νn − νp | 17.3 | 18.9 | 17.0 |

*|(Rair1 + Rair2)/(Rair1 − Rair2)|

TABLE 1-continued

| Condition | Numerical Example | | | |
|---|---|---|---|---|
| No. | 4 | 5 | 6 | 7 |
| (3) | 0.486 | 0.577 | 0.602 | 0.514 |
| (4) | 0.319 | 0.379 | 0.419 | 0.373 |
| (5) | 1.128 | 1.020 | 1.033 | 0.820 |
| (6) | 0.315 | 0.345 | 0.347 | 0.358 |
| (7) | 0.109 | 0.120 | 0.142 | 0.110 |
| (8) | 0.171 | 0.181 | 0.215 | 0.155 |
| (1) | 0.895 | 0.874 | 0.953 | 0.912 |
| (2) | 0.388 | 0.421 | 0.470 | 0.539 |
| (9) | 18.9 | 17.0 | 23.6 | 15.4 |

| Condition | Numerical Example | | | |
|---|---|---|---|---|
| No. | 8 | 10 | 11 | 12 |
| (3) | 0.491 | 0.460 | 0.464 | 0.446 |
| (4) | 0.326 | 0.371 | 0.353 | 0.338 |
| (5) | 1.106 | 0.568 | 0.601 | 0.466 |
| (6) | 0.192 | 0.374 | 0.372 | 0.349 |
| (7) | 0.070 | 0.108 | 0.109 | 0.111 |
| (8) | 0.134 | 0.167 | 0.154 | 0.186 |
| (1) | 1.086 | 0.839 | 0.847 | 0.903 |
| (2) | 0.201 | 0.491 | 0.425 | 0.541 |
| (9) | 17.0 | 25.8 | 22.8 | 8.4 |

| Condition | Numerical Example | | | |
|---|---|---|---|---|
| No. | 13 | 14 | 15 | 16 |
| (3) | 0.462 | 0.483 | 0.432 | 0.483 |
| (4) | 0.435 | 0.374 | 0.288 | 0.359 |
| (5) | 0.223 | 0.574 | 0.386 | 0.340 |
| (6) | 0.287 | 0.360 | 0.286 | 0.312 |
| (7) | 0.080 | 0.111 | 0.082 | 0.104 |
| (8) | 0.147 | 0.163 | 0.133 | 0.166 |
| (1) | 0.864 | 0.913 | 0.919 | 1.096 |
| (2) | 0.225 | 0.333 | 0.393 | 0.434 |
| (9) | 8.5 | 11.8 | 17.3 | 21.2 |

(Second Embodiment)

Next, another embodiment of the invention is described. FIGS. 65 to 69 are lens block diagrams of five numerical examples 17 to 21 of the second embodiment, respectively, where each optical system comprises, in order from an object side, a first lens unit L1 of positive refractive power, a second lens unit L2 of negative refractive power and a third lens unit L3 of positive refractive power.

The third lens unit L3 comprises a first lens subunit L31 of positive refractive power, a second lens subunit L32 of negative refractive power and a third lens subunit L33 of positive refractive power. HG stands for a protection glass, SP stands for an aperture stop, FL stands for an optical filter, FC stands for a flare cut filter, and IP stands for an image plane.

The second lens unit L2 is made to axially move toward the image side, during focusing from an infinitely distant object to an object at the minimum distance, as indicated by an arrow LF. The second lens subunit L32 is a movable lens subunit (image displacement compensation unit) which is made to move in directions perpendicular to an optical axis as indicated by a double-headed arrow LT, so as to compensate for the shake of the image when the optical system vibrates.

According to the present embodiment, the optical system has the following features. As compared with the first lens unit L1, the second lens unit L2 of negative refractive power has a small diameter and a far lighter weight. So, the second lens unit L2 is selected to be used as the focusing lens. Therefore, a driving device used for the second lens unit L2 is of low torque and small size. The light beam emerging from the second lens unit L2 is made to converge in passing through the first lens subunit L31 of positive refractive power. This makes it easier to minimize the diameter of the second lens subunit L32 (image displacement compensation unit). The use of the third lens subunit L33 of positive refractive power allows the negative refractive power of the second lens subunit L32 to increase, while keeping the constant focal length of the entire optical system. Accordingly, the decentering movement of the second lens subunit L32 can be reduced to effect the equivalent displacement of the image on the focal plane. The image is thus quickly stabilized.

The present embodiment has set forth such features to stabilize the image with good reliability and ease when the video camera or still camera is equipped with the telephoto lens and when the user holds it by his or her hands, or on an unsteady tripod or mono-pod.

The optical system of the present embodiment is of the inner focus type and has the image stabilizing function, as described above. On this premise, according to the basic design of the optical system, as described above, the optical system comprises, in order from the object side, the first lens unit L1 of positive refractive power, the second lens unit L2 of negative refractive power and the third lens unit L3 of positive refractive power, totaling three lens units, and the third lens unit L3 comprises, in order from the object side, the first lens subunit L31 of positive refractive power, the second lens subunit L32 of negative refractive power and the third lens subunit L33 of positive refractive power, totaling three subunits, wherein the second lens unit L2 moves along the optical axis to effect focusing and the second lens subunit L32 moves in the directions perpendicular to the optical axis to displace the image position for the purpose of stabilizing the image on the focal plane.

Then, the optical system according to the present embodiment satisfies the following condition (10) and/or conditions (11) to (13):

$$|f/f1-2|<0.1 \quad (10)$$

$$0.2<f1/f<0.6 \quad (11)$$

$$0.1<|f2/f1|<0.7 \quad (12)$$

$$0.2<f3/f<0.8 \quad (13)$$

where f1-2: the overall focal length of the first and second lens units, f: the focal length of the entire optical system, and fi: the focal length of the i-th lens unit.

The inequality of condition (10) means that the overall focal length f1-2 of the first and second lens units L1 and L2 is not less than 10 times longer than the focal length f of the entire optical system. In other words, the light beam after having passed through the first and second lens units L1 and L2 is made almost afocal.

With this arrangement, an image point by the first and second lens units L1 and L2 (or an object point for the third lens unit L3) is made far enough from the third lens unit L3, thus reducing the focus sensitivity of the separation between the second and third lens units L2 and L3. This makes it easier to manufacture the optical systems.

In particular, since the third lens unit L3 contains the image stabilizing lens, because its operating mechanism tends to become complicated, the condition (10) is satisfied for moderating the accuracy of setting up the second and third lens units L2 and L3 on the assembly line.

Incidentally, it is more preferred to alter the numerical range of the condition (10) as follows:

$$|f/f1-2|<0.07$$

In any of the numerical examples 17 to 21, all the optical parameters of each lens unit are so determined as to satisfy the conditions (11), (12) and (13). The requirements of minimizing the size of the entire optical system and of well stabilizing the image are thus fulfilled at once. In addition, as the second lens subunit L32 moves in the directions perpendicular to the optical axis, the produced amount of decentering aberrations, especially decentering coma, decentering astigmatism and decentering field curvature, is reduced and a good optical performance is maintained stable throughout the entire focusing range.

The technical significance of the above conditions (11), (12) and (13) are described below.

The inequalities of condition (11) give a proper range for the positive refractive power of the first lens unit L1. When the upper limit of the condition (11) is exceeded, as this means that the refractive power of the first lens unit L1 is too weak, the telephoto system produces a weak effect, causing the total length of the entire optical system to increase objectionably. The converging action also becomes too weak. Therefore, a bulky light bundle enters the second lens unit L2. To admit of this, the diameter of the second lens unit L2 has to increase largely. Conversely when the lower limit is exceeded, as this means that the positive refractive power is too strong, spherical aberrations of higher orders are produced, which are hardly corrected by the other lens units.

The inequalities of condition (12) are provided for determining the refractive powers of the negative second or focusing lens unit L2 and the positive first lens unit L1 in appropriate relation. When the upper limit of the condition (12) is exceeded, the various aberrations, especially spherical aberration, produced by the first lens unit L1 of positive refractive power can be no longer corrected by the second lens unit L2 of negative refractive power. When the lower limit is exceeded, on the other hand, the spherical aberration is over-corrected by the second lens unit L2. As a result, the whole optical system hardly retains the good optical performance.

The inequalities of condition (13) give a proper range for the refractive power of the positive third lens unit L3. When the upper limit of the condition (13) is exceeded, too long a back focal distance results. Therefore, the size of the entire optical system is hardly minimized and, moreover, the positive distortion produced by the first lens unit L1 becomes difficult to correct.

When the lower limit is exceeded, the number of lens elements in the third lens unit L3 has to be increased. Otherwise, spherical aberration and coma flare could not be corrected. As a result, the size of the entire optical system is hardly minimized and, moreover, the light transmittance of the optical system worsens. So, these violations are objectionable.

In the present embodiment, for more desired results, it is preferred to alter the numerical values of the conditions (11) to (13) as follows:

$$0.3<f1/f<0.5 \quad (11a)$$

$$0.25<|f2/f1|<0.55 \quad (12a)$$

$$0.25<f3/f<0.6 \quad (13a)$$

As described above, the rules of lens design are set forth to compensate for the shake of the image on the focal plane when the optical system vibrates, while still permitting the variation with vibration of decentering aberrations to be reduced to a minimum and also maintaining good stability of optical performance throughout the entire focusing range.

To further reduce the variation of decentering aberrations with image stabilizing and to further improve the optical performance throughout the entire focusing range, it is preferred to satisfy at least one of the following features or conditions.

(b-1) The second lens unit has two negative lenses and one positive lens. The focal length f2 of the second lens unit L2 and the focal lengths f31, f32 and f33 of the first, second and third lens subunits L31, L32 and L33, respectively, lie within the following ranges.

$$0.05<|f2/f|<0.3 \quad (14)$$

$$0.1<f31/f<0.5 \quad (15)$$

$$0.05<f32/f<0.2 \quad (16)$$

$$0.08<f33/f<0.3 \quad (17)$$

In the present embodiment, the second lens unit L2 is made constructed with at least two negative lenses and at least one positive lenses, thereby making it easy to maintain good stability of correction of various aberrations. Further, when the condition (14) is satisfied, the second lens unit L2 is determined to have so appropriate a refractive power that a relatively small movement of the second lens unit L2 suffices for focusing from an infinitely distant object to an object at the minimum distance.

The inequalities of conditions (15) to (17) are provided for assuring that, as the second lens subunit L32 moves in the directions perpendicular to the optical axis to displace the image position, the sensitivity of image displacement gets high enough, while still maintaining good image quality to be achieved. When the numerical ranges of these conditions (15) to (17) are exceeded, it becomes difficult to keep the balance therebetween.

It is more preferred that the numerical ranges of the above conditions (14) to (17) are made narrower as follows:

$$0.1<|f2/f|<0.25 \quad (14a)$$

$$0.15<f31/f<0.35 \quad (15a)$$

$$0.07<|f32/f|<0.18 \quad (16a)$$

$$0.1<f33/f<0.25 \quad (17a)$$

(b-2) In order to make it easier to correct the residual aberrations produced by the first and second lens units L1 and L2 by means of the second lens subunit L32 and the third lens subunit L33, the first lens subunit L31 is better corrected for longitudinal chromatic aberration. In this respect, the first lens subunit L31 is desired to have at least one positive lens and at least one negative lens.

(b-3) The second lens subunit L32 comprises a plurality of negative lenses and at least one positive lens. This makes it easier to reduce the variation of chromatic aberrations and other aberrations when stabilizing the image.

(b-4) To achieve a high sensitivity of image displacement, the third lens subunit L33 is better given a somewhat strong positive refractive power. Particularly for a large-relative-aperture lens system to achieve, it is preferred that the third lens subunit L33 has a plurality of positive lenses with an advantage of correcting, among others, spherical aberrations of higher orders. If the third lens subunit L33 further includes at least one positive cemented lens composed of negative and positive lenses, or at least one pair of positive and negative lenses with their confronting surfaces of nearly equal radii of curvature to each other, even more improved chromatic aberrations can be expected.

(b-5) The first lens unit L1 is better constructed with a plurality of positive lenses and at least one negative lens. To attain a high image quality, the first lens unit L1 is better constructed with, in order from the object side, a positive lens, a positive lens, a bi-concave lens, a negative lens of meniscus form convex toward the object side and a positive lens having a strong convex surface facing the object side.

(b-6) To protect the exposed lens surface to the outside and prevent occurrence of a change of the position of the sharp focus owing to the expansion or contraction of the lens elements with change of the ambient temperature, use may be made of a flat glass plate or transparent member or a lens of weak refractive power on the object side of the lens system.

(b-7) An iris diaphragm (aperture stop SP) may take any position whatever in the lens system, provided that, when stopped down, the light beam which goes to the margin of the useful image circle is not vignetted. On consideration of the space efficiency of layout of the drive mechanism for the focusing lens unit, the moving mechanism for the image stabilizing subunit and the mother board of electric circuitry, however, the iris diaphragm is better positioned in the air space between the second and third lens units L2 and L3, or in the interior of the third lens unit L3.

(b-8) The optical filter FL is positioned in the space between the rearmost lens surface and the image plane, as desired because of assuring minimization of the diameter of the filter and from the point of view of the space efficiency.

(b-9) A fixed stop is better positioned in the air space between the rearmost lens surface and the image plane. With this arrangement, when stabilizing the image, the asymmetry of corner illuminations can be reduced.

Next, five numerical examples 17 to 21 of the second embodiment are shown. In the numerical data for the examples 17 to 21, Ri is the radius of curvature of the i-th lens surface, when counted from the object side, Di is the i-th axial lens thickness or air separation, when counted from the object side, and Ni and νi are respectively the refractive index and Abbe number of the material of the i-th lens element, when counted from the object side. In the numerical examples 17 to 21, the second and third surfaces from the last define a glass block such as phase plate or filter. The values of the factors in the above-described conditions (11) to (17) for the numerical examples 17 to 21 are listed in Table-2.

Numerical Example 17:

f = 294.60  Fno = 2.9  2ω = 8.4°

| | | | |
|---|---|---|---|
| R1 = ∞ | D1 = 8.00 | N1 = 1.516330 | ν1 = 64.1 |
| R2 = ∞ | D2 = 1.50 | | |
| R3 = 156.203 | D3 = 13.39 | N2 = 1.496999 | ν2 = 81.5 |
| R4 = −2554.535 | D4 = 1.00 | | |
| R5 = 143.596 | D5 = 16.52 | N3 = 1.496999 | ν3 = 81.5 |
| R6 = −252.276 | D6 = 0.33 | | |
| R7 = −263.665 | D7 = 6.00 | N4 = 1.806098 | ν4 = 40.9 |
| R8 = 3299.505 | D8 = 29.64 | | |
| R9 = 84.746 | D9 = 5.00 | N5 = 1.581439 | ν5 = 40.8 |
| R10 = 44.594 | D10 = 15.83 | N6 = 1.496999 | ν6 = 81.5 |
| R11 = 304.471 | D11 = 10.22 | | |
| R12 = −1533.201 | D12 = 3.00 | N7 = 1.696797 | ν7 = 55.5 |
| R13 = 58.444 | D13 = 6.00 | | |

-continued

| | | | |
|---|---|---|---|
| R14 = −898.311 | D14 = 4.94 | N8 = 1.846660 | ν8 = 23.8 |
| R15 = −78.054 | D15 = 3.00 | N9 = 1.834807 | ν9 = 42.7 |
| R16 = 218.815 | D16 = 28.17 | | |
| R17 = Stop | D17 = 3.00 | | |
| R18 = 83.009 | D18 = 2.50 | N10 = 1.805177 | ν10 = 25.4 |
| R19 = 47.841 | D19 = 9.13 | N11 = 1.677900 | ν11 = 55.3 |
| R20 = −166.167 | D20 = 17.37 | | |
| R21 = 136.892 | D21 = 5.18 | N12 = 1.846660 | ν12 = 23.8 |
| R22 = −70.364 | D22 = 1.80 | N13 = 1.772499 | ν13 = 49.6 |
| R23 = 48.011 | D23 = 4.50 | | |
| R24 = −161.399 | D24 = 1.80 | N14 = 1.772499 | ν14 = 49.6 |
| R25 = 86.416 | D25 = 7.29 | | |
| R26 = 112.184 | D26 = 4.34 | N15 = 1.772499 | ν15 = 49.6 |
| R27 = −196.591 | D27 = 0.50 | | |
| R28 = 67.829 | D28 = 7.03 | N16 = 1.622992 | ν16 = 58.2 |
| R29 = −85.032 | D29 = 2.00 | N17 = 1.846658 | ν17 = 23.9 |
| R30 = 564.949 | D30 = 12.00 | | |
| R31 = ∞ | D31 = 2.00 | N18 = 1.516330 | ν18 = 64.1 |
| R32 = ∞ | D32 = 33.01 | | |
| R33 = ∞ | D33 = 0.00 | | |
| R33: Flare Cutter | | | |

Numerical Example 18:

f = 392.80  Fno = 2.9  2ω = 6.3°

| | | | |
|---|---|---|---|
| R1 = ∞ | D1 = 8.00 | N1 = 1.516330 | ν1 = 64.1 |
| R2 = ∞ | D2 = 1.50 | | |
| R3 = 197.469 | D3 = 19.51 | N2 = 1.496999 | ν2 = 81.5 |
| R4 = −867.075 | D4 = 1.00 | | |
| R5 = 187.435 | D5 = 20.63 | N3 = 1.496999 | ν3 = 81.5 |
| R6 = −361.951 | D6 = 0.39 | | |
| R7 = −370.996 | D7 = 6.00 | N4 = 1.806098 | ν4 = 40.9 |
| R8 = 673.861 | D8 = 59.20 | | |
| R9 = 93.564 | D9 = 5.00 | N5 = 1.575006 | ν5 = 41.5 |
| R10 = 54.636 | D10 = 17.88 | N6 = 1.496999 | ν6 = 81.5 |
| R11 = 376.814 | D11 = 23.62 | | |
| R12 = 1782.362 | D12 = 3.00 | N7 = 1.882997 | ν7 = 40.8 |
| R13 = 68.852 | D13 = 5.51 | | |
| R14 = −1091.529 | D14 = 6.67 | N8 = 1.846660 | ν8 = 23.8 |
| R15 = −59.682 | D15 = 3.00 | N9 = 1.882997 | ν9 = 40.8 |
| R16 = 301.914 | D16 = 17.32 | | |
| R17 = Stop | D17 = 7.88 | | |
| R18 = 147.500 | D18 = 2.50 | N10 = 1.688931 | ν10 = 31.1 |
| R19 = 76.116 | D19 = 9.89 | N11 = 1.677900 | ν11 = 55.3 |
| R20 = −128.843 | D20 = 16.34 | | |
| R21 = 107.380 | D21 = 4.77 | N12 = 1.846660 | ν12 = 23.8 |
| R22 = −181.688 | D22 = 1.80 | N13 = 1.772499 | ν13 = 49.6 |
| R23 = 51.416 | D23 = 4.58 | | |
| R24 = −191.368 | D24 = 1.80 | N14 = 1.622992 | ν14 = 58.2 |
| R25 = 97.048 | D25 = 4.20 | | |
| R26 = 143.232 | D26 = 3.58 | N15 = 1.651597 | ν15 = 58.5 |
| R27 = −314.747 | D27 = 0.50 | | |
| R28 = 62.393 | D28 = 6.58 | N16 = 1.622992 | ν16 = 58.2 |
| R29 = −111.827 | D29 = 2.00 | N17 = 1.846660 | ν17 = 23.8 |
| R30 = 311.976 | D30 = 12.00 | | |
| R31 = ∞ | D31 = 2.00 | N18 = 1.516330 | ν18 = 64.1 |
| R32 = ∞ | D32 = 40.34 | | |
| R33 = ∞ | D33 = 0.00 | | |
| R33: Flare Cutter | | | |

Numerical Example 19:

f = 491.01  Fno = 4.1  2ω = 5.0°

| | | | |
|---|---|---|---|
| R1 = ∞ | D1 = 8.00 | N1 = 1.516330 | ν1 = 64.1 |
| R2 = ∞ | D2 = 1.50 | | |
| R3 = 183.266 | D3 = 16.28 | N2 = 1.496999 | ν2 = 81.5 |
| R4 = −796.950 | D4 = 1.00 | | |
| R5 = 185.904 | D5 = 14.80 | N3 = 1.496999 | ν3 = 81.5 |
| R6 = −547.115 | D6 = 0.66 | | |
| R7 = −531.358 | D7 = 6.00 | N4 = 1.834807 | ν4 = 42.7 |
| R8 = 359.167 | D8 = 80.00 | | |
| R9 = 112.821 | D9 = 5.00 | N5 = 1.622992 | ν5 = 58.2 |
| R10 = 59.081 | D10 = 14.91 | N6 = 1.496999 | ν6 = 81.5 |
| R11 = 439.965 | D11 = 37.50 | | |
| R12 = −1267.067 | D12 = 3.00 | N7 = 1.882997 | ν7 = 40.8 |
| R13 = 110.958 | D13 = 2.15 | | |
| R14 = 430.320 | D14 = 5.48 | N8 = 1.846660 | ν8 = 23.8 |

-continued

| | | | |
|---|---|---|---|
| R15 = −66.505 | D15 = 3.00 | N9 = 1.762001 | ν9 = 40.1 |
| R16 = 99.520 | D16 = 42.80 | | |
| R17 = Stop | D17 = 3.00 | | |
| R18 = 93.162 | D18 = 2.50 | N10 = 1.846658 | ν10 = 23.9 |
| R19 = 53.977 | D19 = 6.25 | N11 = 1.712995 | ν11 = 53.9 |
| R20 = −308.824 | D20 = 44.09 | | |
| R21 = 83.534 | D21 = 2.45 | N12 = 1.761821 | ν12 = 26.5 |
| R22 = 411.216 | D22 = 1.80 | N13 = 1.772499 | ν13 = 49.6 |
| R23 = 44.719 | D23 = 3.50 | | |
| R24 = −369.326 | D24 = 1.80 | N14 = 1.772499 | ν14 = 49.6 |
| R25 = 32.586 | D25 = 3.61 | N15 = 1.761821 | ν15 = 26.5 |
| R26 = 81.701 | D26 = 5.52 | | |
| R27 = 75.311 | D27 = 3.29 | N16 = 1.677900 | ν16 = 55.3 |
| R28 = 1034.558 | D28 = 11.65 | | |
| R29 = 56.089 | D29 = 6.97 | N17 = 1.570989 | ν17 = 50.8 |
| R30 = −93.422 | D30 = 2.00 | N18 = 1.846658 | ν18 = 23.9 |
| R31 = 343.928 | D31 = 8.50 | | |
| R32 = ∞ | D32 = 2.00 | N19 = 1.516330 | ν19 = 64.1 |
| R33 = ∞ | D33 = 20.00 | | |
| R34 = ∞ | D34 = 0.00 | | |
| R34: Flare Cutter | | | |

Numerical Example 20:

f = 491.01  Fno = 4.1·2ω = 5.0°

| | | | |
|---|---|---|---|
| R1 = ∞ | D1 = 8.00 | N1 = 1.516330 | ν1 = 64.1 |
| R2 = ∞ | D2 = 1.50 | | |
| R3 = 207.578 | D3 = 15.76 | N2 = 1.496999 | ν2 = 81.5 |
| R4 = −604.994 | D4 = 1.00 | | |
| R5 = 179.921 | D5 = 15.83 | N3 = 1.496999 | ν3 = 81.5 |
| R6 = −435.953 | D6 = 0.73 | | |
| R7 = −427.052 | D7 = 6.00 | N4 = 1.834807 | ν4 = 42.7 |
| R8 = 414.063 | D8 = 80.00 | | |
| R9 = 115.271 | D9 = 5.00 | N5 = 1.622992 | ν5 = 58.2 |
| R10 = 59.081 | D10 = 0.50 | | |
| R11 = 53.755 | D11 = 13.66 | N6 = 1.496999 | ν6 = 81.5 |
| R12 = 1794.557 | D12 = 32.63 | | |
| R13 = −744.247 | D13 = 3.00 | N7 = 1.882997 | ν7 = 40.8 |
| R14 = 83.536 | D14 = 4.00 | | |
| R15 = −444.910 | D15 = 5.57 | N8 = 1.846660 | ν8 = 23.8 |
| R16 = −51.680 | D16 = 3.00 | N9 = 1.762001 | ν9 = 40.1 |
| R17 = 314.687 | D17 = 38.97 | | |
| R18 = 107.187 | D18 = 2.50 | N10 = 1.846658 | ν10 = 23.9 |
| R19 = 63.094 | D19 = 6.01 | N11 = 1.712995 | ν11 = 53.9 |
| R20 = −231.909 | D20 = 3.00 | | |
| R21 = Stop | D21 = 40.73 | | |
| R22 = 96.848 | D22 = 3.21 | N12 = 1.761821 | ν12 = 26.5 |
| R23 = 314.266 | D23 = 1.80 | N13 = 1.772499 | ν13 = 49.6 |
| R24 = 48.539 | D24 = 3.31 | | |
| R25 = −448.947 | D25 = 1.80 | N14 = 1.772499 | ν14 = 49.6 |
| R26 = 33.802 | D26 = 3.74 | N15 = 1.761821 | ν15 = 26.5 |
| R27 = 94.189 | D27 = 8.79 | | |
| R28 = 80.846 | D28 = 3.41 | N16 = 1.677900 | ν16 = 55.3 |
| R29 = 37394.120 | D29 = 9.12 | | |
| R30 = 62.665 | D30 = 6.34 | N17 = 1.570989 | ν17 = 50.8 |
| R31 = −94.970 | D31 = 2.00 | N18 = 1.846658 | ν18 = 23.9 |
| R32 = 297.146 | D32 = 18.08 | | |
| R33 = ∞ | D33 = 2.00 | N19 = 1.516330 | ν19 = 64.1 |
| R34 = ∞ | D34 = 20.00 | | |
| R35 = ∞ | D35 = −45.45 | | |
| R35: Flare Cutter | | | |

Numerical Example 21:

f = 589.21  Fno = 4.1  2ω = 4.2°

| | | | |
|---|---|---|---|
| R1 = ∞ | D1 = 8.00 | N1 = 1.516330 | ν1 = 64.1 |
| R2 = ∞ | D2 = 1.50 | | |
| R3 = 218.769 | D3 = 20.37 | N2 = 1.496999 | ν2 = 81.5 |
| R4 = −607.915 | D4 = 1.00 | | |
| R5 = 209.939 | D5 = 15.93 | N3 = 1.496999 | ν3 = 81.5 |
| R6 = −1257191 | D6 = 1.64 | | |
| R7 = −786.394 | D7 = 6.00 | N4 = 1.834807 | ν4 = 42.7 |
| R8 = 328.424 | D8 = 93.68 | | |
| R9 = 131.058 | D9 = 5.00 | N5 = 1.622992 | ν5 = 58.2 |
| R10 = 74.347 | D10 = 16.94 | N6 = 1.496999 | ν6 = 81.5 |
| R11 = 469.407 | D11 = 69.39 | | |
| R12 = −389.366 | D12 = 3.00 | N7 = 1.882997 | ν7 = 40.8 |

-continued

| | | | |
|---|---|---|---|
| R13 = 98.438 | D13 = 3.42 | | |
| R14 = −567.264 | D14 = 5.88 | N8 = 1.846660 | ν8 = 23.8 |
| R15 = −49.954 | D15 = 3.00 | N9 = 1.762001 | ν9 = 40.1 |
| R16 = 529.139 | D16 = 46.53 | | |
| R17 = Stop | D17 = 3.00 | | |
| R18 = 96.114 | D18 = 2.50 | N10 = 1.846658 | ν10 = 23.9 |
| R19 = 55.386 | D19 = 6.66 | N11 = 1.712995 | ν11 = 53.9 |
| R20 = −225.522 | D20 = 25.78 | | |
| R21 = 110.486 | D21 = 3.11 | N12 = 1.761821 | ν12 = 26.5 |
| R22 = 10908.250 | D22 = 1.80 | N13 = 1.772499 | ν13 = 49.6 |
| R23 = 52.378 | D23 = 3.50 | | |
| R24 = −277.871 | D24 = 1.80 | N14 = 1.772499 | ν14 = 49.6 |
| R25 = 38.092 | D25 = 3.54 | N15 = 1.761821 | ν15 = 26.5 |
| R26 = 102.948 | D26 = 4.00 | | |
| R27 = 115.927 | D27 = 3.16 | N16 = 1.677900 | ν16 = 55.3 |
| R28 = −366.694 | D28 = 0.50 | | |
| R29 = 65.439 | D29 = 5.89 | N17 = 1.570989 | ν17 = 50.8 |
| R30 = −83.847 | D30 = 2.00 | N18 = 1.846658 | ν18 = 23.9 |
| R31 = 517.784 | D31 = 35.51 | | |
| R32 = ∞ | D32 = 2.00 | N19 = 1.516330 | ν19 = 64.1 |
| R32 = ∞ | D33 = 30.00 | | |
| R34 = ∞ | D34 = −26.79 | | |
| R34: Flare Cutter | | | |

TABLE 2

| Condition | Numeral Example | | | | |
|---|---|---|---|---|---|
| No. & Factor | 17 | 18 | 19 | 20 | 21 |
| (11) f1/f | 0.415 | 0.409 | 0.425 | 0.384 | 0.434 |
| (12) \|f2/f1\| | 0.466 | 0.363 | 0.359 | 0.361 | 0.311 |
| (13) f3/f | 0.469 | 0.369 | 0.366 | 0.361 | 0.318 |
| (14) \|f2/f\| | 0.193 | 0.148 | 0.152 | 0.139 | 0.135 |
| (15) f31/f | 0.310 | 0.265 | 0.230 | 0.232 | 0.179 |
| (16) \|f32/f\| | 0.151 | 0.159 | 0.103 | 0.113 | 0.093 |
| (17) f33/f | 0.211 | 0.209 | 0.156 | 0.172 | 0.144 |

As described above, according to the first and second embodiments, the optical system is provided with means for moving one of the lens units in part in the directions perpendicular to the optical axis to thereby compensate for the shake of the image on the focal plane. In this connection, certain lens parameters are appropriately determined to correct all decentering aberrations well. Also, the required decentering movement for the large enough displacement compensation (image stabilization) is made short enough to realize minimization of the bulk and size of the apparatus that uses the optical system. Moreover, despite the use of the inner focus type, the variation with focusing of aberrations is corrected well throughout a wide range of object distances. An optical system of the inner focus type having the image stabilizing function which accomplishes the objects of the invention is thus achieved.

(Third Embodiment)

A further embodiment of the invention is next described which is particularly adapted to a further reduction of the variation with focusing of aberrations.

FIGS. 85 to 88 are lens block diagrams of four numerical examples 22 to 25 of the third embodiment, respectively. FIGS. 89A to 89D through FIGS. 92A to 92D show the aberrations of the numerical examples 22 to 25, respectively. In these figures, the optical system comprises, in order from an object side, a first lens unit L1 of positive refractive power, a second lens unit L2 of negative refractive power and a third lens unit L3 of positive refractive power. The first lens unit L1 consists of, with boundaries formed by the widest and the second-widest spaces thereof, in order from the object side, a front lens subunit L1a of positive refractive power, a middle lens subunit L1b of negative refractive power and a rear lens subunit L1c of positive refractive power.

The third lens unit L3 comprises, in order from the object side, a first lens subunit L3a of positive refractive power, a second lens subunit L3b of negative refractive power and a third lens subunit L3c of positive refractive power. SP stands for an aperture stop, FL stands for an optical filter, IP stands for an image plane, FC stands for a flare cut filter, and HG stands for a protection glass plate.

In the present embodiment, focusing is performed by axially moving the second lens unit L2 toward the image side, as indicated by an arrow LF, when the object distance decreases from infinity to a minimum. In the present embodiment, the first lens unit on which the light beam is incident at a great height and which is relatively easy to correct for aberrations is made constructed with three lens subunits.

Moreover, the focal length f1a of the front lens subunit L1a and the space D1ab between the front lens subunit L1a and the middle lens subunit L1b are so determined as to satisfy the following conditions:

$$0.4 < f1a/f < 1.1 \tag{18}$$

$$0.035 < D1ab/f < 0.15 \tag{19}$$

where f is the focal length of the entire optical system. This achieves an optical system whose image aberrations are corrected well over the entire area of the image frame and which, during focusing, varies the aberrations to a lesser extent for high optical performance.

Also, when the optical system vibrates, the shake of the image on the focal plane is compensated for by moving the second lens subunit L3b in directions perpendicular to an optical axis, as indicated by a double-headed arrow LT.

According to the present embodiment, as compared with the first lens unit L1, the second lens unit L2 of negative refractive power has a small diameter and a far light weight. Focusing is carried out by axially moving the second lens unit L2. Therefore, a driving device to used for the second lens unit L2 is of low torque and small size. Also, the combined refractive power of the first and second lens units L1 and L2 is made positive. The light beam emerging from the second lens unit L2 is then made to further converge in passing through the first lens subunit L3a of positive refractive power. This makes it easier to minimize the diameter of the second lens subunit L3b (image displacement compensation unit). Further, the third lens subunit L3c of positive refractive power is used to allow the negative refractive power of the second lens subunit L3b to increase, while keeping the constant focal length of the entire optical system. So, the decentering movement of the second lens subunit L3b can be reduced to effect the equivalent displacement of the image on the focal plane. The image is thus quickly stabilized.

As the relative aperture increases, the weight of the telephoto lens increases rapidly. A large proportion of this increase owes to the increase of the diameter of the front or first lens unit. Accordingly, the lighter the weight of the first lens unit, the greater the effect of reducing the weight of the entire optical system is produced. As is apparent from the above-described formula for the F-number, the effective diameter of the frontmost lens members is hardly much reduced. For the weight of the first lens unit to reduce, therefore, an appropriate arrangement of the other lens members than the frontmost ones has better be made.

On this account, in the present embodiment, as has been described before, the first lens unit L1 is constructed from three lens subunits. That is, the front lens subunit L1a of positive refractive power precedes on the object side. The light beam emerging from the front lens subunit L1a is thus made to converge. The middle lens subunit L1b is then adjusted to an appropriate position. The weight of the section that follows the front lens subunit L1a is thus reduced. Further, the middle lens subunit L1b is made negative in refractive power, giving an advantage of reducing the spherical aberration and longitudinal chromatic aberration produced in the front lens subunit L1a. The rear lens subunit L1c that is put on the image side of the middle lens subunit L1b is made positive in refractive power, supplementing for the positive refractive power necessary to the first lens unit L1.

Further, the above-described conditions (18) and (19) are set forth. By satisfying these conditions, the effects described above are enhanced.

The inequalities of condition (18) give a proper range for the refractive power of the front lens subunit L1a. When the upper limit is exceeded, as this means that the refractive power of the front lens subunit L1a is too weak, the light beam emerging from the front lens subunit L1a converges insufficiently. Therefore, it becomes difficult to reduce the weight of the section that lies on the image side of the front lens subunit L1a. Conversely when the lower limit is exceeded, the front lens subunit L1a produces too much large spherical aberration which is difficult to correct.

The inequalities of condition (19) give a proper range for the air separation between the front lens subunit L1a and the middle lens subunit L1b. When the upper limit is exceeded, the light beam entering the middle lens subunit L1b becomes too much convergent. Therefore, the spherical aberration produced by the front lens subunit L1a is hardly reduced by the middle lens subunit L1b. Conversely when the lower limit is exceeded, the light beam entering the middle lens subunit L1b converges insufficiently. Therefore, it becomes difficult to reduce the weight of the optical system.

Further, for more desired results, it is preferred to alter the numerical values of the conditions (18) and (19) as follows:

$$0.5 < f1a/f < 0.9 \tag{18a}$$

$$0.05 < D1ab/f < 0.11 \tag{19a}$$

The features or conditions described above suffice for accomplishing the objects of the present embodiment. However, to achieve further improvements of the optical properties of the inner focus type optical system, it is preferred to satisfy at least one of the following additional features or conditions.

(c-1) The front lens subunit L1a consists of one positive lens 1ap, and the middle lens subunit L1b consists of a positive lens 1 bp and a negative lens 1bn. The middle and rear lens subunits L1b and L1c have focal lengths f1b and f1c, respectively, lying in the following respective ranges, and the positive lenses 1ap and 1bp are made up from materials whose refractive indices N1ap and N1bp and Abbe numbers ν1ap and ν1bp, respectively, lie in the following respective ranges:

$$1 < |f1b/f| < 3 \tag{20}$$

$$0.4 < f1c/f < 1.2 \tag{21}$$

$$70 < \nu1ap \tag{22}$$

$$1.43 < N1ap \tag{23}$$

$$70 < \nu1bp \tag{24}$$

$$1.43 < N1bp \tag{25}$$

As described before, for the frontmost lens members of the first lens unit alone, any decrease of the diameter is difficult to measure. In the present embodiment, therefore, the front lens subunit L1a is constructed with a single lens, thus reducing the weight of the first lens unit L1. Further, the middle lens subunit L1b is constructed with the positive and negative lenses 1bp and 1bn in this order from the object side, thereby shifting the principal point of the middle lens subunit L1b to the object side. The separation between the front and middle lens subunits L1a and L1b is thus secured without any stress.

The inequalities of condition (20) give a proper range for the refractive power of the middle lens subunit L1b. When the condition (20) is satisfied, it becomes even easier to make a good compromise between the reduction of spherical aberration produced in the front lens subunit L1a and the holding of the positive refractive power of the whole first lens unit L1.

The inequalities of condition (21) give a proper range for the refractive power of the rear lens subunit L1c. When the condition (21) is satisfied, it becomes even easier to make good compromise between the holding of the positive refractive power of the whole first lens unit L1 and the convergence of the light beam emerging from the front lens subunit L1a.

The inequality of condition (22) is a condition for specifying materials in Abbe number for the positive lens 1ap of the front lens subunit L1a. When the condition (22) is satisfied, the negative longitudinal chromatic aberration in the image plane becomes easy to correct.

The inequality of condition (23) is a condition for specifying materials in refractive index for the positive lens 1ap of the front lens subunit L1a. When the condition (23) is satisfied, the spherical aberration in the image plane becomes easy to correct.

The inequality of condition (24) is a condition for specifying materials in Abbe number for the positive lens 1bp of the middle lens subunit L1b. When the condition (24) is satisfied, the negative longitudinal chromatic aberration in the image plane becomes easy to correct.

The inequality of condition (25) is a condition for specifying materials in refractive index for the positive lens 1bp of the middle lens subunit L1b. When the condition (25) is satisfied, the spherical aberration in the image plane becomes easy to correct.

For more desired results, it is preferred to alter the numerical ranges of the above-described conditions (20) to (25) as follows:

$$1.2 < |f1b/f| < 2.5 \tag{20a}$$

$$0.55 < f1c/f < 1.0 \tag{21a}$$

$$80 < \nu1ap \tag{22a}$$

$$1.49 < N1ap \tag{23a}$$

$$80 < \nu1bp \tag{24a}$$

$$1.49 < N1bp \tag{25a}$$

(c-2) The rear lens subunit L1c consists of a positive lens 1cp and a negative lens 1cn of meniscus form convex toward the object side.

Since the rear lens subunit L1c has a positive refractive power, a positive lens is required. Further, the use of a negative lens makes it easy to correct the spherical aberration of the whole first lens unit L1. Furthermore, the negative lens is formed to a meniscus form convex toward the object side. With this arrangement, even comatic aberration is made easy to correct.

(c-3) The second lens unit L2 has a cemented lens composed of a positive lens and a negative lens, and the focal length f2 of the second lens unit L2 lies in the following range:

$$0.2<|f2/f|<0.6 \tag{26}$$

In general, the telephoto lenses have loose power arrangement and still are long and bulky. Therefore, focusing by bodily moving the entire optical system is hardly carried out. For this reason, the focusing provision has been made in part of the optical system. That is, either of the so-called "inner" and "rear" focusing methods has been employed. In the optical system of the invention, the second lens unit L2 takes a place where the light beam after being converged by the first lens unit L1 arrives at and, therefore, gets a relatively small diameter. This leads to simplify the structure of the focusing control mechanism. Further, the second lens unit L2 is constructed in the form of the positive and negative lenses cemented to a single cemented lens. The variation with focusing of longitudinal chromatic aberration is thus removed and, moreover, the focusing control mechanism is further simplified in structure.

The inequalities of condition (26) give a proper range for the refractive power of the second lens unit L2. When the upper limit is exceeded, the second lens unit L2 as used for focusing has to move too much long a distance, causing the bulk and size of the entire optical system to increase greatly and the focusing control mechanism to get more complicated in structure. When the lower limit is exceeded, it becomes difficult to remove the variation with focusing of longitudinal chromatic aberration.

For more desired results, it is preferred to alter the numerical range of the condition (26) as follows:

$$0.3<|f2/f|<0.45 \tag{26a}$$

(c-4) The optical system of the inner focus type described above has the third lens unit L3 of positive refractive power on the image side of the second lens unit L2. The third lens unit L3 comprises, in order from the object side, the first lens subunit L3a of positive refractive power, the second lens subunit L3b of negative refractive power and the third lens subunit L3c of positive refractive power, totaling three lens subunits. The second lens subunit L3b is arranged to move in the directions perpendicular to the optical axis to effect stabilizing of the image on the focal plane. The focal lengths f3a, f3b and f3c of the first, second and third lens subunits L3a, L3b and L3c, respectively, lie in the following respective ranges:

$$0.15<f3a/f<0.5 \tag{27}$$

$$0.05<f3b/f<0.15 \tag{28}$$

$$0.08<f3c/f<0.2 \tag{29}$$

The inequalities of conditions (27) to (29) are provided for assuring that, as the second lens subunit L3b moves in the directions perpendicular to the optical axis to displace the image position, the sensitivity of image displacement gets high enough, while still maintaining good image quality to be achieved. When these conditions (27) to (29) are violated, it becomes difficult to keep the balance therebetween.

For more desired results, it is preferred to. alter the numerical ranges of the conditions (27) to (29) as follows:

$$0.2<f3a/f<0.45 \tag{27a}$$

$$0.06<|f3b/f|<0.13 \tag{28a}$$

$$0.1<f3c/f<0.18 \tag{29a}$$

(c-5) The second lens subunit L3b comprises a plurality of negative lenses and one positive lens. The third lens subunit L3c comprises a plurality of positive lenses.

Because the second lens subunit L3b has a plurality of negative lenses and at least one positive lens, it becomes possible to suppress the variation with image stabilizing of chromatic aberrations and other aberrations to a minimum. Also, to achieve a high sensitivity of image displacement, there is need to give the third lens subunit L3c a somewhat strong positive refractive power. Particularly for a telephoto lens of such a large relative aperture as in the invention to achieve, the third lens subunit L3c is better constructed with a plurality of positive lenses with an advantage of correcting, among others, spherical aberrations of higher orders.

(c-6) Changing of the position of the image on the focal plane is aimed to compensate for the shake of the image. The function of displacing the image in the optical system of the present embodiment is particularly advantageous at compensating for the shake of the image as occurring when the user uses the video camera or still camera with the telephoto lens held by his or her hands, or on an unsteady tripod or mono-pod.

(c-7) To protect the exposed lens surface to the outside and to prevent occurrence of a change of the position of the sharp focus owing to the expansion or contraction of the lens elements with change of the ambient temperature, use may be made of a flat glass plate or transparent member or a lens of weak refractive power on the object side of the lens system.

(c-8) An iris diaphragm (aperture stop SP) may take any position whatever in the lens system, provided that, when stopped down, the light beam which goes to the margin of the useful image circle is not vignetted. On consideration of the space efficiency of layout of the drive mechanism for the focusing lens unit, the moving mechanism for the image stabilizing subunit and the mother board of electric circuitry, however, the iris diaphragm is better positioned in the air space between the second and third lens units L2 and L3, or in the interior of the third lens unit L3.

(c-9) The optical filter FL is positioned in the space between the rearmost lens surface and the image plane, as desired because of assuring minimization of the diameter of the filter and from the point of view of the space efficiency.

(c-10) A fixed stop is better positioned in the air space between the rearmost lens surface and the image plane. With this arrangement, when stabilizing the image, the asymmetry of corner illuminations can be reduced.

Next, four numerical examples 22 to 25 of the third embodiment are shown. In the numerical data for the examples 22 to 25, Ri is the radius of curvature of the i-th lens surface, when counted from the object side, Di is the i-th axial lens thickness or air separation, when counted from the object side, and Ni and vi are respectively the refractive index and Abbe number of the material of the i-th lens element, when counted from the object side. The values of the factors in the above-described conditions (18) to (29) for the numerical examples 22 to 25 are listed in Table-3.

| Numerical Example 22: | | | |
|---|---|---|---|
| $f = 585.20$  Fno = 4.12  $2\omega = 4.2°$ | | | |
| R1 = ∞ | D1 = 6.00 | N1 = 1.516330 | v1 = 64.1 |
| R2 = ∞ | D2 = 1.50 | | |
| R3 = 231.902 | D3 = 17.10 | N2 = 1.496999 | v2 = 81.5 |
| R4 = −822.901 | D4 = 43.59 | | |
| R5 = 150.427 | D5 = 13.97 | N3 = 1.496999 | v3 = 81.5 |
| R6 = 2167.786 | D6 = 2.59 | | |
| R7 = −949.347 | D7 = 5.90 | N4 = 1.834807 | v4 = 42.7 |

-continued

| | | | |
|---|---|---|---|
| R8 = 242.065 | D8 = 40.72 | | |
| R9 = 114.154 | D9 = 13.86 | N5 = 1.433870 | ν5 = 95.1 |
| R10 = 4153.906 | D10 = 0.50 | | |
| R11 = 83.069 | D11 = 5.00 | N6 = 1.516330 | ν6 = 64.1 |
| R12 = 64.680 | D12 = 45.86 | | |
| R13 = 543.282 | D13 = 4.65 | N7 = 1.805181 | ν7 = 25.4 |
| R14 = −253.137 | D14 = 3.30 | N8 = 1.834807 | ν8 = 42.7 |
| R15 = 130.218 | D15 = 98.91 | | |
| R16 = Stop | D16 = 7.02 | | |
| R17 = 138.000 | D17 = 2.00 | N9 = 1.846658 | ν9 = 23.9 |
| R18 = 65.924 | D18 = 4.66 | N10 = 1.603112 | ν10 = 60.6 |
| R19 = −335.894 | D19 = 12.07 | | |
| R20 = 102.528 | D20 = 2.75 | N11 = 1.846658 | ν11 = 23.9 |
| R21 = −341.854 | D21 = 1.65 | N12 = 1.603112 | ν12 = 60.6 |
| R22 = 47.129 | D22 = 3.77 | | |
| R23 = −149.430 | 023 = 1.60 | N13 = 1.804000 | ν13 = 46.6 |
| R24 = 105.150 | D24 = 3.52 | | |
| R25 = 121.151 | D25 = 2.80 | N14 = 1.720000 | ν14 = 43.7 |
| R26 = −888.536 | D26 = 6.96 | | |
| R27 = 79.378 | D27 = 4.27 | N15 = 1.749500 | ν15 = 35.0 |
| R28 = −194.536 | D28 = 1.90 | N16 = 1.846658 | ν16 = 23.9 |
| R29 = 218.380 | D29 = 12.00 | | |
| R30 = ∞ | D30 = 2.00 | N17 = 1.516330 | ν17 = 64.4 |
| R31 = ∞ | D31 = 64.77 | | |
| R32 = ∞ | D32 = 39.01 | | |
| D1-1 = 43.59 | | | |

Numerical Example 23:

f = 589.20  Fno = 4.1  2ω = 4.2°

| | | | |
|---|---|---|---|
| R1 = ∞ | D1 = 8.00 | N1 = 1.516330 | ν1 = 64.1 |
| R2 = ∞ | D2 = 1.50 | | |
| R3 = 251.570 | D3 = 18.06 | N2 = 1.496999 | ν2 = 81.5 |
| R4 = −565.341 | D4 = 36.40 | | |
| R5 = 127.178 | D5 = 17.24 | N3 = 1.496999 | ν3 = 81.5 |
| R6 = 3165.607 | D6 = 2.85 | | |
| R7 = −995.314 | D7 = 6.00 | N4 = 1.785896 | ν4 = 44.2 |
| R8 = 172.176 | D8 = 54.96 | | |
| R9 = 88.990 | D9 = 15.69 | N5 = 1.433870 | ν5 = 95.1 |
| R10 = 1046.016 | D10 = 0.50 | | |
| R11 = 70.118 | D11 = 5.00 | N6 = 1.516330 | ν6 = 64.1 |
| R12 = 53.331 | D12 = 31.65 | | |
| R13 = 552.741 | D13 = 4.54 | N7 = 1.805181 | ν7 = 25.4 |
| R14 = −210.218 | D14 = 3.00 | N8 = 1.834807 | ν8 = 42.7 |
| R15 = 120.305 | D16 = 80.56 | | |
| R16 = Stop | D16 = 42.28 | | |
| R17 = 175.752 | D17 = 2.00 | N9 = 1.846658 | ν9 = 23.9 |
| R18 = 52.284 | D18 = 4.74 | N10 = 1.834807 | ν10 = 42.7 |
| R19 = −491.285 | D19 = 15.41 | | |
| R20 = 62.678 | D20 = 2.94 | N11 = 1.846658 | ν11 = 23.9 |
| R21 = −428.512 | D21 = 1.40 | N12 = 1.622992 | ν12 = 58.2 |
| R22 = 32.785 | D22 = 4.02 | | |
| R23 = −115.123 | D23 = 1.40 | N13 = 1.834807 | ν13 = 42.7 |
| R24 = 42.784 | D24 = 2.09 | N14 = 1.698947 | ν14 = 30.1 |
| R25 = 90.355 | D25 = 3.00 | | |
| R26 = 64.558 | D26 = 3.19 | N15 = 1.647689 | ν15 = 33.8 |
| R27 = 2405.765 | D27 = 17.63 | | |
| R28 = 55.309 | D28 = 7.42 | N16 = 1.517417 | ν16 = 52.4 |
| R29 = −73.447 | D29 = 2.00 | N17 = 1.846660 | ν17 = 23.8 |
| R30 = 2099.149 | D30 = 33.55 | | |
| R31 = ∞ | D31 = 2.00 | N18 = 1.516330 | ν18 = 64.1 |
| R32 = ∞ | D32 = 0.00 | | |
| D1-1 = 36.4 | | | |

Numerical Example 24:

f = 490.56  Fno = 4.1  2ω = 5.0°

| | | | |
|---|---|---|---|
| R1 = ∞ | D1 = 5.00 | N1 = 1.516330 | ν1 = 64.1 |
| R2 = ∞ | D2 = 1.50 | | |
| R3 = 239.798 | D3 = 14.30 | N2 = 1.496999 | ν2 = 81.5 |
| R4 = −585.800 | D4 = 48.85 | | |
| R5 = 117.916 | D5 = 14.40 | N3 = 1.496999 | ν3 = 81.5 |
| R6 = −4012.478 | D6 = 1.78 | | |
| R7 = −597.656 | D7 = 5.00 | N4 = 1.834807 | ν4 = 42.7 |
| R8 = 193.601 | D8 = 19.16 | | |
| R9 = 98.885 | D9 = 13.80 | N5 = 1.433870 | ν5 = 95.1 |
| R10 = −2042.619 | D10 = 1.50 | | |

-continued

| | | | |
|---|---|---|---|
| R11 = 69.144 | D11 = 8.00 | N6 = 1.516330 | ν6 = 64.1 |
| R12 = 52.129 | D12 = 20.52 | | |
| R13 = 734.785 | D13 = 4.00 | N7 = 1.805181 | ν7 = 25.4 |
| R14 = −217.950 | D14 = 3.00 | N8 = 1.834807 | ν8 = 42.7 |
| R15 = 138.354 | D15 = 93.55 | | |
| R16 = Stop | D16 = 17.65 | | |
| R17 = 164.033 | D17 = 1.70 | N9 = 1.846658 | ν9 = 23.9 |
| R18 = 44.438 | D18 = 5.40 | N10 = 1.834807 | ν10 = 42.7 |
| R19 = −496.476 | D19 = 1.50 | | |
| R20 = 95.332 | D20 = 3.30 | N11 = 1.846658 | ν11 = 23.9 |
| R21 = −205.460 | D21 = 1.60 | N12 = 1.677900 | ν12 = 55.3 |
| R22 = 38.854 | D22 = 4.45 | | |
| R23 = −96.365 | D23 = 1.70 | N13 = 1.733997 | ν13 = 51.5 |
| R24 = 96.367 | D24 = 3.23 | | |
| R25 = 143.981 | D25 = 4.00 | N14 = 1.696797 | ν14 = 55.5 |
| R26 = −389.655 | D26 = 0.30 | | |
| R27 = 62.574 | D27 = 7.60 | N15 = 1.517417 | ν15 = 52.4 |
| R28 = −62.574 | D28 = 1.80 | N16 = 1.720000 | ν16 = 43.7 |
| R29 = −235.693 | D29 = 30.00 | | |
| R30 = ∞ | D30 = 2.20 | N17 = 1.516330 | ν17 = 64.1 |
| R31 = ∞ | D31 = 31.34 | | |
| R32 = ∞ | D32 = 38.94 | | |
| D1-1 = 48.85 | | | |

Numerical Example 25:

f = 392.15  Fno = 2.9  2ω = 6.3°

| | | | |
|---|---|---|---|
| R1 = ∞ | D1 = 6.00 | N1 = 1.516330 | ν1 = 64.1 |
| R2 = ∞ | D2 = 1.50 | | |
| R3 = 231.603 | D3 = 19.30 | N2 = 1.496999 | ν2 = 81.5 |
| R4 = −419.344 | D4 = 22.34 | | |
| R5 = 113.114 | D5 = 19.20 | N3 = 1.496999 | ν3 = 81.5 |
| R6 = ∞ | D6 = 2.68 | | |
| R7 = −597.700 | D7 = 6.25 | N4 = 1.834807 | ν4 = 42.7 |
| R8 = 180.537 | D8 = 10.24 | | |
| R9 = 94.288 | D9 = 17.80 | N5 = 1.433870 | ν5 = 95.1 |
| R10 = −3674.804 | D10 = 1.40 | | |
| R11 = 64.700 | D11 = 7.30 | N6 = 1.516330 | ν6 = 64.1 |
| R12 = 48.947 | D12 = 24.36 | | |
| R13 = 5483.964 | D13 = 4.70 | N7 = 1.805181 | ν7 = 25.4 |
| R14 = −161.220 | D14 = 3.20 | N8 = 1.804000 | ν8 = 46.6 |
| R15 = 108.057 | D16 = 98.83 | | |
| R16 = Stop | D16 = 9.94 | | |
| R17 = 125.228 | D17 = 1.80 | N9 = 1.846658 | ν9 = 23.9 |
| R18 = 48.140 | D18 = 6.50 | N10 = 1.772499 | ν10 = 49.6 |
| R19 = −255.466 | D19 = 4.62 | | |
| R20 = 76.097 | D20 = 4.10 | N11 = 1.846658 | ν11 = 23.9 |
| R21 = −307.470 | D21 = 1.70 | N12 = 1.622992 | ν12 = 58.2 |
| R22 = 37.546 | D22 = 5.65 | | |
| R23 = −133.531 | D23 = 1.80 | N13 = 1.804000 | ν13 = 46.6 |
| R24 = 64.683 | D24 = 2.85 | | |
| R25 = 86.153 | D25 = 5.00 | N14 = 1.622992 | ν14 = 58.2 |
| R26 = −476.151 | D26 = 0.20 | | |
| R27 = 55.777 | D27 = 9.70 | N1S = 1.677900 | ν15 = 55.3 |
| R28 = −98.880 | D28 = 1.80 | N16 = 1.882997 | ν16 = 40.8 |
| R29 = 259.489 | D29 = 15.00 | | |
| R30 = ∞ | D30 = 2.20 | N17 = 1.516330 | ν7 = 64.1 |
| R31 = ∞ | D31 = 15.28 | | |
| R32 = ∞ | D32 = 38.95 | | |
| D1-1 = 22.34 | | | |

TABLE 3

| Condition | Numerical Example | | | |
|---|---|---|---|---|
| No. & Factor | 22 | 23 | 24 | 25 |
| (18) f1a/f | 0.6254 | 0.5989 | 0.7019 | 0.7731 |
| (19) D1ab/f | 0.0745 | 0.0618 | 0.0996 | 0.0570 |
| (20) f1b/f | −1.6220 | −1.3559 | −1.9153 | −2.1830 |
| (21) f1c/f | 0.7575 | 0.6383 | 0.7065 | 0.8712 |
| (22) ν1ap | 81.540 | 81.540 | 81.540 | 81.540 |
| (23) N1ap | 1.497 | 1.497 | 1.497 | 1.497 |
| (24) ν1bp | 81.540 | 81.540 | 81.540 | 81.540 |
| (25) N1bp | 1.497 | 1.497 | 1.497 | 1.497 |

TABLE 3-continued

| Condition | Numerical Example | | | |
|---|---|---|---|---|
| No. & Factor | 22 | 23 | 24 | 25 |
| (26) f2/f | −0.3414 | −0.3040 | −0.4037 | −0.3502 |
| (27) f3a/f | 0.4034 | 0.2710 | 0.3114 | 0.3119 |
| (28) f3b/f | −0.1033 | −0.0756 | −0.0895 | −0.1135 |
| (29) f3c/f | 0.1454 | 0.1230 | 0.1400 | 0.1621 |

As described above, according to the third embodiment, the rules of design are set forth to correct well the variation with focusing of aberrations over a wide range of object distance, thus making it possible to achieve an optical system having a high optical performance despite the use of the inner focus type.

Such an optical system is also provided with means for moving one of the lens units in part in the directions perpendicular to the optical axis to thereby compensate for the shake of the image on the focal plane. In this connection, certain lens parameters are appropriately determined to correct all decentering aberrations well. An optical system of the inner focus type having the image stabilizing function which is corrected well for aberrations not only in the normal state but also in the image-displayed state is thus made possible to achieve.

(Fourth Embodiment)

Next, a practical example of application of the optical system shown in the first to third embodiments to an optical apparatus is described with reference to FIG. 93.

Figure 93:
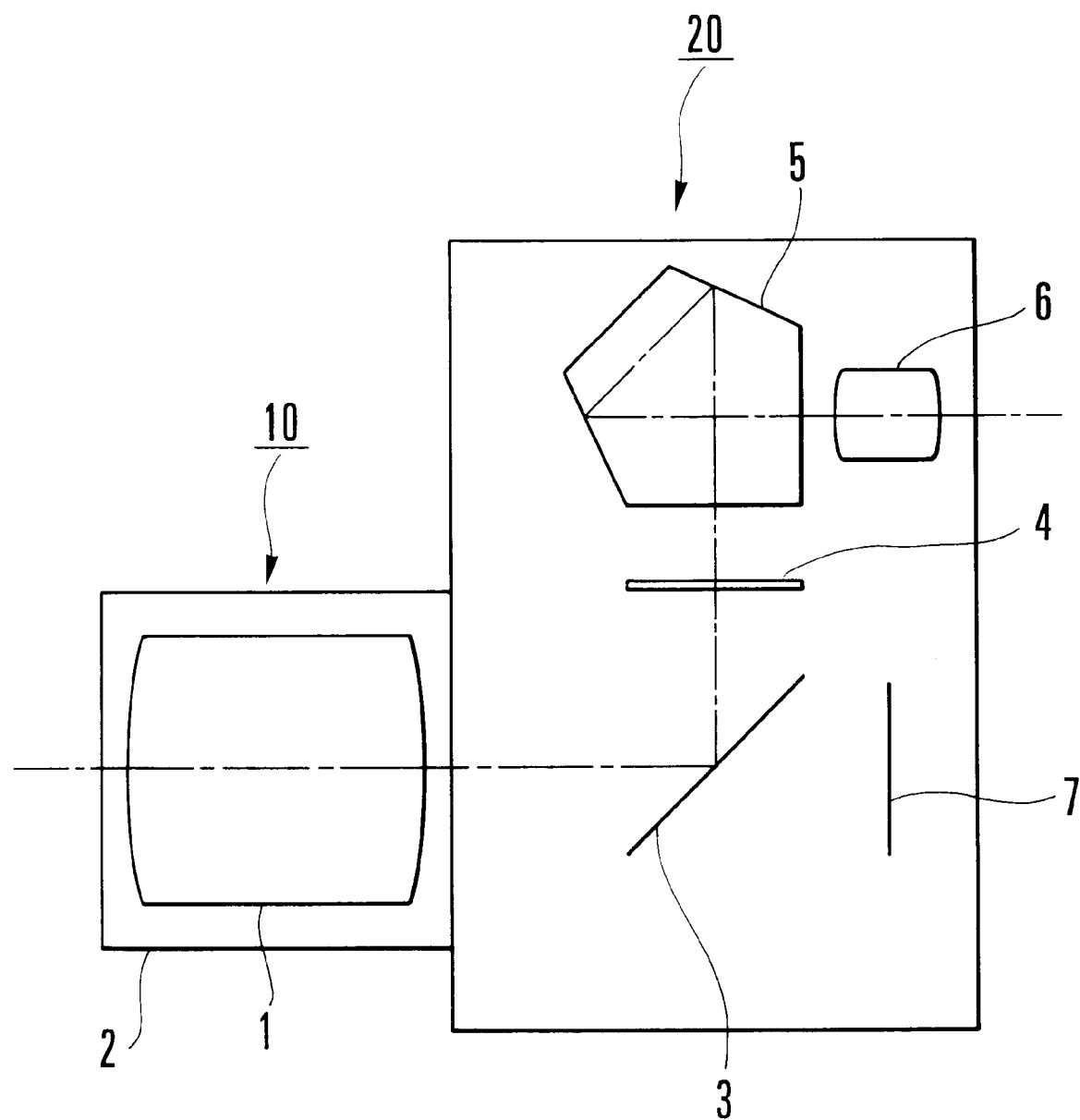
FIG. 93 is a schematic view of the main parts of a single-lens reflex camera according to a fourth embodiment.

FIG. 93 is a schematic section view of the main parts of a single-lens reflex camera. In FIG. 93, a photographic lens 10 contains an optical system 1 according to one of the first to third embodiments. The optical system 1 is housed within a holding member or outer barrel 2. A camera body 20 contains a quick-return mirror 3 in the viewing position where the light beam from the photographic lens 10 is reflected upward to a focusing screen 4. The inverted image formed on the focusing screen 4 is erected and laterally reversed by a pentagonal roof prism 5. The erected image is viewed by looking through an eyepiece lens 6. A film surface 7 is disposed on an image plane. At the time of shooting, the quick-return mirror 3 is retracted from the optical path so that an image of an object being photographed is formed on the film surface 7 by the photographic lens 10.

The advantages of the invention described in connection with the first to third embodiments are fully enjoyed in the optical apparatus such as that disclosed in the present embodiment.

We claim:

1. An optical system comprising, in order from an object side to an image side:

a first lens unit of positive refractive power;

a second lens unit of negative refractive power; said second lens unit being movable along an optical axis to effect focusing; and a third lens unit of positive refractive power, said third lens unit comprising, in order from the object side to the image side, a first lens subunit of positive refractive power, a second lens subunit of negative refractive power and a third lens subunit of positive refractive power, wherein said second lens subunit is movable in directions perpendicular to the optical axis to displace an image formed by said optical system.

2. An optical system according to claim 1, wherein said second lens subunit has an air lens of bi-convex form, and the following condition is satisfied:

$$0.6 < fair/f32 < 1.4$$

where "fair" is a focal length of said air lens, and f32 is a focal length of said second lens subunit.

3. An optical system according to claim 1, wherein said second lens subunit has an air lens of bi-convex form, and the following condition is satisfied:

$$0.15 < \left| \frac{Rair1 + Rair2}{Rair1 - Rair2} \right| < 0.7$$

where Rair1 and Rair2 are radii of curvature of lens surfaces on the object side and the image side of said air lens, respectively.

4. An optical system according to claim 1, satisfying the following conditions:

$$0.3 < f1/f < 0.75$$

$$0.2 < |f2/f| < 0.7$$

$$0.1 < f/f3 < 1.5$$

$$0.12 < f31/f < 0.5$$

$$0.05 < |f32/f| < 0.15$$

$$0.08 < f33/f < 0.25$$

where f1, f2 and f3 are focal lengths of said first lens unit, said second lens unit and said third lens unit, respectively, f is a focal length of the entire optical system, and f31, f32 and f33 are focal lengths of said first lens subunit, said second lens subunit and said third lens subunit, respectively.

5. An optical system according to claim 1, wherein said second lens unit comprises at least one positive lens and at least one negative lens, and the following condition is satisfied:

$$7.5 < vn - vp < 30$$

where vp and vn are mean values of Abbe numbers of said positive lens and said negative lens, respectively.

6. An optical system according to claim 1, wherein said second lens subunit consists of one positive lens and two negative lenses.

7. An optical system according to claim 6, wherein said second lens subunit consists of, in order from the object side to the image side, a positive lens of bi-convex form, a negative lens of bi-concave form and a negative lens of bi-concave form.

8. An optical system according to claim 6, wherein said second lens subunit consists of, in order from the object side to the image side, a negative lens of meniscus form convex toward the object side, a positive lens of meniscus form convex toward the object side a nd a negative lens of bi-concave form.

9. An optical system according to claim 1, wherein said second lens unit consists of a positive lens and a negative lens.

10. An optical system according to claim 1, wherein said third lens subunit has a plurality of positive lenses.

11. An optical system according to claim 1, wherein said second lens subunit is made to move in directions perpendicular to the optical axis so as to compensate for an image shake occurring when said optical system vibrates.

12. An optical system according to claim 1, satisfying the following condition:

$$|f/f1 - 2| < 0.1$$

where f is a focal length of the entire optical system, and f1–2 is an overall focal length of said first lens unit and said second lens unit.

13. An optical system according to claim 12, satisfying the following conditions:

$$0.2 < f1/f < 0.6$$

$$0.1 < |f2/f1| < 0.7$$

$$0.2 < f3/f < 0.8$$

where f1, f2 and f3 are focal lengths of said first lens unit, said second lens unit and said third lens unit, respectively.

14. An optical system according to claim 13, wherein said second lens unit comprises two negative lenses and one positive lens, and the following conditions are satisfied:

$$0.05 < |f2/f| < 0.3$$

$$0.1 < f31/f < 0.5$$

$$0.05 < |f32/f| < 0.2$$

$$0.08 < f33/f < 0.3$$

where f31, f32 and f33 are focal lengths of said first lens subunit, said second lens subunit and said third lens subunit, respectively.

15. An optical system according to claim 1, satisfying the following conditions:

$$0.2 < f1/f < 0.6$$

$$0.1 < |f2/f1| < 0.7$$

$$0.2 < f3/f < 0.8$$

where f1, f2 and f3 are focal lengths of said first lens unit, said second lens unit and said third lens unit, respectively.

16. An optical system comprising, in order from an object side to an image side:
   a first lens unit of positive refractive power, said first lens unit consisting of, with boundaries formed by the widest and the second-widest spaces thereof, in order from the object side to the image side, a front lens subunit of positive refractive power, a middle lens subunit of negative refractive power and a rear lens subunit of positive refractive power; and
   a second lens unit of negative refractive power, said second lens unit being movable along an optical axis to effect focusing,
   wherein, letting a focal length of the entire optical system be denoted by f, a focal length of said front lens subunit be denoted by f1a, and a space between said front lens subunit and said middle lens subunit be denoted by D1ab, the following conditions are satisfied:

$$0.4 < f1a/f < 1.1$$

$$0.035 < D1ab/f < 0.15.$$

17. An optical system according to claim 16, wherein said front lens subunit consists of one positive lens (1ap), and said middle lens subunit consists of a positive lens (1bp) and a negative lens (1bn), and
   wherein the following conditions are satisfied:

$$1 < |f1b/f| < 3$$

$$0.4 < f1c/f < 1.2$$

$$70 < v1ap$$

$$1.43 < N1ap$$

$$70 < v1bp$$

$$1.43 < N1bp$$

where f1b and f1c are focal lengths of said middle lens subunit and said rear lens subunit, respectively, N1ap and v1ap are a refractive index and Abbe number, respectively, of a material of said positive lens (1ap) in said front lens subunit, and N1bp and v1bp are a refractive index and Abbe number, respectively, of a material of said positive lens (1bp) in said middle lens subunit.

18. An optical system according to claim 16, wherein said rear lens subunit consists of a positive lens (1cp) and a negative lens (1cn) of meniscus form convex toward the object side.

19. An optical system according to claim 16, wherein said second lens unit comprises a cemented lens composed of a positive lens and a negative lens, and the following condition is satisfied:

$$0.2 < |f2/f| < 0.6$$

where f2 is a focal length of said second lens unit.

20. An optical system according to claim 16, further comprising:
   a third lens unit of positive refractive power disposed on the image side of said second lens unit, said third lens unit comprising, in order from the object side to the image side, a first lens subunit of positive refractive power, a second lens subunit of negative refractive power and a third lens subunit of positive refractive power,
   wherein said second lens subunit is movable in directions perpendicular to the optical axis to displace an image formed by said optical system.

21. An optical system according to claim 20, satisfying the following conditions:

$$0.15 < f3a/f < 0.5$$

$$0.05 < f3b/f < 0.15$$

$$0.08 < f3c/f < 0.2$$

where f3a, f3b and f3c are focal lengths of said first lens subunit, said second lens subunit and said third lens subunit, respectively.

22. An optical system according to claim 20, wherein said second lens subunit comprises a plurality of negative lenses and one positive lens, and said third lens subunit comprises a plurality of positive lenses.

23. An optical system according to claim 20, wherein said second lens subunit is made to move in directions perpendicular to the optical axis so as to compensate for an image shake occurring when said optical system vibrates.

24. An optical apparatus comprising:
   an optical system according to one of claims 1 to 23.

* * * * *

UNITED STATES PATENT AND TRADEMARK OFFICE
CERTIFICATE OF CORRECTION

PATENT NO. : 6,115,188

DATED : September 5, 2000

INVENTOR(S): NISHIO, ET AL.

It is certified that error appears in the above-identified patent and that said Letters Patent is hereby corrected as shown below:

COLUMN 2:

Line 65, "little changes" should read --changes little--.

COLUMN 10:

Line 7, "of" (first occurrence) should be deleted.

COLUMN 15:

Line 55, "R1 = 37.048" should read --R1 = 237.048--.

COLUMN 23:

Line 24, "constructed" should be deleted.

Line 25, "lenses," should read --lens,--.

COLUMN 26:

Line 61, "R6 = -1257191" should read --R6 = -1257.191--.

COLUMN 28:

Line 37, "to used" should read --used--.

UNITED STATES PATENT AND TRADEMARK OFFICE
CERTIFICATE OF CORRECTION

PATENT NO. : 6,115,188
DATED : September 5, 2000
INVENTOR(S): NISHIO, ET AL.

It is certified that error appears in the above-identified patent and that said Letters Patent is hereby corrected as shown below:

<u>COLUMN 31</u>:

Line 10, "in" should be deleted.

Line 25, "much" should be deleted.

Line 61, "to." should read --to--.

<u>COLUMN 36</u>;

Line 53, "a nd" should read --and--.

Signed and Sealed this

Twenty-ninth Day of May, 2001

NICHOLAS P. GODICI

*Attesting Officer*     Acting Director of the United States Patent and Trademark Office